US009134638B2

(12) United States Patent
Sakashita et al.

(10) Patent No.: US 9,134,638 B2
(45) Date of Patent: Sep. 15, 2015

(54) TONER, DEVELOPER USING THE TONER, IMAGE FORMING APPARATUS

(71) Applicants: Shingo Sakashita, Shizuoka (JP); Shinya Nakayama, Shizuoka (JP); Masahide Yamada, Shizuoka (JP); Atsushi Yamamoto, Shizuoka (JP); Hideyuki Santo, Shizuoka (JP); Yukiko Nakajima, Kanagawa (JP); Suzuka Amemori, Shizuoka (JP)

(72) Inventors: Shingo Sakashita, Shizuoka (JP); Shinya Nakayama, Shizuoka (JP); Masahide Yamada, Shizuoka (JP); Atsushi Yamamoto, Shizuoka (JP); Hideyuki Santo, Shizuoka (JP); Yukiko Nakajima, Kanagawa (JP); Suzuka Amemori, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/350,213

(22) PCT Filed: Oct. 17, 2012

(86) PCT No.: PCT/JP2012/077384
§ 371 (c)(1),
(2) Date: Apr. 7, 2014

(87) PCT Pub. No.: WO2013/058407
PCT Pub. Date: Apr. 25, 2013

(65) Prior Publication Data
US 2014/0301757 A1    Oct. 9, 2014

(30) Foreign Application Priority Data

Oct. 17, 2011   (JP) .................. 2011-227682
Aug. 28, 2012   (JP) .................. 2012-187380

(51) Int. Cl.
*G03G 9/087*   (2006.01)
(52) U.S. Cl.
CPC ........ *G03G 9/08764* (2013.01); *G03G 9/08755* (2013.01); *G03G 9/08793* (2013.01); *G03G 9/08795* (2013.01); *G03G 9/08797* (2013.01)
(58) Field of Classification Search
CPC .......... G03G 9/08755; G03G 9/08764; G03G 9/08795
USPC ..................................... 430/109.4
See application file for complete search history.

(56) References Cited

U.S. PATENT DOCUMENTS

| 2001/0046636 | A1  | 11/2001 | Daimon et al. |
| 2010/0310980 | A1  | 12/2010 | Sugimoto et al. |
| 2011/0065039 | A1  | 3/2011  | Ota et al. |
| 2011/0123920 | A1* | 5/2011  | Nair et al. ............ 430/109.4 |
| 2013/0130168 | A1* | 5/2013  | Kaya et al. ........... 430/109.4 |
| 2013/0130169 | A1  | 5/2013  | Aoki et al. |

FOREIGN PATENT DOCUMENTS

| EP | 1 087 265 A1  | 3/2001 |
| EP | 2 199 863 A1  | 6/2010 |
| JP | 04-024702     | 4/1992 |
| JP | 04-024703     | 4/1992 |
| JP | 2004-163516 A | 6/2004 |
| JP | 200524784 A * | 1/2005 |
| JP | 3910338       | 2/2007 |
| JP | 2009-014926   | 1/2009 |
| JP | 2009-168915   | 7/2009 |
| JP | 2009-223281   | 10/2009 |
| JP | 2010-038969   | 2/2010 |
| JP | 2010-077419   | 4/2010 |
| JP | 2010-151996   | 7/2010 |
| JP | 2010-217849   | 9/2010 |
| JP | 2011-018030   | 1/2011 |
| JP | 2012-042939   | 3/2012 |

OTHER PUBLICATIONS

Diamond, Arthur S & David Weiss (eds.) Handbook of Imaging Materials, 2nd ed.. New York: Marcel-Dekker, Inc. (Nov. 2001) pp. 145-164.*
English language machine translation of JP 2005-24784 (Jan. 2005).*
International Search Report Issued Jan. 15, 2013 for counterpart International Patent Application No. PCT/JP2012/077384 dated Oct. 17, 2012.
Written Opinion of the International Searching Authority Issued Jan. 15, 2013 in PCT/JP2012/077384 Filed Oct. 17, 2012.
Extended European Search Report issued Feb. 25, 2015 in Patent Application No. 12842320.9.
Office Action issued Mar. 17, 2015 in Korean Patent Application No. 10-2014-7012883 (with English language translation).

* cited by examiner

*Primary Examiner* — Christopher Rodee
(74) *Attorney, Agent, or Firm* — Oblon, McClelland, Maier & Neustadt, L.L.P.

(57) ABSTRACT

A toner including at least a crystalline resin as a binder resin, wherein a tetrahydrofuran soluble content of the toner includes 5.0% or more as a peak area of a component having a molecular weight of 100,000 or greater in a molecular weight distribution measured by gel permeation chromatography, and the tetrahydrofuran soluble content of the toner has a weight-average molecular weight of 20,000 to 60,000.

10 Claims, 5 Drawing Sheets

TONER, DEVELOPER USING THE TONER, IMAGE FORMING APPARATUS

TECHNICAL FIELD

The present invention relates to a toner, a developer using the toner and an image forming apparatus.

BACKGROUND ART

Conventionally, a latent image formed electrically or magnetically in an apparatus such as electrophotographic image forming apparatus is visualized by a toner for electrophotography (this may also be referred to simply as "toner"). For example, in electrophotography, an electrostatic image (latent image) is formed on a photoconductor, then the latent image is developed with a toner, and a toner image is formed. The toner image is transferred on a transfer medium such as paper and then fixed on the transfer medium such as paper. In a fixing step for fixing the toner image on transfer paper, a heat fixing method such as heat roller fixing method and heat belt fixing method is generally used widely for its energy efficiency.

In recent years, market increasingly demands a high-speed image forming apparatus and saving of energy, and a toner which has excellent low-temperature fixing property and is able to provide a high-quality image is demanded. To obtain low-temperature fixing property of a toner, it is necessary for a binder resin of the toner to have a reduced softening temperature. However, when the binder resin has a low softening temperature, so-called offset that a part of a toner image adheres on a surface of a fixing member during fixing and transfers on copy paper (hereinafter, also referred to as hot-offset) is likely to occur. Also, heat-resistant storage stability of the toner decreases, and so-called blocking that toner particles fuse with one another under a high-temperature environment occurs. In addition, there are problems of contamination that a toner fuses to an inside of a developing device or a carrier and a problem of toner filming on a surface of a photoconductor.

As a technique to solve these problems, it has been known to use a crystalline resin as a binder resin of a toner. That is, the crystalline resin may soften rapidly at a melting point of the resin, and the toner may have a reduced softening temperature close to the melting point while ensuring heat-resistant storage stability at a temperature below the melting point. Thus, it is possible to support both low-temperature fixing property and heat-resistant storage stability.

As a toner using a crystalline resin, toners using a crystalline resin as a binder resin that crystalline polyester is elongated by diisocyanate have been proposed (see PTL1 and PTL2). These toners have excellent low-temperature fixing property but have insufficient heat-resistant storage stability, and they do not reach the quality required in recent years.

Also, a toner using a crystalline resin having a crosslinking structure by an unsaturated bond containing a sulfonic acid group has been proposed (see PTL3). This toner has improved heat-resistant storage stability compared to the prior art so far. Also, a technology of resin particles having excellent low-temperature fixing property and heat-resistant storage stability by defining a ratio of a softening temperature to a heat of fusion peak temperature and viscoelastic properties is disclosed (see PTL4).

CITATION LIST

Patent Literature

PTL1 Japanese Patent Application Publication (JP-B) No. 04-024702
PTL2 JP-B No. 04-024703
PTL3 Japanese Patent (JP-B) No. 3910338
PTL4 Japanese Patent Application Laid-Open (JP-A) 2010-077419

SUMMARY OF INVENTION

Technical Problem

In studying low-temperature fixing of a toner, the present inventors found that a toner including a crystalline resin as a main component of a binder resin was vulnerable to stirring stress in a developing device, resulting in image defects due to occurrence of toner or carrier agglomerate over time, since an increasing amount of the crystalline resin enhanced low-temperature fixing property but reduced hardness of the toner due to low resin hardness. In addition, it was found as a problem as well that controlling a molecular weight or a melting point of the crystalline resin as a means for low-temperature fixing was in a trade-off relationship with hot-offset resistance and heat-resistant storage stability.

Also, a conventional toner including a crystalline resin as a binder resin may have difficulty in enabling fixing at a constant temperature and a constant speed regardless of a type of paper. Thus, it is necessary to control the fixing temperature or the process speed by detecting the type of paper, resulting in increased complexity, size and cost of an image forming apparatus.

The present invention aims at solving the above problems in the conventional technologies and at achieving the following objection. That is, the present invention aims at providing a toner including a crystalline resin as a binder resin which is remarkably excellent in low-temperature fixing property and is also excellent in heat-resistant storage stability, stress resistance and transfer property. The present invention also aims at providing a toner including a crystalline resin as a binder resin which enables fixing at a constant temperature and a constant speed regardless of a type of paper.

Solution to Problem

Means for solving the problems are as follows. That is:
The toner of the present invention is a toner including at least a crystalline resin as a binder resin, wherein a tetrahydrofuran soluble content of the toner includes 5.0% or more as a peak area of a component having a molecular weight of 100,000 or greater in a molecular weight distribution measured by gel permeation chromatography (GPC), and the tetrahydrofuran soluble content of the toner has a weight-average molecular weight of 20,000 to 60,000.

Advantageous Effects of Invention

According to the present invention, it is possible to solve the aforementioned problems in the prior art and to provide a toner including a crystalline resin as a binder resin which is remarkably excellent in low-temperature fixing property and is also excellent in heat-resistant storage stability, stress resistance and transfer property and also to provide a toner which enables fixing at a constant temperature and a constant speed regardless of a type of paper.

DESCRIPTION OF EMBODIMENTS (Toner)

Figure 1A:
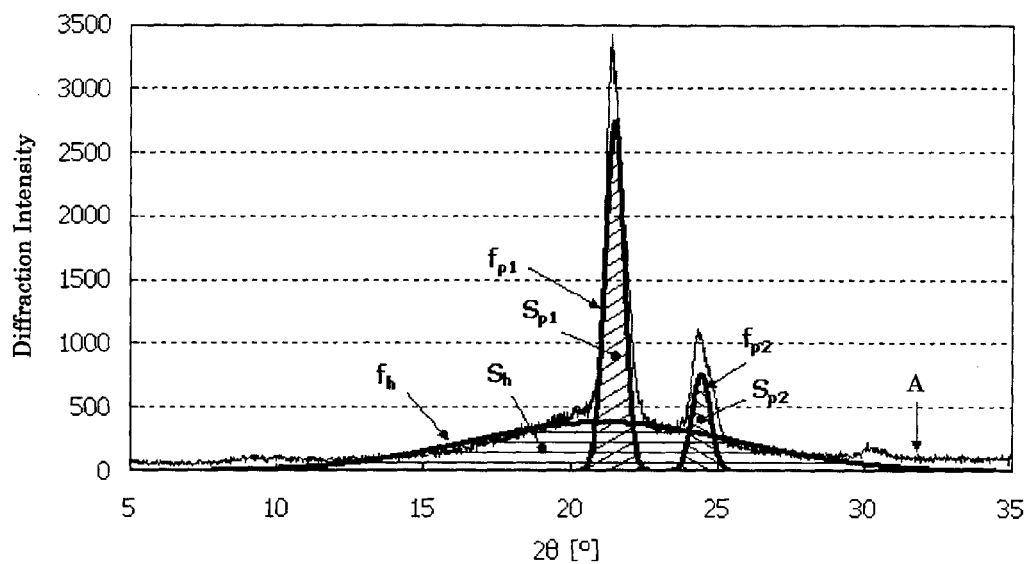
FIG. 1A is a diagram illustrating one example of a diffraction spectrum obtained by an x-ray diffraction measurement.

A toner of the present invention includes at least a crystalline resin as a binder resin, and it further includes a colorant, a releasing agent and other components according to necessity.

A tetrahydrofuran soluble content of the toner includes 5.0% or more as a peak area of a component having a molecular weight of 100,000 or greater in a molecular weight distribution measured by gel permeation chromatography (GPC), and the tetrahydrofuran soluble content of the toner has a weight-average molecular weight of 20,000 to 60,000.

As a result of intensive studies, the present inventors have found that, for a toner having a crystalline resin as a binder resin as a main component, a property that viscoelasticity degrades rapidly above a melting point (sharp melt property), which had been conventionally considered as effective for low-temperature fixing property, causes a large variation in a fixing temperature range depending on a type of paper. Thus, the present inventors have found that fixing at a constant temperature and a constant speed is possible regardless of a type of paper with a toner which includes more than a certain amount of a binder resin having a molecular weight greater than that used for a conventional toner with excellent low-temperature fixing property, specifically more than a certain amount of a component having a molecular weight converted to polystyrene standard measured by gel permeation chromatography (GPC) of 100,000 or greater, and which has a weight-average molecular weight within a certain range.

Also, the present inventors have found that introduction of a urethane bond or a urea bond or both thereof in a crystalline resin increases cohesion derived from the bonds and that it is possible to improve hardness of the crystalline resin. The inventors have also found that it is possible to adjust degree of crystallization of the toner as a whole by using two types of crystalline resins having a urethane bond or a urea bond or both thereof and that use of such two different crystalline resins can suppress degradation of heat-resistant storage stability of the toner (which is caused by introduction of a urethane bond or a urea bond or both thereof) as well as can improve hot-offset resistance of the toner.

A reason for the effect of the present invention is considered as follows. A crystalline resin has a sharp melt property as described above, but internal cohesion and viscoelasticity of the toner in a molten state is highly dependent on a molecular weight and a structure of the resin. For example, when the resin includes a urethane bond or a urea bond as a bonding group having a large cohesive force, it behaves similarly to a rubber-like elastic material at a relatively low temperature even during melting. However, because a thermal kinetic energy of the polymer chain increases as the temperature increases, the cohesion between the bonds loosens, and the resin gradually approaches a viscous body.

When such a resin is used as a binder resin for a toner, fixing may be possible without a problem at a low fixing temperature. However, when the fixing temperature increases, a so-called hot-offset phenomenon that an upper portion of a toner image adhere to a fixing member during fixing due to small internal cohesive force during toner melting may occur, severely impairing image quality. When the urethane bond or the urea bond is increased to avoid hot-offset, fixing at a high temperature may be performed without problems. On the other hand, fixing at a low temperature results in low image gloss and insufficient melt impregnation into paper, and the image is easily separated from the paper. Especially when fixing on paper which is thick and has many irregularities on a surface thereof, a fixing state deteriorates due to low heat transfer efficiency of the toner during fixing. Also, for the toner in an elastic state, the fixing state of the toner in a recess significantly deteriorates due to an insufficient pressure applied to the toner in a fixing member.

When a molecular weight is considered as a means to control viscoelasticity after melting, a larger molecular weight naturally has a larger viscoelasticity due to more obstacles to a movement of a molecular chain. Also, the molecular chain with a large molecular weight tangles, and as a result, it shows an elastic behavior. When a fixing property on paper is focused, a smaller molecular weight is preferable for a smaller viscosity during melting, but hot offset occurs without a certain degree of elasticity. However, when the overall molecular weight is increased, fixing property is sacrificed, and the fixing state especially on thick paper deteriorates due to low heat transfer efficiency. Thus, by incorporating a crystalline component having a large molecular weight while the overall molecular weight of the binder resin is not increased too much, a toner which has a viscoelasticity after melting favorably controlled and which may be fixed at a constant temperature and a constant speed regardless of a type of paper such as thin paper and thick paper may be obtained.

<Binder Resin>

The binder resin includes at least a crystalline resin, and it further includes an amorphous resin and other components according to necessity.

<<Crystalline Resin>>

The crystalline resin is not particularly restricted and may be appropriately selected according to purpose. It preferably includes a crystalline resin including a urethane bond or a urea bond or both thereof in a main chain thereof, and it more preferably includes a crystalline resin including a urethane bond or a urea bond or both thereof and a crystalline polyester unit.

The crystalline resin including a urethane bond or a urea bond or both thereof and a crystalline polyester unit preferably includes a crystalline resin including at least any one of a polyurethane unit and a polyurea unit, and a crystalline polyester unit, and it more preferably includes a crystalline resin including a polyurethane unit and a crystalline polyester unit.

Also, the crystalline resin including a urethane bond or a urea bond or both thereof preferably includes a component that a modified crystalline resin having an isocyanate group at an end thereof is elongated.

A crystalline resin in the present invention is a resin including a portion having a crystal structure, and it includes a diffraction peak derived from the crystal structure in a diffraction spectrum obtained using an x-ray diffractometer. The crystalline resin has a ratio of a softening temperature measured using a capillary flow tester to a maximum peak temperature of heat of fusion measured using a differential scanning calorimeter (DSC) (softening temperature/maximum peak temperature of heat of fusion) of 0.8 to 1.6, indicating it has a characteristic of softening sharply with heat.

Also, the binder resin may include a non-crystalline resin. The non-crystalline resin is a resin which does not include a crystalline structure and has no diffraction peak derived from a crystalline structure in a diffraction spectrum obtained using an x-ray diffractometer. The non-crystalline resin has a ratio of a softening temperature to a maximum peak temperature of heat of fusion (softening temperature/maximum peak temperature of heat of fusion) greater than 1.6, indicating it has a characteristic of softening slowly with heat.

A softening temperature of a resin may be measured using a capillary flow tester (for example, CFT-500 D (manufactured by Shimadzu Corporation)). While 1 g of a resin as a sample is heated at a heating rate of 3° C./min, a load of 2.94 MPa is applied thereto using a plunger, and the sample is extruded from a nozzle having a diameter of 0.5 mm and a length of 1 mm. An amount of descent of the plunger of the flow tester is plotted against the temperature, and a temperature at which half of the sample elutes off is regarded as a softening temperature.

The maximum peak temperature of heat of fusion of the resin may be measured using a differential scanning calorimeter (DSC) (for example, a differential scanning calorimeter Q2000 (manufactured by TA Instruments)). As a pre-treatment, a sample for measuring the maximum peak temperature of heat of fusion is melted at 130° C., cooled from 130° C. to 70° C. at a rate of 10° C./min, and next cooled from 70° C. to 10° C. at a rate of 0.5° C./min. Here, an endothermic-exothermic change is measured using a DSC by heating at a rate of 10° C./rain. The "endothermic-exothermic change" is plotted against the "temperature", and an endothermic peak temperature observed at 20° C. to 100° C. is defined as "Ta*". When there are multiple endothermic peaks, a temperature having a peak with the largest endothermic quantity is defined as Ta*. Thereafter, the sample is stored for 6 hours at a temperature of (Ta*−10° C. Next, the sample is cooled to 0° C. at a cooling rate of 10° C./min and then heated at a heating rate of 10° C./min, and an endothermic-exothermic change is measured using a DSC. A similar plot is drawn, and a temperature corresponding to a maximum peak of an endothermic quantity is defined as a maximum peak temperature of heat of fusion.

Regarding the endothermic quantity of a binder resin, the binder resin is heated from a room temperature to 150° C. at a heating rate of 10° C./min and left at 150° C. for 10 minutes, then it is cooled to a room temperature and left for 10 minutes, then it is heated again to 150° C. in a nitrogen atmosphere at a heating rate of 10° C./min, and a DSC measurement is performed. An area between the endothermic peak in the second temperature increase and the base line is defined as the endothermic quantity.

A content of the crystalline resin in the binder resin is not particularly restricted and may be appropriately selected according to purpose. It is preferably 50% by mass or greater in view of fully developing excellent low-temperature fixing property and heat-resistant storage stability by the crystalline resin, and it is more preferably 65% by mass or greater, further more preferably 80% by mass or greater, and particularly preferably 95% by mass or greater. When the content is less than 50% by mass, the binder resin cannot develop sharp responsiveness to heat on the viscoelastic properties of the toner, and it is difficult to have both low-temperature fixing property and heat-resistant storage stability.

The maximum peak temperature of heat of fusion of the crystalline resin is not particularly restricted and may be appropriately selected according to purpose. In view of having both low-temperature fixing property and heat-resistant storage stability, it is preferably 50° C. to 70° C., more preferably 55° C. to 68° C., and particularly preferably 60° C. to 65° C. When the maximum peak temperature is less than 50° C., low-temperature fixing property improves, but heat-resistant storage stability degrades. To the contrary, when it exceeds 70° C., heat-resistant storage stability improves but the low-temperature fixing property degrades.

A ratio of the softening temperature to the maximum peak temperature of heat of fusion is not particularly restricted as long as it is in a range of 0.8 to 1M, and it may be appropriately selected according to purpose. It is preferably 0.8 to 1.5, more preferably 0.8 to 1.4, and particularly preferably 0.8 to 1.3. As the ratio decreases, the resin softens more sharply, which is superior in terms of having both low-temperature fixing property and heat-resistant storage stability.

The crystalline resin preferably includes a resin having a crystalline polyester unit as a main component for easier design of melting point favorable as a toner and for excellent binding property to paper. A content of the resin having a crystalline polyester unit with respect to the binder resin is preferably 50% by mass or greater, and more preferably 60% by mass or greater, and further more preferably 75% by mass or greater, and particularly preferably 90% by mass or greater. This is because the toner has more superior low-temperature fixing property as the content of the resin having a crystalline polyester unit increases.

Examples of the resin having a crystalline polyester unit include: a resin consisting of a crystalline polyester unit (also referred to as simply a crystalline polyester resin); a resin to which a crystalline polyester unit is connected; and a resin to which a crystalline polyester unit and other polymer units are connected (so-called block polymer or graft polymer).

Examples of the other polymer units include a non-crystalline polyester unit, a polyurethane unit, a polyurea unit and a vinyl polymer unit.

The resin consisting of a crystalline polyester unit includes a crystalline structure at a large portion thereof, but it may be easily deformed by an external force. A reason may be as follows. It is difficult to crystallize all the portions of the crystalline polyester, and a molecular chain of a portion which is not crystallized (non-crystallized portion) has a high degree of freedom and easily deforms. Regarding a portion having a crystalline structure, which usually has a so-called lamellar structure as a higher-order structure that layers formed by folded molecular chains are laminated, lamellar layers are easily shifted because a large binding force between lamellar layers does not work. When a binder resin for a toner is easily deformed, problems may occur such as aggregation deformation in the image forming apparatus, adhesion or fixing to a member and scratches caused easily on a final image. Thus, the binder resin must have toughness to withstand deformation to some extent with respect to an external force.

Thus, among the resins having a crystalline polyester unit, a resin where the crystalline polyester unit are linked together and a resin where the crystalline polyester unit is linked with other polymer units (so-called block polymer and graft polymer) each of the resins containing at least any one of a urethane bond, a urea bond and a phenylene bonding having large aggregation energy are preferable in view of providing toughness to the resin.

It is considered that the urethane bond and the urea bond existing in a molecular chain may form pseudo-crosslinking points by means of large intermolecular forces at non-crystalline portions or between lamellar layers, and moreover they are wettable with respect to paper after fixing thereon and enhance fixing strength. Thus, a resin with a crystalline polyester unit connected thereto, having a urethane bond or a urea bond or both thereof, and a resin with a crystalline polyester unit and other polymer unit connected thereto, having a urethane bond or a urea bond or both thereof, are particularly preferable.

—Crystalline Polyester Unit—

Examples of the polyester unit include a polycondensation polyester unit synthesized from a polyol and a polycarboxylic acid, a lactone ring-opening polymerization product and a polyhydroxycarboxylic acid. Among these, a polycondensation polyester unit of a diol and a dicarboxylic acid is preferable in terms of developing crystallinity.

—Polyol—

Examples of the polyol include a diol and a polyol having 3 to 8 valences or more.

The diol is not particularly restricted and may be appropriately selected according to purpose. Examples thereof include: an aliphatic diol such as straight-chain aliphatic diol and branched aliphatic diol having 2 to 36 carbon atoms in the chain; alkylene ether glycol having 4 to 36 carbon atoms; an alicyclic diol having 4 to 36 carbon atoms; an alkylene oxide (hereinafter abbreviated as AO) adduct of the alicyclic diol; an AO adduct of bisphenols; a polylactone diol; a polybutadiene diol; a diol having a carboxyl group and a diol having a sulfonic acid group or a sulfamic acid group; and a diol having other functional groups such as neutralized salt group. Among these, the aliphatic diol having 2 to 36 carbon atoms in the chain is preferable, and a straight-chain aliphatic diol is more preferable. These may be used alone or in combination of two or more.

A content of the straight-chain aliphatic diol with respect to the diol as a whole is preferably 80% by mole or greater, and more preferably 90% by mole or greater. The content of 80% by mole or greater is preferable in terms of improved crystallinity of the resin, compatibility of low-temperature fixing property and heat-resistant storage stability, and improved resin hardness.

The straight-chain aliphatic diol is not particularly restricted and may be appropriately selected according to purpose. Examples thereof include ethylene glycol, 1,3-propanediol, 1,4-butanediol, 1,5-pentanediol, 1,6-hexanediol, 1,7-heptanediol, 1,8-octanediol, 1-9-nonanediol, 1,10-decanediol, 1,11-undecanediol, 1,12-dodecanediol, 1,13-tridecanediol, 1,14-tetradecanediol, 1,18-octadecanediol and 1,20-eicosanediol. Among these, ethylene glycol, 1,3-propanediol, 1,4-butanediol, 1,6-hexanediol, 1,9-nonanediol and 1,10-decanediol are preferable in view of easy availability.

The branched aliphatic diol having 2 to 36 carbon atoms in the chain is not particularly restricted and may be appropriately selected according to purpose. Examples thereof include 1,2-propyleneglycol, butanediol, hexanediol, octanediol, decanediol, dodecanediol, tetradecanediol, neopentyl glycol and 2,2-diethyl-1,3-propanediol.

The alkylene ether glycol having 4 to 36 carbon atoms is not particularly restricted and may be appropriately selected according to purpose. Examples thereof include diethylene glycol, triethylene glycol, dipropylene glycol, polyethylene glycol, polypropylene glycol and polytetramethylene ether glycol.

The alicyclic diol having 4 to 36 carbon atoms is not particularly restricted and may be appropriately selected according to purpose. Examples thereof include 1,4-cyclohexanedimethanol and hydrogenated bisphenol A.

The AO adduct of the alicyclic diol is not particularly restricted and may be appropriately selected according to purpose. Examples thereof include adducts (with addition of 1 to 30 moles) of ethylene oxide (hereinafter abbreviated as EO), propylene oxide (hereinafter abbreviated as PO) and buthylene oxide (hereinafter abbreviated as BO).

The bisphenols are not particularly restricted and may be appropriately selected according to purpose. Examples thereof include an AO (such as EU, PO and BO) adduct (with addition of 2 moles to 30 moles) of bisphenol A, bisphenol F or bisphenol S.

The polylactone diol is not particularly restricted and may be appropriately selected according to purpose. Examples thereof include poly-$\epsilon$-caprolactone diol.

The diol having a carboxyl group is not particularly restricted and may be appropriately selected according to purpose. Examples thereof include an dialkylol alkanoic acid having 6 to 24 carbon atoms such as 2,2-dimethylol propionic acid (DMPA), 2,2-dimethylol butanoic acid, 2,2-dimethylol heptanoic acid and 2,2-dimethylol octanoic acid.

The diol having a sulfonic acid group or a sulfamic acid group is not particularly restricted and may be appropriately selected according to purpose. Examples thereof include: a sulfamic acid diol such as N,N-bis(2-hydroxyethyl)sulfamic acid and 2-mole PO adduct of N,N-bis(2-hydroxyethyl) sulfamic acid; [N,N-bis(2-hydroxyalkyl)sulfamic acid (the alkyl group having 1 to 6 carbon atoms) and an AO adduct thereof (AO is EO or PO, with addition of 1 to 6 moles); and bis(2-hydroxyethyl)phosphate.

The neutralized salt group of the diol having the neutralized salt group is not particularly restricted and may be appropriately selected according to purpose. Examples thereof include a tertiary amine having 3 to 30 carbon atoms (e.g. triethylamine) and alkali metal (e.g. sodium salt).

Among these diols, an alkylene glycol having 2 to 12 carbon atoms, a diol having a carboxyl group, an AO adduct of bisphenols and a combination thereof are preferable.

The polyol having 3 to 8 valences or more used according to necessity is not particularly restricted and may be appropriately selected according to purpose. Examples thereof include: a polyhydric aliphatic alcohol having 3 to 8 valences or more having 3 to 36 carbon atoms such as alkane polyol and an intramolecular or intermolecular dehydration product thereof (e.g. glycerin, trimethylol ethane, trimethylol propane, pentaerythritol, sorbitol, sorbitan and polyglycerin), and a sugar and a derivative thereof (e.g. sucrose and methyl glucoside) an AO adduct (with addition of 2 to 30 moles) of trisphenols (e.g. trisphenol PA); an AO adduct (with addition of 2 to 30 moles) of a novolak resin (e.g. phenol novolak and cresol novolak); and an acrylic polyol such as copolymer of a hydroxyethyl (meth)acrylate and other vinyl monomer. Among these, a polyhydric aliphatic alcohol having 3 to 8 valences or more and an AO adduct of a novolak resin are favorable, and the AO adduct of a novolak resin is more favorable.

—Polycarboxylic Acid—

Examples of the polycarboxylic acid include dicarboxylic acid and a polycarboxylic acid having 3 to 6 valences or more.

The dicarboxylic acid is not particularly restricted and may be appropriately selected according to purpose. Favorable examples thereof include: an aliphatic dicarboxylic acid such as straight-chain aliphatic dicarboxylic acid and branched-chain aliphatic dicarboxylic acid; and an aromatic dicarboxylic acid. These may be used alone or in combination of two or more. Among these, a straight-chain aliphatic dicarboxylic acid is more preferable.

The aliphatic dicarboxylic acid is not particularly restricted and may be appropriately selected according to purpose. Favorable examples thereof include: an alkanedicarboxylic acid having 4 to 36 carbon atoms such as succinic acid, adipic acid, sebacic acid, azelaic acid, dodecanedicarboxylic acid, octadecanedicarboxylic acid and decylsuccinic acid; an alkenedicarboxylic acids having 4 to 36 carbon atoms such as alkenylsuccinic acid including dodecenylsuccinic acid, pentadecenylsuccinic acid and octadecenylsuccinic acid, maleic acid, fumaric acid and citraconic acid; and cycloaliphatic dicarboxylic acids having 6 to 40 carbon atoms such as dimer acid (dimeric linoleic acid).

The aromatic dicarboxylic acid is not particularly restricted and may be appropriately selected according to purpose. Favorable examples thereof include an aromatic dicarboxylic acid having 8 to 36 carbon atoms such as phthalic acid, isophthalic acid, terephthalic acid, t-butylisophthalic acid, 2,6-naphthalenedicarboxylic acid and 4,4'-biphenyldicarboxylic acid.

Also, examples of the polycarboxylic acid having 3 to 6 valences or more used according to necessity include an aromatic polycarboxylic acid having 9 to 20 carbon atoms such as trimellitic acid and pyromellitic acid.

Here, as the dicarboxylic acid or the polycarboxylic acid having 3 to 6 valences or more, an acid anhydride or an lower alkyl ester having 1 to 4 carbon atoms (e.g. methyl ester, ethyl ester and isopropyl ester) of those described above may also be used.

Among the dicarboxylic acid, the aliphatic dicarboxylic acid (preferably adipic acid, sebacic acid or dodecanedicarboxylic acid) alone is preferable. Similarly, it is preferable that the aliphatic dicarboxylic acid and the aromatic dicarboxylic acid (preferably terephthalic acid, isophthalic acid, t-butylisophthalic acid; and lower alkyl esters of these aromatic dicarboxylic acids) are copolymerized. An amount of copolymerization of the aromatic dicarboxylic acid is preferably 20% by mole or less.

—Lactone Ring-Opening Polymerization Product—

The lactone ring-opening polymerization product is not particularly restricted and may be appropriately selected according to purpose. Examples thereof include a lactone ring-opening polymerization product obtained by ring-opening polymerization of lactones including a mono-lactone having 3 to 12 carbon atoms (having 1 ester group in the ring) such as β-propiolactone, γ-butyrolactone, δ-valerolactone and ε-caprolactone using a catalyst such as metal oxide and organometallic compound, and a lactone ring-opening polymerization product having a hydroxyl group at an end thereof obtained by ring-opening polymerization of the mono-lactones having 3 to 12 carbon atoms using a glycol (e.g. ethylene glycol and diethylene glycol) as an initiator. These may be used alone or in combination of two or more.

The mono-lactone having 3 to 12 carbon atoms is not particularly restricted and may be appropriately selected according to purpose. It is preferably ε-caprolactone in view of crystallinity.

Also, a commercially available product may be used as the lactone ring-opening polymerization product. Examples of the commercially available product include a highly crystalline polycaprolactone such as H1P, H4, H5 and H7 of PLACCEL series manufactured by Daicel Co., Ltd.

—Polyhydroxy Carboxylic Acid—

A method for preparing the polyhydroxy carboxylic acid is not particularly restricted and may be appropriately selected according to purpose. Examples thereof include: a method of direct dehydration condensation of hydroxycarboxylic acids such as glycolic acid and lactic acid (e.g. L-form, D-form and racemic form); and a method of ring-opening polymerization of a cyclic ester having 4 to 12 carbon atoms (having 2 to 3 ester groups in the ring) corresponding to a dehydration condensation product between 2 or 3 molecules of hydroxycarboxylic acid such as glycolide and lactide (e.g. L-form, D-form and racemic form) using a catalyst such as metal oxide and organometallic compound. Among these, the method of ring-opening polymerization is preferable in view of molecular weight adjustment.

Among the cyclic esters, L-lactide and D-lactide are preferable in view of crystallinity. Also, these polyhydroxy carboxylic acids may be those with their ends modified by a hydroxyl group or a carboxyl group.

<<Resin to which Crystalline Polyester Unit is Connected>>

As a method for obtaining the resin to which a crystalline polyester unit is connected, for example, a crystalline polyester unit having an active hydrogen group such as hydroxyl group at an end thereof is prepared beforehand, which is connected by a polyisocyanate. By using this method, it is possible to introduce a urethane bond in the resin skeleton, which may enhance toughness of the resin.

Examples of the polyisocyanate include diisocyanate and polyisocyanate having 3 or more valences.

The diisocyanate is not particularly restricted and may be appropriately selected according to purpose. Examples thereof include aromatic diisocyanates, aliphatic diisocyanates, cycloaliphatic diisocyanates and aromatic aliphatic diisocyanates. These may be used alone or in combination of two or more.

Also, an isocyanate having three or more valences may be used in combination according to necessity.

The aromatic diisocyanates are not particularly restricted and may be appropriately selected according to purpose. Examples thereof include 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), crude MDI [phosgene compound of crude diaminophenylmethane [condensation product of formaldehyde and aromatic amine (aniline) or a mixture thereof; mixture of diaminodiphenylmethane and a small amount (5-20% by mass, for example) of a polyamine having three or more functional groups] polyallyl polyisocyanate (PAPI)], 1,5-naphthylene diisocyanate, 4,4',4"-triphenylmethane diisocyanate, and m- and p-isocyanatophenyl sulfonyl isocyanate.

The aliphatic diisocyanates are not particularly restricted and may be appropriately selected according to purpose. Examples thereof include ethylene diisocyanate, tetramethylene diisocyanate, hexamethylene diisocyanate (HDI), dodecamethylene diisocyanate, 1,6,11-undecene triisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl)carbonate and 2-isocyanatoethyl-2,6-diisocyanato hexanoate.

The alicyclic diisocyanates are not particularly restricted and may be appropriately selected according to purpose. Examples thereof include isophorone diisocyanate (IPDI), dicyclohexylmethane-4,4'-diisocyanate (hydrogenated MDI), cyclohexylene diisocyanate, methyl cyclohexylene diisocyanate (hydrogenated TDI), bis(2-isocyanatoethyl)-4-cyclohexene-1,2-dicarboxylate, and 2,5- and 2,6-norbornane diisocyanate.

The aromatic aliphatic diisocyanates are not particularly restricted and may be appropriately selected according to purpose. Examples thereof include m- and p-xylylene diisocyanate (XDI) and α,α,α',α"-tetramethylxylylene diisocyanate (TMXDI).

A modified product of the above diisocyanates is not particularly restricted and may be appropriately selected according to purpose. Examples thereof include a modified product including a urethane group, a carbodiimide group, an allophanate group, a urea group, a biuret group, an uretdione group, an uretoimin group, an isocyanurate group or an oxazolidone group. Specific examples thereof include; a modified diisocyanate including modified MDI such as urethane-modified MDI, carbodiimide-modified MDI, trihydrocarbyl phosphate-modified MDI, and urethane-modified TDI such as prepolymer including isocyanate; a mixture of two or more types of these modified diisocyanates (e.g. a combination of a modified MDI and a urethane-modified TDI).

Among these diisocyanates, those preferable include; an aromatic diisocyanate having 6 to 20 carbon atoms, an aliphatic diisocyanate having 2 to 18 carbon atoms, an alicyclic diisocyanate having 4 to 15 carbon atoms, an aromatic aliphatic diisocyanate having 8 to 15 carbon atoms, where the number of carbon atoms excludes the carbon in the NCO group; a modified product of these diisocyanates (e.g. a urethane group, a carbodiimide group, an allophanate group, a urea group, a biuret group, an uretdione group, an uretoimin group, an isocyanurate group or an oxazolidone group); and a mixture of two or more types thereof. An aromatic diisocyanate having 6 to 15 carbon atoms, an aliphatic diisocyanate having 4 to 12 carbon atoms and an alicyclic diisocyanate having 4 to 15 carbon atoms, where the number of carbon atoms excludes the carbon in the NCO group, are more preferable, and TDI, MDI, HDI, hydrogenated MDI and IPDI are particularly preferable.

<<<Resin in which Crystalline Polyester Unit and Other Polymer Units are Connected>>>

A method for obtaining the resin to which a crystalline polyester unit and other polymer units are connected is not particularly restricted and may be appropriately selected according to purpose. Examples thereof include: (1) preparing the crystalline polyester resin and the other polymer units separately beforehand and combining them; (2) preparing at least any one of the crystalline polyester unit and the other polymer units beforehand, and in the presence of the prepared unit, combining by polymerizing the other polymer; and (3) polymerizing simultaneously or sequentially the crystalline polyester unit and the other polymer units in the same reaction field. In view of easily controlling the reaction as design intent, a favorable example of the method (1) and a favorable example of the method (2) described below are preferable.

As the favorable example of the method (1), similarly to the method for obtaining the resin to which a crystalline polyester unit is connected, two or more types of units (i.e. crystalline polyester unit and other polymer units) having an active hydrogen group such as hydroxyl group at an end thereof are prepared beforehand, and These are combined with polyisocyanate. As for the polyisocyanate, those described above may be used. Also, a method including introducing an isocyanate group at an end of one unit and reacting it with an active hydrogen group of the other unit may be favorably used. It is possible to introduce a urethane bond in the resin skeleton using these methods, and accordingly toughness of the resin may be enhanced.

As a favorable example of the method (2), when the crystalline polyester unit is prepared first and the polymer unit prepared next is a non-crystalline polyester unit, a polyurethane unit or a polyurea unit, a hydroxyl group or a carboxyl group at an end of the crystalline polyester unit is reacted with a monomer for obtaining the other polymer units. With this method, a resin in which the crystalline polyester unit and the other polymer units are connected may be obtained.

—Non-Crystalline Polyester Unit—

Examples of the non-crystalline polyester unit include a polycondensation polyester unit synthesized from a polyol and a polycarboxylic acid. As for the polyol and the polycarboxylic acid, those exemplified for the crystalline polyester unit may be used. However, in order for the unit to have no crystallinity, the polymer skeleton is designed to have many bending points and branching points. In order to provide the bending points, for example, AO (e.g. EO, PO and BO) adducts (with addition of 2 to 30 moles) of bisphenols such as bisphenol A, bisphenol F and bisphenol S and derivatives thereof may be used as the polyol, and phthalic acid, isophthalic acid or t-butylisophthalic acid may be used as the polycarboxylic acid. In order to provide the branching points, the polyols and the polycarboxylic acids having 3 or more valences may be used.

—Polyurethane Unit—

Examples of the polyurethane unit include a polyurethane unit synthesized from a polyol such as diol and polyol having 3 to 8 valences or more and a polyisocyanate such as polyisocyanate having 3 or more valences. Among these, the polyurethane unit synthesized from the diol and the diisocyanate is preferable.

Examples of the diol and the polyol having 3 to 8 valences or more include those similar to the diol and the polyol having 3 to 8 valences or more exemplified for the polyester resin.

Examples of the diisocyanate and the polyisocyanate having 3 or more valences include those similar to the diisocyanate and the polyisocyanate having 3 or more valences described above.

—Polyurea Unit—

Examples of the polyurea unit include a polyurea unit synthesized from a polyamine such as diamine and polyamine having 3 or more valences and a polyisocyanate such as diisocyanate and polyisocyanate having 3 or more valences.

The diamine is not particularly restricted and may be appropriately selected according to purpose. Examples thereof include aliphatic diamines and aromatic diamines. Among these, aliphatic diamines having 2 to 18 carbon atoms and aromatic diamines having 6 to 20 carbon atoms are preferable. Also, the amines having 3 or more valences may be used according to necessity.

The aliphatic diamines having 2 to 18 carbon atoms are not particularly restricted and may be appropriately selected according to purpose. Examples thereof include: an alkylenediamine having 2 to 6 carbon atoms such as ethylenediamine, propylenediamine, trimethylenediamine, tetramethylenediamine and hexamethylenediamine; a polyalkylenediamine having 4 to 18 carbon atoms such as diethylenetriamine, iminobispropylamine, bis(hexamethylene)triamine, triethylenetetramine, tetraethylenepentamine and pentaethylenehexamine; a hydroxyalkyl substituent of the alkyelenediamine or the polyalkylenediamine by an alkyl group having 1 to 4 carbon atoms or a hydroxyalkyl group having 2 to 4 carbon atoms such as dialkylaminopropylamine, trimethylhexamethylenediamine, aminoethylethanolamine, 2,5-dimethyl-2,5-hexamethylenediamine and methyliminobispropylamine; an alicyclic diamine having 4 to 15 carbon atoms such as 1,3-diaminocyclohexane, isophorone diamine, menthenediamine and 4,4'-methylenedichylohexanediamine (hydrogenated methylenedianiline); a heterocyclic diamine having 4 to 15 carbon atoms such as piperazine, N-aminoethylpiperazine, 1,4-diaminoethylpiperazine, 1,4-bis(2-amino-2-methylpropyl)piperazine, 3,9-bis(3-aminopropyl)-2,4,8,10-tetraoxaspiro[5,5]undecane, and aliphatic amines including an aromatic ring having 8 to 15 carbon atoms such as xylylenediamine and tetrachloro-p-xylylenediamine.

The aromatic diamines having 6 to 20 carbon atoms are not particularly restricted and may be appropriately selected according to purpose. Examples thereof include; non-substituted aromatic diamines such as 1,2-, 1,3- and 1,4-phenylenediamine, 2,4'- and 4,4'-diphenylmethanediamine, crude diphenylmethanediamine (polyphenylpolymethylenepolyamine), diaminodiphenyl sulfone, benzidine, thiodianiline, bis(3,4-di-aminophenyl)sulfone, 2,6-diaminopyridine, m-aminobenzylamine, triphenylmethane-4,4',4'''-triamine and naphthylenediamine; aromatic diamines having nuclear-substituted alkyl group having 1 to 4 carbon atoms such as 2,4- and 2,6-triethylenediamine, crude tolylenediamine, diethyltolylenediamine, 4,4'-diamino-3,3'-dimethyldiphenylmethane, 4,4'-bis(o-toluidine), dianisidine, diaminoditolyl sulfone, 1,3-dimethyl-2,4-diaminobenzene, 1,3-dimethyl-2,6-diaminobenzene, 1,4-diisopropyl-2,5-diaminobenzene, 2,4-diaminomesitylene, 1-methyl-3,5-diethyl-2,4-diaminobenzene, 2,3-dimethyl-1,4-diaminonaphthalene, 2,6-dimethyl-1,5-diaminonaphthalene, 3,3',5,5'-tetramethylbenzidine, 3,3',5,5'-tetramethyl-4,4'-diaminodiphenylmethane, 3,5-diethyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraethyl-4,4'-diamino diphenyl ether and 3,3',5,5'-tetraisopropyl-4,4'-diaminodiphenyl sulfone; mixtures of various ratios of the unsubstituted aromatic diamines or isomers of the aromatic diamines having nuclear-substituted alkyl group having 1 to 4 carbon atoms; methylenebis-o-chloroaniline, 4-chloro-o-phenylenediamine, 2-chloro-1,4-phenylenediamine, 3-amino-4-chloroaniline, 4-bromo-1,3-pehnylenediamine, 2,5-dichloro-1,4-phenylenediamine, 5-nitro-1,3-phenylenediamine and 3-dimethoxy-4-aminoaniline; aromatic diamines having nuclear substituted electron-withdrawing group (for example, halogens such as Cl, Br, I and F; alkoxy group such as methoxy and ethoxy groups; and nitro group) such as 4,4'-diamino-3,3'-dimethyl-5,5'-dibromodiphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl) sulfone, bis(4-amino-3-methoxyphenyl)decane, bis(4-aminophenynsulfide, bis(4-aminophenyl)telluride, bis(4-aminophenyl)selenide, bis(4-amino-3-methoxyphenyl)disulfide, 4,4'-methylenebis(2-iodoaniline), 4,4'-methylenebis(2-bromoaniline), 4,4'-methylenebis(2-fluoroaniline) and 4-aminophenyl-2-chloroaniline; and aromatic diamines having a secondary amino group such as 4,4'-di(methylamino)diphenylmethane and 1-methyl-2-methylamino-4-aminobenzene [a part or all the primary amino group of the non-substituted aromatic diamine, the aromatic diamine having a nuclear-substituted alkyl group having 1 to 4 carbon atoms and a mixture of isomers thereof with various mixing ratios, and the aromatic diamine having a nuclear-substituted electron-withdrawing group is replaced by a secondary amino group with a lower alkyl group such as methyl and ethyl groups].

Other examples of the diamines include: polyamide polyamines such as low-molecular polyamide polyamine obtained by condensation of a dicarboxylic acid (e.g. dimer acid) with an excess amount of the polyamine (e.g. the alkylenediamine and the polyalkylenepolyamine); and a polyether polyamine such as hydrate of cyanoethylated polyether polyol (e.g. polyalkylene glycol).

Also, an amine compound whose amino group is capped with a ketone compound may be used.

Among these polyurea units, the polyurea unit synthesized from the diamine and the diisocyanate is preferable.

Examples of the diisocyanate and the polyisocyanate having 3 or more valences are similar to those diisocyanates and polyisocyanates having 3 or more valences.

—Vinyl Polymer Unit—

The vinyl polymer unit is a polymer unit that a vinyl monomer is homopolymerized or copolymerized. The vinyl monomer is not particularly restricted and may be appropriately selected according to purpose. Examples thereof include those of (1) to (10) below.

(1) Vinyl Hydrocarbons:

Aliphatic vinyl hydrocarbon: alkenes, e.g. ethylene, propylene, butane, isobutylene, pentene, heptene, diisobutylene, octane, dodecene, octadecene and other α-olefines; alkadiene, e.g. butadiene, isoprene, 1,4-pentadiene, 1,6-hexadiene and 1,7-octadiene.

Alicyclic vinyl hydrocarbon: mono- or di-cycloalkenes and alkadienes, e.g. cyclohexane, (di)cyclopentadiene, vinylcyclohexene and ethylidenebicycloheptene; terpenes, e.g. pinene, limonene and indene.

Aromatic vinyl hydrocarbon: styrene and hydrocarbyl (alkyl, cycloalkyl, aralkyl and/or alkenyl) substituents thereof, e.g. α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene and trivinylbenzene; and vinylnaphthalene.

(2) Vinyl Monomers Including Carboxyl Group and Salt Thereof:

Unsaturated monocarboxylic acid having 3 to 30 carbon atoms, unsaturated dicarboxylic acid and anhydride thereof and monoalkyl ester (1 to 24 carbon atoms) thereof, e.g. vinyl monomer including carboxyl group such as (meth)acrylic acid, maleic acid, maleic anhydride, maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester and cinnamic acid.

(3) Vinyl Monomers Including Sulfonic Group, Vinyl Sulfuric Acid Monoesters, and Salts Thereof:

Alkene sulfonic acids having 2 to 14 carbon atoms, e.g. vinylsulfonic acid, (meth)allylsulfonic acid, methylvinylsulfonic acid and styrenesulfonic acid; alkyl derivatives thereof having 2 to 24 carbon atoms, e.g. α-methylstyrene sulfonic acid; sulfo(hydroxyl)alkyl-(meth)acrylate or (meth)acrylamide, e.g. sulfopropyl (meth) acrylate, 2-hydroxy-3-(meth)acryloxypropyl sulfonic acid, 2-(meth)acryloylamino-2,2-dimethylethane sulfonic acid, 2-(meth)acryloyloxyethane sulfonic acid, 3-(meth)acryloyloxy-2-hydroxypropane sulfonic acid, 2-(meth)acrylamide-2-methylpropane sulfonic acid, 3-(meth)acrylamide-2-hydroxypropane sulfonic acid, alkylarylsulfosuccinic acid (3 to 18 carbon atoms in the alkyl group), sulfate ester of polyoxyalkylene mono(meth)acrylate (n=2 to 30) (ethylene, propylene, butylene: alone, random or block) [e.g. sulfate ester of polyoxypropylene monomethacrylate (n=5 to 15)], and sulfuric ester of polyoxyethylene polycyclic phenyl ether.

(4) Vinyl Monomers Including Phosphate Group and Salt Thereof.

(Meth)acryloyloxy alkyl phosphate monoester, e.g. 2-hydroxyethyl (meth)acryloyl phosphate, phenyl-2-acryloyloxyethyl phosphate, (meth)acryloyloxyalkyl phosphoric acid (1 to 24 carbon atoms in the alkyl group) (e.g. 2-acryloyloxyethyl phosphoric acid); and salts thereof.

Here, examples of the salts of (2) to (4) above include alkali metal salts (e.g. sodium salt and potassium salt), alkaline earth metal salts (e.g. calcium salt and magnesium salt), ammonium salt, amine salt and quaternary ammonium salt.

(5) Vinyl Monomers Including Hydroxyl Group:

Hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-buten-3-ol, 2-butene-1-ol, 2-butene-1,4-diol, propargyl alcohol, 2-hydroxyethyl propenyl ether and sucrose allyl ether.

(6) Vinyl Monomers Including Nitrogen:

Vinyl monomer including amino group: aminoethyl (meth) acrylate, dimethylaminoethyl (meth) acrylate, diethylaminoethyl (meth)acrylate, t-butylaminoethyl methacrylate, N-aminoethyl (meth)acrylamide, (meth)arylamine, morpholinoethyl (meth)acrylate, 4-vinylpyridine, 2-vinylpyridine, crotylamine, N,N-dimethylaminostyrene, methyl-α-acetamino acrylate, vinyl imidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, and salts thereof.

Vinyl monomer including amide group: (meth)acrylamide, N-methyl(meth)acrylamide, N-butylacrylamide, diacetoneacrylamide, N-methylol(meth)acrylamide, N,N-methylenebis(meth)acrylamide, cinnamic acid amide, N,N-dimethylacrylamide, N,N-dibenzylacrylamide, methacrylformamide, N-methyl-N-vinylacetamide and N-vinylpyrrolidone.

Vinyl monomer including nitrile group: (meth)acrylonitorile, cyanostyrene and cyanoacrylate.

Vinyl monomer including quaternary ammonium cation group quaternarized vinyl monomer including tertiary amine group such as dimethylaminoethyl (meth) acrylate, diethylaminoethyl (meth) acrylate, dimethylaminoethyl (meth) acrylamide, diethylaminoethyl (meth)acrylamide and diarylamine (quaternarized product using quaternarizing agent such as methyl chloride, dimethyl sulfate, benzyl chloride and dimethyl carbonate).

Vinyl monomer including nitro group: nitrostyrene.

(7) Vinyl Monomers Including Epoxy Group:

Glycidyl (meth)acrylate, tetrahydrofurfuryl (meth)acrylate and p-vinylphenyl phenyl oxide.

(8) Vinyl Esters, Vinyl (Thio)Ethers, Vinyl Ketones, Vinyl Sulfones:

Vinyl ester: vinyl acetate, vinyl propionate, vinyl butyrate, diallyl phthalate, diallyl adipate, isopropenyl acetate, vinyl methacrylate, methyl-4-vinylbenzoate, cyclohexyl methacrylate, benzyl methacrylate, phenyl (meth) acrylate, vinyl methoxyacetate, vinyl benzoate, ethyl-α-ethoxy acrylate, alkyl (meth)acrylate having 1 to 50 carbon atoms [e.g. methyl (meth)acrylate, ethyl (meth)acrylate, propyl (meth)acrylate, butyl (meth) acrylate, 2-ethylhexyl (meth)acrylate, dodecyl (meth) acrylate, hexadecyl (meth)acrylate, heptadecyl (meth) acrylate and eicosyl (meth)acrylate], dialkyl fumarate (two alkyl groups are a straight-chain, a branched-chain or an alicyclic group having 2 to 8 carbon atoms), dialkyl maleate (two alkyl groups are a straight-chain, a branched-chain or an alicyclic group having 2 to 8 carbon atoms), poly(meth)allyloxyalkanes [e.g. diallyloxyethane, triallyloxyethane, tetraallyloxyethane, tetraallyloxypropane, tetraallyloxybutane and tetramethallyloxyethane], vinyl monomer having polyalkylene glycol chain [e.g. polyethylene glycol (molecular weight of 300) mono(meth)acrylate, polypropylene glycol (molecular weight of 500) monoacrylate, methyl alcohol ethylene oxide 10-mole adduct of (meth)acrylate, lauryl alcohol ethylene oxide 30-mole adduct of (meth)acrylate], and poly (meth)acrylates [poly(meth)acrylates of polyhydric alcohols: ethylene glycol di(meth)acrylate, propylene glycol di(meth) acrylate, neopentyl glycol di(meth)acrylate, trimethylolpropane tri(meth)acrylate and polyethylene glycol di(meth)acrylate].

Vinyl (thio)ether: vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl-2-ethyl mercaptoethyl ether, acetoxystyrene and phenoxy styrene.

Vinyl ketone: vinyl methyl ketone, vinyl ethyl ketone, vinyl phenyl ketone.

Vinyl sulfones: divinyl sulfide, p-vinyldiphenyl sulfide, vinyl ethyl sulfide, vinyl ethyl sulfone, divinyl sulfone and divinyl sulfoxide.

(9) Other Vinyl Monomers:

Isocyanatoethyl (meth)acrylate and m-isopropenyl-α,α'-dimethylbenzyl isocyanate.

(10) Vinyl Monomers Including Elemental Fluorine Atom:

4-Fluorostyrene, 2,3,5,6-tetrafluorostyrene, pentafluorophenyl (meth)acrylate, pentafluorobenzyl (meth) acrylate, perfluorocyclohexyl (meth)acrylate, perfluorocyclohexylmethyl (meth)acrylate, 2,2,2-trifluoroethyl (meth) acrylate, 2,2,3,3-tetrafluoropropyl (meth) acrylate, 1H,1H,4H-hexafluorobutyl (meth)acrylate, 1H,1H,5H-octafluoropentyl (meth)acrylate, 1H,1H,7H-dodecafluoroheptyl (meth)acrylate, perfluorooctyl (meth)acrylate, 2-perfluorooctylethyl (meth)acrylate, heptadecafluorodecyl (meth)acrylate, trihydroperfluoroundecyl (meth)acrylate, perfluoronorbornylmethyl (meth)acrylate, 1H-perfluoroisobornyl (meth)acrylate, 2-(N-butylperfluorooctane sulfonamide)ethyl (meth)acrylate and corresponding compounds derived from α-fluoroacrylic acid, bis-hexafluoroisopropyl itaconate, bis-hexafluoroisopropyl maleate, bis-perfluorooctyl itaconate, bis-perfluorooctyl maleate, bis-trifluoroethyl itaconate and bis-trifluoroethyl maleate, vinylheptafluoro butyrate, vinylperfluoroheptanoate, vinylperfluoronanoate and vinylperfluoro octanoate.

<<<Crystalline Resin Including Urea Bond>>>

The crystalline resin preferably includes a crystalline resin including a urea bond in a main chain thereof. According to Solubility Parameter Values (Polymer handbook 4th Ed), a urea bond has a cohesive energy of 50,230 [J/mol], which is about twice as large as a cohesive energy of a urethane bond (26,370 [J/mol]). Thus, an effect of improving toughness or resistance to offset of a toner during fixing may be expected even with a small amount.

Examples of a method for preparing the crystalline resin having a urea bond include: a method to react a polyisocyanate compound and a polyamine compound; and a method to react a polyisocyanate compound with water and reacting an amino group generated by a hydrolysis of the isocyanate with a remaining isocyanate group. Also, when the crystalline resin including a urea bond is prepared, the resin may be designed with higher degree of freedom by reacting a polyol compound simultaneously in addition to the above compounds.

—Polyisocyanate—

As the polyisocyanate, in addition to the diisocyanate and the polyisocyanate having 3 or more valences (hereinafter, also referred to as a low-molecular weight polyisocyanate), a polymer having an isocyanate group at an end or a side chain thereof (hereinafter, also referred to as a prepolymer) may also be used.

Examples of a method for preparing the prepolymer include: a method for obtaining a polyurea prepolymer having an isocyanate group at an end thereof by reacting the low-molecular weight polyisocyanate and a polyamine compound described hereinafter with an excess amount of the isocyanate; and a method for obtaining a prepolymer having an isocyanate group at an end thereof by reacting the low-molecular weight polyisocyanate and the polyol compound with an excess amount of the isocyanate. The prepolymers obtained by these methods may be used alone, or two or more types of the prepolymers obtained by the same method or two or more types of the prepolymers obtained by the two methods may be used in combination. Moreover, the prepolymer and one type or various types of the low-molecular weight polyisocyanates may be used in combination.

A use ratio of the polyisocyanate, as an equivalent ratio [NCO]/[NH$_2$] of the isocyanate group [NCO] and the amino group [NH$_2$] in the polyamine or as an equivalent ratio [NCO]/[OH] of the isocyanate group [NCO] and the hydroxyl group [OH] in the polyol, is usually 5/1 to 1.01/1, preferably 4/1 to 1.2/1, and more preferably 2.5/1 to 1.5/1.

When the molar ratio of [NCO] exceeds 5, urethane bonds and urea bonds are present in excess. When a resin obtained in the end is used as a binder resin for a toner, excessively high elasticity in a molten state may degrade fixing property. When the molar ratio of [NCO] is less than 1.01, too high degree of polymerization increases the molecular weight of the prepolymer, which is not preferable because it is difficult to mix it with the other materials for manufacturing a toner or because excessively high elasticity in a molten state may degrade fixing property.

—Polyamine—

Examples of the polyamine include the diamines and the polyamines having three or more valences described above.

—Polyol—

As the polyol, in addition to the polyol having 3 to 8 valences or more (hereinafter referred to also as a low-molecular weight polyol) described above, a polymer having a hydroxyl group at an end or a side chain thereof (hereinafter referred to as a high-molecular weight polyol) may be used.

Examples of a method for preparing the high-molecular weight polyol include: a method to obtain polyurethane having a hydroxyl group at an end thereof by reacting a low-molecular weight polyisocyanate and a low-molecular weight polyol with an excess amount of hydroxyl group; and a method to obtain polyester having a hydroxyl group at an end thereof by reacting a polycarboxylic acid and a low-molecular weight polyol compound with an excess amount of hydroxyl group.

For preparing the polyurethane or the polyester having a hydroxyl group at an end thereof, a ratio of the low-molecular weight polyol to the low-molecular weight polyisocyanate [OH]/[NCO] or a ratio of the low-molecular weight polyol to the polycarboxylic acid [OH]/[COOH] is usually 2/1 to 1/1, preferably 1.5/1 to 1/1, and more preferably 1.3/1 to 1.02/1.

When the molar ratio of the hydroxyl group exceeds 2, polymerization reaction does not proceed, and a desired high-molecular weight polyol is not obtained. When it is below 1.02, the degree of polymerization increases, causing too much increase in the molecular weight of a obtained high-molecular weight polyol. This is not preferable because it is difficult to mix it with the other materials for manufacturing a toner or because excessively high modulus of elasticity in a molten state may degrade fixing property.

—Polycarboxylic Acid—

Examples of the polycarboxylic acid include the dicarboxylic acid and the polycarboxylic acid having 3 to 6 valences or more described above.

In order for the obtained resin having a urea bond to have crystallinity, a polymer unit having crystallinity may be introduced to a main chain thereof. Examples of the crystalline polymer unit having a favorable melting point as a binder resin for a toner include the crystalline polyester unit and a long-chain alkyl ester unit of polyacrylic acid and methacrylic acid described above. The crystalline polymer unit is preferable since it enables easy preparation of a resin with terminal alcohol and, as a polyol compound, easy introduction to the resin having a urea bond.

Examples of the crystalline polyester unit include a polycondensation polyester unit, a lactone ring-opening polymerization product and a polyhydroxycarboxylic acid synthesized from a polyol and a polycarboxylic acid. Among these, a polycondensation polyester unit of diol and dicarboxylic acid is preferable in view of developing crystallinity.

As the diol, diols exemplified for the polyol described above may be used. Among them, the aliphatic diol having 2 to 36 chain carbon atoms is preferable, and the straight-chain aliphatic diol is more preferable. These may be used alone or in combination of two or more. Among these, ethylene glycol, 1,3-propanediol, 1,4-butanediol, 1,6-hexanediol, 1,9-nonanediol and 1,10-decanediol are preferable considering easy availability.

A content of the straight-chain aliphatic diol with respect to the whole diol is preferably 80% by mole or greater, and more preferably 90% by mole or greater. The amount is 80% by mole or greater is preferable since both low-temperature fixing property and heat-resistant storage stability may be favorably achieved and the resin tends to have improved hardness.

As the dicarboxylic acid, those dicarboxylic acids exemplified for the polycarboxylic acid may be used. Among these, the straight-chain dicarboxylic acid is more preferable.

Among the dicarboxylic acids, the aliphatic dicarboxylic acid alone (preferably adipic acid, sebacic acid or dodecane dicarboxylic acid) is particularly preferable. Similarly, it is preferable that the aliphatic dicarboxylic acid and the aromatic dicarboxylic acid (preferably terephthalic acid, isophthalic acid and t-butylisophthalic acid; and lower alkyl esters of these aromatic dicarboxylic acids) are copolymerized. An amount of copolymerization of the aromatic dicarboxylic acid is preferably 20% by mole or less.

[Introduction of Crystalline Resin Having Urea Bond to Toner]

A toner may be obtained by using a resin in which a urea bond is formed beforehand as a binder resin, which is mixed with toner constituting materials other than the binder resin such as colorant, releasing agent and charge controlling agent and granulated. The urea bond may be formed by mixing a polyisocyanate compound and a polyamine compound and/or water, and other toner constituting materials other than the binder resin such as colorant, releasing agent and charge controlling agent according to necessity. Especially, use of the polyisocyanate compound as a prepolymer is preferable since a crystalline resin having a urea bond and a high-molecular weight may be introduced uniformly in the toner, the toner has uniform thermal properties and charging property and the toner may achieve both fixing property and stress resistance. Further, as the prepolymer, a prepolymer obtained by reacting a low-molecular weight polyisocyanate and a polyol compound with an excess amount of the isocyanate is preferable since it may reduce viscoelasticity. As the polyol compound, polyester having hydroxyl group at an end thereof obtained by reacting a polycarboxylic acid and a low-molecular polyol compound with an excess amount of hydroxyl group is preferable since thermal properties suitable for the toner may be easily obtained. Moreover, polyester consisting of a crystalline polyester unit is preferable since a high molecular weight component in the toner has sharp melt property, resulting in excellent low-temperature fixing property.

Also, when the toner of the present invention is obtained by granulation in an aqueous medium, the urea bond may be formed under mild conditions because water as the dispersing medium reacts with the polyisocyanate compound.

The crystalline resin may be used alone or in combination of two or more. Also, the crystalline resin may be used in combination with another crystalline resin having a different weight-average molecular weight. It is preferable to include at least a first crystalline resin and a second crystalline resin having a weight-average molecular weight greater than that of the first crystalline resin since both superior low-temperature fixing property and heat-resistant storage stability may be obtained.

In view of achieving both low-temperature fixing property and heat-resistant storage stability, the first crystalline resin has a weight-average molecular weight (Mw1) of preferably 10,000 to 40,000, more preferably 15,000 to 35,000 and particularly preferably 20,000 to 30,000. The toner with Mw1 of less than 10,000 tends to have degraded heat-resistant storage stability, and the toner with Mw1 exceeding 40,000 tends to have degraded low-temperature fixing property, which are not preferable.

In view of achieving both low-temperature fixing property and heat-resistant storage stability, the second crystalline resin has a weight-average molecular weight (Mw2) of preferably 40,000 to 300,000, and particularly preferably 50,000 to 150,000. The toner having the Mw of less than 40,000 tends to have degraded hot-offset resistance, and the toner having the Mw exceeding 300,000 tends to have degraded low-temperature fixing property since the toner does not sufficiently melt in fixing particularly at a low temperature, easily causing peeling of images, which are not preferable.

A difference (Mw2−Mw1) between the weight-average molecular weight of the first crystalline resin (Mw1) and the weight-average molecular weight of the second crystalline resin (Mw2) is not particularly restricted and may be appropriately selected according to purpose. It is preferably 5,000 or greater, and more preferably 10,000 or greater. The difference of less than 5,000 is not preferable since the toner tends to have a narrow fixing range.

A mass ratio [(1)/(2)] of the first crystalline resin (1) and the second crystalline resin (2) is not particularly restricted and may be appropriately selected according to purpose. It is preferably 95/5 to 70/30. The toner having the ratio exceeding 95/5 tends to have degraded hot-offset resistance, and the toner having the ratio of less than 70/30 tends to have degraded low-temperature fixing property, which are not preferable.

The second crystalline resin may also be obtained in a process of manufacturing a toner by reacting a crystalline resin precursor having a functional group reactive with an active hydrogen group at an end thereof with a resin having an active hydrogen group or a compound such as crosslinking agent and elongating agent having an active hydrogen group so as to increase the molecular weight.

The crystalline resin precursor may be obtained by reacting the crystalline polyester resin, urethane-modified crystalline polyester resin, urea-modified crystalline polyester resin, crystalline polyurethane resin or a crystalline polyurea resin with a compound having a functional group reactive with an active hydrogen group.

The compound having a functional group reactive with an active hydrogen group is not particularly restricted and may be appropriately selected according to purpose. Examples of the functional group include an isocyanate group, an epoxy group, carboxylic acid and an acid chloride group. Among these, an isocyanate group is preferable in view of reactivity and stability. Examples of the compound having an isocyanate group include the diisocyanate components.

When the crystalline polyester resin is reacted with the diisocyanate component to obtain the crystalline resin precursor, it is preferable to use a hydroxyl group-containing crystalline polyester resin having a hydroxyl group at an end thereof as the crystalline polyester resin. The hydroxyl group-containing crystalline polyester resin may be obtained by reacting a diol and dicarboxylic acid with a ratio of the diol component and the dicarboxylic acid component as an equivalent ratio [OH]/[COOH] of the hydroxyl group [OH] to the carboxyl group [COOH] of preferably 2/1 to 1/1, more preferably 1.5/1 to 1/1, and particularly preferably 1.3/1 to 1.02/1.

Regarding a used amount of the compound having a functional group reactive with an active hydrogen group, when the crystalline resin precursor is obtained by reacting the hydroxyl group-containing crystalline polyester resin with a diisocyanate component, a ratio of the diisocyanate component, as an equivalent ratio [NCO]/[OH] of the diisocyanate group [NCO] to the hydroxyl group [OH] of the hydroxyl group-containing crystalline polyester resin is preferably 5/1 to 1/1, more preferably 4/1 to 1.2/1 and particularly preferably 2.5/1 to 1.5/1. In the cases of crystalline resin precursors having other skeletons or terminal groups, a ratio is similar only with different constitutional components.

The resin having an active hydrogen group and the compound such as crosslinking agent and elongation agent having an active hydrogen group are not particularly restricted and may be appropriately selected according to purpose. Examples thereof include resins and compounds having a hydroxyl group (alcoholic hydroxyl group and phenolic hydroxyl group), an amino group, a carboxyl group or a mercapto group for a case where the functional group reactive with the active hydrogen group is an isocyanate group. Among these, water and amines are particularly preferable.

Also, the second crystalline resin is obtained preferably by using a modified crystalline resin including an isocyanate group at an end thereof as the crystalline resin precursor and reacting it with a compound having an active hydrogen group for elongation. In this case, the reaction of the crystalline resin precursor and the compound having an active hydrogen group is preferably carried out in a process of manufacturing a toner. Thereby, the crystalline resin having a large weight-average molecular weight may be uniformly dispersed in the toner, and variation in the properties among toner particles may be suppressed.

Further, the first crystalline resin is preferably κ crystalline resin including a urethane bond or a urea bond or both thereof in a main chain thereof, and the second crystalline resin is preferably κ crystalline resin obtained by reacting the crystalline resin precursor as a modification of the first crystalline resin with a compound having an active hydrogen group for elongation. When the first crystalline resin and the second crystalline resin have similar compositions and structures, these two different binder resins may be more uniformly dispersed in the toner, and as a result variation in the properties among toner particles may be suppressed.

As the binder resin, a combination of the crystalline resin and a non-crystalline resin may be used, and it is preferable that the crystalline resin is a main component of the binder resin.

<<Non-Crystalline Resin>>

The non-crystalline resin is not particularly restricted as long as it is non-crystalline, and it may be appropriately selected according to purpose. Examples thereof include: a homopolymer of styrene and a substitution product thereof such as polystyrene and polyvinyltoluene; a styrene copolymer such as styrene-methyl acrylate copolymer, styrene-methacrylic acid copolymer, styrene-methyl methacrylate copolymer, styrene-butyl methacrylate copolymer, styrene-acrylonitrile copolymer, styrene-vinyl methyl ether copolymer, styrene-vinyl methyl ketone copolymer, styrene-butadiene copolymer and styrene-maleic acid ester copolymer; a polymethyl methacrylate resin, a polybutyl methacrylate resin, a polyvinyl acetate resin, a polyethylene resin, a polyester resin, a polyurethane resin, an epoxy resin, a polyvinyl butyral resin, a polyacrylic resin, a rosin resin, a modified rosin resin, and these resins modified to have a functional group reactive with an active hydrogen group. These may be used alone or in combination of two or more.

A content of the non-crystalline resin in the binder resin is not particularly restricted and may be appropriately selected according to purpose.

<Colorant>

A colorant used for a toner of the present invention is not particularly restricted and may be appropriately selected from heretofore known colorants according to purpose.

A color of the colorant of the toner is not particularly restricted and may be appropriately selected according to purpose. It may be at least one type selected from black, cyan, magenta and yellow. A toner of respective color may be obtained by appropriately selecting the type of the colorant, and it is preferably κ color toner.

Examples of a black colorant include: carbon blacks (C.I. Pigment Black 7) such as furnace black, lamp black, acetylene black and channel black; metals such as copper, iron (C.I. Pigment Black 11), and titanium oxide; and organic pigments such as aniline black (C.I. Pigment Black 1).

Examples of a magenta colorant include: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:1, 49, 50, 51, 52, 53, 53:1, 54, 55, 57, 57:1, 58, 60, 63, 64, 68, 81, 83, 87, 88, 89, 90, 112, 114, 122, 123, 150, 163, 177, 179, 184, 202, 206, 207, 209, 211, 269; C.I. Pigment Violet 19; and C. I. Vat Red 1, 2, 10, 13, 15, 23, 29, 35.

Examples of a cyan colorant include: C. I. Pigment Blue 2, 3, 15, 15:1, 15:2, 15:3, 15:4, 15:6, 16, 17, 60; C.I. Vat Blue 6; C.I. Acid Blue 45, copper phthalocyanine pigment with its phthalocyanine skeleton substituted with 1 to 5 phthalimidomethyl groups, Green 7 and Green 36.

Examples of a yellow colorant include: C. I. Pigment Yellow 1, 2, 3, 4, 5, 6, 7, 10, 11, 12, 13, 14, 15, 16, 17, 23, 55, 65, 73, 74, 83, 97, 110, 139, 151, 154, 155, 180, 185; C. I. Vat Yellow 1, 3, 20, and Orange 36.

A content of the colorant in the toner is preferably 1% by mass to 15% by mass, and more preferably 3% by mass to 10% by mass. When the content is less than 1% by mass, coloring strength of the toner may degrade. When it exceeds 15% by mass, the pigment is poorly dispersed in the toner, which may result in decreased coloring strength and decreased electrical properties.

The colorant may be used as a masterbatch as a composite of the colorant and a resin. Such a resin is not particularly restricted, but it is preferable to use a binder resin of the present invention or a resin having a similar structure to a binder resin of the present invention in view of compatibility with the binder resin of the present invention.

The masterbatch may be manufactured by mixing or kneading the resin and the colorant with an application of high shear force. To enhance an interaction between the colorant and the resin, an organic solvent is preferably added. Also, a so-called flushing method is favorable since a wet cake of the colorant may be used as it is, without necessity of drying. The flushing method is a method of mixing or kneading an aqueous paste of the colorant including water with a resin and an organic medium to remove the water and the organic medium by transferring the colorant to the resin. For mixing or kneading, for example, a high shear dispersing apparatus such as three-roll mill may be used.

<Releasing Agent>

The releasing agent is not particularly restricted and may be appropriately selected according to purpose. Examples thereof include waxes such as wax including a carbonyl group, polyolefin wax and long-chain hydrocarbon. These may be used alone or in combination of two ore more. Among these, a wax including a carbonyl group is preferable.

Examples of the wax including a carbonyl group include polyalkanoic acid ester, polyalkanol ester, polyalkanoic acid amide, polyalkyl amide and dialkyl ketone.

Examples of the polyalkanoic acid ester include carnauba wax, montan wax, trimethylolpropane tribehenate, pentaerythritol tetra behenate, pentaerythritol diacetate dibehenate, glycerin tribehenate and 1,18-octadecanediol distearate.

Examples of the polyalkanol ester include trimellitic acid tristearyl and distearyl maleate.

Examples of the polyalkanoic acid amide include dibehenyl amide.

Examples of the polyalkyl amide include trimellitic acid tristearyl amide.

Examples of the dialkyl ketone include distearyl ketone.

Among these waxes including a carbonyl group, a polylalkanoic acid ester is particularly preferable.

Examples of the polyolefin wax include polyethylene wax and polypropylene wax.

Examples of the long-chain hydrocarbon include paraffin wax and Sasol wax.

A melting point of the releasing agent is not particularly restricted and may be appropriately selected according to purpose. It is preferably 50° C. to 100° C., and more preferably 60° C. to 90° C. The melting point of less than 50° C. may adversely affect heat-resistant storage stability, and the melting point exceeding 100° C. may cause cold offset during low-temperature fixing.

The melting point of the releasing agent may be measured using a differential scanning calorimeter (TA-60WS and DSC-60 (manufactured by Shimadzu Corporation)), for example. That is, first, 5.0 mg of the releasing agent is placed in a sample container made of aluminum, and the sample container is placed on a holder unit and set in an electric furnace. Next, it is heated from 0° C. to 150° C. at a heating rate of 10° C./min in a nitrogen atmosphere. Thereafter, it is cooled from 150° C. to 0° C. at a cooling rate of 10° C./min and then heated from 0° C. to 150° C. at a heating rate of 10° C./min, and a DSC curve is measured. From the obtained DSC curve, a maximum peak temperature of heat of fusion in the second temperature increase may be obtained as the melting point using an analysis program in the DSC-60 system.

A melt viscosity of the releasing agent is preferably 5 mPa sec to 100 mPa sec, more preferably 5 mPa sec to 50 mPa sec, and particularly preferably 5 mPa-sec to 20 mPa sec. The melt viscosity of less than 5 mPa sec may degrade releasing property, and the melt viscosity exceeding 100 mPa sec may degrade hot-offset resistance and releasing property at a low temperature, which are not preferable.

A content of the releasing agent in the toner is not particularly restricted and may be appropriately selected according to purpose. It is preferably 1% by mass to 20% by mass, and more preferably 3% by mass to 10% by mass. The content of less than 1% by mass tends to degrade hot-offset resistance, and the content exceeding 20% by mass tends to degrade heat-resistant storage stability, charging property, transfer property and stress resistance, which are not preferable.

<Other Components>

Examples of the other components include a charge controlling agent, an external additive, a fluidity improving agent, a cleanability improving agent and a magnetic material.

<<Charge Controlling Agent>>

It is also possible to include a charge controlling agent in a toner according to necessity to impart adequate charging ability to the toner.

As the charge controlling agent, any of heretofore known charge controlling agent may be used. Since a color tone may change when a colored material is used, the charge controlling agent is preferably close to white or colorless. Examples thereof include triphenylmethane dyes, molybdic acid chelate pigments, rhodamine dyes, alkoxy amine, quaternary ammonium salt (including fluorine-modified quaternary ammonium salts), alkyl amide, elemental phosphorus or its compounds, elemental tungsten or its compounds, fluorine surfactants, metal salts of salicylic acid and metal salts of salicylic acid derivatives. These may be used alone or in combination of two or more.

A content of the charge controlling agent is determined by a toner manufacturing method, including types of the binder resin and a dispersing method, and it is not limited unambiguously. Nonetheless, it is preferably 0.01% by mass to 5% by mass, and more preferably 0.02% by mass to 2% by mass with respect to the binder resin. When the content exceeds 5% by mass, charging property of the toner is too large, thereby weakening an effect of the charge controlling agent, and an electrostatic attraction force with a developing roller increases, resulting in decreased fluidity of a developer and decreased image density. When the content is less than 0.01% by mass, charge rising property and charge amount are insufficient, which may affect a toner image.

<<External Additive>>

Various external additives may be added to the toner of the present invention for the purpose of fluidity improvement, charge amount adjustment and electric property adjustment. The external additives are not particularly restricted and may be appropriately selected according to purpose. Examples thereof include: silica particles, hydrophobized silica particles and fatty acid metal salt (e.g. zinc stearate and aluminum stearate); and metal oxides (e.g. titania, alumina, tin oxide and antimony oxide) or hydrophobized products thereof. Among these, hydrophobized silica particles, titania and hydrophobized titania particles are preferable.

Examples of the hydrophobized silica particles include: HDK H2000, HDK H2000/4, HDK H2050EP, HVK21 and HDK H1303 (manufactured by Clariant Corporation); and R972, R974, RX200, RY200, R202, R805 and R812 (manufactured by Nippon Aerosil Co., Ltd.). Examples of the titania particles include: P-25 (manufactured by Nippon Aerosil Co., Ltd.); STT-30 and STT-65C-S (manufactured by Titan Kogyo Co., Ltd.); TAF-140 (manufactured by Fuji Titanium Industry Co., Ltd.); and MT-150 W, MT-500B, MT-600B and MT-150A (manufactured by Tayca Corporation). Examples of the hydrophobized titanium oxide particles include: T-805 (manufactured by Nippon Aerosil Co., Ltd.); STT-30A, STT-65S-S (manufactured by Titan Kogyo Co., Ltd.); TAF-500T, TAF-1500T (manufactured by Fuji Titanium Industry Co., Ltd.); MT-100 S, MT-100T (manufactured by Tayca Corporation); and IT-S (manufactured by Ishihara Sangyo Kaisha, Ltd.).

The hydrophobized silica particles, the hydrophobized titania particles and the hydrophobized alumina particles may be obtained by treating hydrophilic particles with a silane coupling agent such as methyltrimethoxysilane, methyltriethoxysilane and octyltrimethoxysilane. Examples of the hydrophobizing agent include a silane coupling agent such as dialkyl dihalogenated silane, trialkyl halogenated silane, alkyl trihalogenated silane and hexaalkyl disilazane, a silylating agent, a silane coupling agent having a fluorinated alkyl group, organic titanate coupling agent, aluminum coupling agent, silicone oil and silicone varnish.

Primary particles of the inorganic particles have an average particle diameter of preferably 1 nm to 100 nm, and more preferably 3 nm to 70 nm. When the average particle diameter is less than 1 nm, the inorganic particles are embedded in the toner, and their functions may not be effectively exhibited. When it exceeds 100 nm, they may ununiformly scratch a surface of an electrostatic latent image bearing member. As the external additives, it is possible to use inorganic particles and hydrophobized inorganic particles may be used in combination, and it is preferable to include at least two types of hydrophobized inorganic particles having an average particle diameter of primary particles thereof of 20 nm or less and at least one type of inorganic particles having an average particle diameter of 30 nm or greater. Also, the inorganic particles preferably have a BET specific surface area of 20 $m^2/g$ to 500 $m^2/g$.

An added amount of the external additives is preferably 0.1% by mass to 5% by mass, and more preferably 0.3% by mass to 3% by mass.

Resin particles may also be added as an external additive. Examples of the resin particles include: polystyrene obtained by soap-free emulsion polymerization, suspension polymerization or dispersion polymerization; copolymers of methacrylic acid ester or acrylic acid ester; polycondensation system such as silicone, benzoguanamine and nylon; and polymer particles of a thermosetting resin. By using these resin particles in combination, charging property of the toner may be enhanced, oppositely charged toner may be reduced, and background smear may be reduced. An added amount of the resin particles with respect to the toner is preferably 0.01% by mass to 5% by mass, and more preferably 0.1% by mass to 2% by mass.

<<Fluidity Improving Agent>>

When the toner particles are surface treated with the fluidity improving agent, hydrophobicity of the surface of the toner particles improves, and decrease in fluidity property and charging property may be suppressed even under a high-humidity environment.

Examples of the fluidity improving agent include a silane coupling agent, a silylating agent, a silane coupling agent including a fluorinated alkyl group, an organic titanate coupling agent, an aluminum coupling agent, silicone oil and modified silicone oil.

<<Cleanability Improving Agent>>

When the cleanability improving agent is added to the toner, a developer remaining on a photoconductor or a primary transfer medium after transfer may be easily removed.

Examples of the cleanability improving agent include: a metal salt of a fatty acid such as stearic acid, including zinc stearate and calcium stearate; and resin particles obtained by soap-free emulsion polymerization of methyl methacrylate particles or polystyrene particles. The resin particles preferably have narrow particle size distribution and a volume-average particle diameter of 0.01 µm to 1 µm.

<<Magnetic Material>>

The magnetic material is not particularly restricted and may be appropriately selected according to purpose. Examples thereof include iron powder, magnetite and ferrite. Among these, white magnetic material is preferable in view of color.

[Weight-Average Molecular Weight]

The weight-average molecular weight of the tetrahydrofuran (THF) soluble content of the toner is not particularly restricted as long as it is 20,000 to 60,000, and it may be appropriately selected according to purpose. It is preferably 30,000 to 50,000, and more preferably 35,000 to 45,000. The weight-average molecular weight exceeding 60,000 is not preferable since the binder resin as a whole having a too high molecular weight degrades fixing property, resulting in low gloss and missing image after fixing due to external stress. The weight-average molecular weight of less than 20,000 is also not preferable since internal cohesion during toner melting decreases too much even though many high-molecular weight components exist, resulting in hot offset and paper winding on a fixing member.

[Amount of High-Molecular Weight Component]

The tetrahydrofuran soluble content of the toner is not particularly restricted as long as it includes 5.0% or more as a peak area of a component having a molecular weight of 100,000 or greater in a molecular weight distribution measured by gel permeation chromatography (GPC), and it may be appropriately selected according to purpose. It includes preferably 7.0% or more, and more preferably 9.0% or more. An upper limit thereof is not particularly restricted and may be appropriately selected according to purpose, and it is preferably 25.0% or less.

By including 5.0% or more the component having a molecular weight of 100,000 or greater, fluidity and viscoelasticity of the toner after melting is less temperature-dependent, and significant difference in the fluidity and the viscoelasticity of the toner during fixing hardly occurs between thin paper in which heat is easily transferred and thick paper in which heat is not easily transferred. Thus, it is possible in a fixing apparatus to fix at a constant temperature and a constant speed. When the content of the component having a molecular weight of 100,000 is less than 5.0%, the fluidity and the viscoelasticity of the toner after melting varies largely depending on a temperature. Thus, in fixing on thin paper, for example, the toner is excessively deformed, causing increase of an area of adhesion to a fixing member. As a result, the toner may not be released well from the fixing member, causing paper wrapping.

Moreover, the tetrahydrofuran soluble content of the toner preferably includes 0.5% or more as the peak area of a component having a molecular weight of 250,000 or greater in a molecular weight distribution measured by gel permeation chromatography (GPC) since it reduces a difference in glossiness between thin paper and thick paper.

In the present invention, a tetrahydrofuran soluble content of a toner as well as a molecular weight distribution and a weight-average molecular weight (Mw) of a resin may be measured using a gel permeation chromatography (GPC) measuring apparatus (e.g. HLC-8220GPC, manufactured by Tosoh Corporation). As a column, TSK-GEL SUPER HZM-H 15 cm in triplicate was used. A resin to be measured is dissolved in tetrahydrofuran (THF) (including a stabilizer, manufactured by Wako Pure Chemical Industries, Ltd.) to form a 0.15-% by mass solution. The solution is filtered using a 0.2-µm filter, and a filtrate thereof is used as a sample. By injecting 100 µL of the THF sample solution in the measuring apparatus, a measurement is taken at a flow rate of 0.35 mL/min in an environment having a temperature of 40° C.

The molecular weight is calculated using a calibration curve formed by monodispersed polystyrene standard samples. As the standard polystyrene samples, SHOWDEX STANDARD series manufactured by Showa Denko K.K. and toluene are used. THF solutions of the following three types of monodispersed polystyrene standard samples are prepared, and measurements are taken with the above conditions, and a calibration curve is created with a retention time of peak top as a light scattering molecular weight of the monodispersed polystyrene standard samples.

Solution A: S-7450: 2.5 mg; S-678: 2.5 mg; S-46.5: 2.5 mg; S-2.90: 2.5 mg; THF: 50 mL Solution B: S-3730: 2.5 mg; S-257: 2.5 mg; S-19.8: 2.5 mg; S-0.580: 2.5 mg; THF: 50 mL Solution C: S-1470: 2.5 mg; S-112: 2.5 mg; S-6.93: 2.5 mg; toluene: 2.5 mg; THF: 50 mL As a detector, an RI (refractive index) detector is used.

A proportion of the component having a molecular weight of 100,000 or greater may be calculated from an intersection of the molecular weight of 100,000 with an integral molecular weight distribution curve by the GPC measurement.

A proportion of the component having a molecular weight of 250,000 or greater may be calculated from an intersection of the molecular weight of 250,000 with an integral molecular weight distribution curve by the GPC measurement.

Examples of a method for obtaining a toner including a binder resin having a molecular weight distribution described above include: a method to use two or more types of resins having different molecular weight distribution in combination; and a method to use a resin whose molecular weight distribution has been controlled during polymerization.

When two or more types of resins having different molecular weight distribution are used in combination, at least two types of resins having a relatively high molecular weight and a relatively low molecular weight are used. As the resin having a high molecular weight; a resin which has a large molecular weight in advance may be used, or a high-molecular weight body may be formed by elongating a modified resin including an isocyanate group at an end thereof in a process of manufacturing the toner. The latter allows the high-molecular weight body to exist uniformly in the toner. Thus, for a manufacturing method including a step of dissolving a binder resin in an organic medium, the latter is preferable since dissolution thereof is easier than the resin having a high molecular weight in advance.

When the resin whose molecular weight distribution is controlled during polymerization is used, as a method for obtaining such a resin, for example, the molecular weight distribution may be widened by adding a small amount of monomer having a different number of functional groups in addition to a bifunctional monomer, provided that a form of polymerization is polycondensation, polyaddition or addition condensation. As the monomer having a different number of functional groups, there are tri- or more functional monomer and a mono-functional monomer. However, use of the tri- or more functional monomer generates a branched structure, and it may be difficult to form a crystalline structure in the case of using a resin having crystallinity. By using the mono-functional monomer, polymerization reaction is terminated by the mono-functional monomer. Thereby, in the case of using two or more types of resins, a low-molecular weight resin is generated while the polymerization reaction proceeds partly to form a high-molecular weight component.

Examples of the mono-functional monomer include a monool, a monocarboxylic acid and a monoamine compound.

Examples of the monool include methanol, ethanol, propanol, isopropanol, butanol, sec-butanol, t-butanol, pentanol, hexanol, heptanol, octanol, 2-ethylhexanol, nonanol, decanol, undecanol, lauryl alcohol, myristyl alcohol, palmityl alcohol, stearyl alcohol, docosanol, eicosanol, phenol and a substitution product thereof, 1-naphtol, 2-naphtol, benzyl alcohol and a substitution product thereof, cyclopentanol, cyclohexanol, adamantanol, and cholesterol and a substitution product thereof.

Examples of the monocarboxylic acid include formic acid, acetic acid, butyric acid, valeric acid, isovaleric acid, caproic acid, 2-ethylhexanoic acid, heptanoic acid, caprylic acid, capric acid, lauric acid, myristic acid, palmitic acid, stearic acid, oleic acid, linoleic acid, behenic acid, cerotic acid, montanic acid, triacontanoic acid, benzoic acid and a substitution product thereof, and benzyl acid and a substitution product thereof.

Examples of the monoamine compound include: an alkyl amine such as methylamine, dimethylamine, ethylamine, diethylamine, propylamine, dipropylamine, butylamine, dibutylamine, hexylamine, octylamine, 2-ethylhexylamine, decylamine, laurylamine, myristyl amine, palmityl amine, stearyl amine and behenyl amine; an amino acid such as glycine, α-alanine, β-alanine, arginine, asparagine, aspartic acid, cysteine, glutamine, glutamic acid, histidine, isoleucine, leucine, lysine, methionine, phenylalanine, proline, serine, threonine, tryptophan, tyrosine and valine; an aromatic amino acid such as aniline, benzylamine, o-anisidine, m-anisidine, p-anisidine, o-toluidine, m-toluidine and p-toluidine.

[Amount of Crystalline Structure [C/(A+C)]]

In a diffraction spectrum of the toner obtained by an x-ray diffraction apparatus, a ratio of (C) integrated intensity of the spectrum derived from a crystalline structure to a sum of the (C) and (A) integrated intensity of the spectrum derived from a non-crystalline structure [C/(A+C)] is not particularly restricted and may be appropriately selected according to purpose. It is preferably 0.13 or greater in view of obtaining both fixing property and heat-resistant storage stability, and it is more preferably 0.20 or greater, further more preferably 0.30 or greater, and particularly preferably 0.45 or greater. When the ratio [C/(A+C)] is less than 0.13, it may be difficult to obtain both low-temperature fixing property and heat-resistant storage stability since the property as a crystalline resin is reduced. The ratio [C/(A+C)] of within the more preferable range is advantageous in obtaining both low-temperature fixing property and heat-resistant storage stability.

In addition, a heretofore known toner, which includes a crystalline resin or a wax to an extent of additives, has this ratio of less than about 0.10.

The ratio [C/(A+C)] is an index indicating an amount of a crystallization site in a toner (an amount of the crystallization site serving as a main component of the toner), and it is an area ratio of a main diffraction peak derived from the crystalline structure of the binder resin to a halo derived from the non-crystalline structure in a diffraction spectrum obtained by an x-ray diffraction measurement.

The x-ray diffraction measurement may be performed using an x-ray diffractometer equipped with a 2-dimensional detector (D8 DISCOVER with GADDS, manufactured by Bruker).

As a capillary for the measurement, a mark tube (Lindemann glass) having a diameter of 0.70 mm is used. A sample is filled to an upper portion of this capillary tube for measurement. Also, tapping is performed when the sample is filled, where the number of tapping is 100.

Detailed measurement conditions are described below.
Tube current: 40 mA
Tube voltage: 40 kV
Goniometer 2θ axis: 20.000°
Goniometer Ω axis: 0.0000°:
Goniometer φ axis: 0.0000°:
Detector distance: 15 cm (wide angle measurement)
Measuring range: 3.2≤2θ(°)≤37.2:
Measurement time: 600 sec A collimator having a pinhole with a diameter of 1 mm was used for an incident optical system. Obtained 2-dimensional data is integrated with a supplied software (at 3.2° to 37.2° in the x-axis) and converted to a 1-dimensional data of a diffraction intensity and 2θ. Based on the obtained x-ray diffraction measurement results, a method for calculating the ratio (C)/((C)+(A)) is explained below.

Figure 1B:
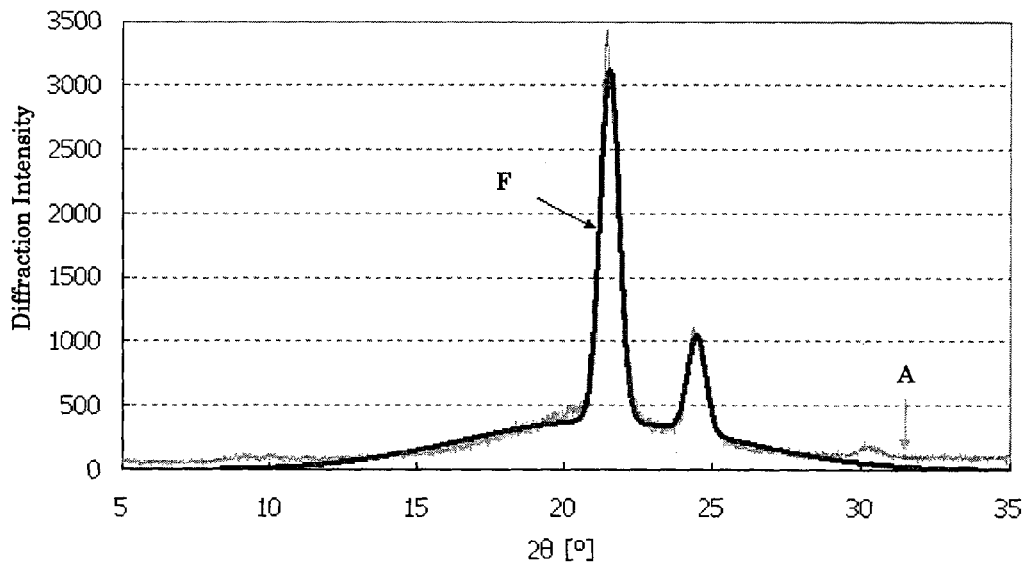
FIG. 1B is a diagram illustrating one example of a diffraction spectrum obtained by an x-ray diffraction measurement.

An example of a diffraction spectrum obtained by an x-ray diffraction measurement is illustrated in FIG. 1A and FIG. 1B. The horizontal axis represents 2θ, the vertical axis represents the x-ray diffraction intensity, and the both are linear axes. In the x-ray diffraction spectrum A in FIG. 1A, there are main peaks at 2θ=21.3° (P1) and 24.2° (P2), halos (h) are observed in a wide range including these two peaks. Here, the main peaks are derived from a crystalline structure while the halos are derived from a non-crystalline structure.

These two main peaks and halos are expressed by a Gaussian functions ($f_{p1}(2\theta)$, $f_{p2}(2\theta)$, $f_h(2\theta)$ denote main peak P1, main peak P2 and halos, respectively):

$$f_{p1}(2\theta)=a_{p1}\exp[-(2\theta-b_{p1})^2/(2c_{p1}^2)] \quad \text{(Formula A(1))}$$

$$f_{p2}(2\theta)=a_{p2}\exp[-(2\theta-b_{p2})^2/(2c_{p2}^2)] \quad \text{(Formula A(2))}$$

$$f_h(2\theta)=a_h\exp[-(2\theta-b_h)^2/(2c_h^2)] \quad \text{(Formula A(3))}$$

A sum of these functions:

$$f(2\theta)=f_{p1}(2\theta)+f_{p2}(2\theta)+f_h(2\theta) \quad \text{(Formula A(4))}$$

is regarded as a fitting function F of the overall x-ray diffraction spectrum A (illustrated in FIG. 1B), with which fitting by a least square method is carried out.

There are 9 fitting variables, namely $a_{p1}$, $b_{p1}$, $C_{p1}$, $a_{p2}$, $b_{p2}$, $C_{p2}$, $a_h$, $b_h$ and $c_h$. As initial values of these variables for fitting, peak locations of the x-ray diffraction are set for $b_{p1}$, $b_{p2}$ and $b_h$ (in the example of FIG. 1A, $b_{p1}$=21.3, $b_{p2}$=24.2, and $b_h$=22.5), and appropriate values are input for the other variables so that the two main peaks and halos coincide as much as possible with the x-ray diffraction spectrum. The fitting may be carried out using the solver of Excel 2003, manufactured by Microsoft Corporation.

From the integrated areas ($S_{p1}$, $S_{p2}$, $S_h$) of the respective Gaussian functions $f_{p1}(2\theta)$, $f_{p2}(2\theta)$ corresponding to the two main peaks (P1, P2) and Gaussian function $f_h(2\theta)$ corresponding to the halos after fitting, the ratio [C/(A+C)] as an index indicating the amount of the crystallization site may be calculated, assuming ($S_{p1}$+$S_{p2}$) is (C) and ($S_h$) is (A).

[Mixed Solution Insoluble Content]

An insoluble content of the toner with respect to a mixed solution of tetrahydrofuran and ethyl acetate (tetrahydrofuran/ethyl acetate=50/50 (mass ratio)) is not particularly restricted and may be appropriately selected according to purpose. It is preferably 5.0% by mass or greater, and more preferably 10.0% by mass or greater. An upper limit thereof is not particularly restricted and may be appropriately selected according to purpose. It is preferably 25.0% by mass or less, and more preferably 20.0% by mass or less. When the insoluble content is less than 5.0% by mass, heat-resistant storage stability may degrade, and offset may occur in fixing, especially in fixing at a high temperature. The insoluble content of within the more preferable range is advantageous for obtaining both low-temperature fixing property and heat-resistant storage stability.

Here, the mixed solution of tetrahydrofuran and ethyl acetate (tetrahydrofuran/ethyl acetate=50/50 (mass ratio)) hardly dissolves a high-molecular weight component in the toner (having a molecular weight of about 20,000 or greater) and easily dissolves a low-molecular weight component having a molecular weight less than that. Thus, it is possible to prepare a sample with increased concentration of high-molecular weight resin component by treating the toner using the above mixed solution.

The insoluble content may be obtained by: adding 0.4 g of toner to 40 g of a mixed solution of tetrahydrofuran (THF) and ethyl acetate (with a mixing ratio of 50:50 as a mass basis), shaking it for 20 minutes, precipitating a non-soluble content by centrifuge, removing a supernatant, and vacuum drying the remaining.

[Ratio of Endothermic Quantity [$\Delta H(H)/\Delta H(T)$]]

A ratio [$\Delta H(H)/\Delta H(T)$] of an endothermic quantity [$\Delta H(T)$, (J/g)] in the differential scanning calorimetry of the toner and an endothermic quantity [$\Delta H(H)$, (J/g)] in the differential scanning calorimetry of the insoluble content to the mixed solvent of tetrahydrofuran and ethyl acetate [tetrahydrofuran/ethyl acetate=50/50 (mass ratio)] is not particularly restricted and may be appropriately selected according to purpose. It is preferably 0.20 to 1.25.

The endothermic quantity may be measured using a differential scanning calorimeter (TA-60WS and DSC-60 (manufactured by Shimadzu Corporation)), for example. A sample subjected to the measurement of the maximum peak temperature of heat of fusion is heated from 20° C. to 150° C. at a heating rate of 10° C./rain, then cooled to 0° C. at a cooling rate of 10° C./min, and again heated at a heating rate of 10° C./min, and an endothermic-exothermic change is measured. The heat flow is plotted against the temperature, and the endothermic quantity in the second temperature increase is evaluated.

The ratio [$\Delta H(H)/\Delta H(T)$] indicate a ratio of the crystalline structure in the high-molecular weight component and the crystalline structure of the entire binder resin.

The high-molecular weight component preferably has a resin structure close to the entire binder resin, and if the binder resin has crystallinity, it is preferable that the high-molecular weight component similarly has crystallinity. On the other hand, when the high-molecular weight component has a structure largely different from the other resin components, the high-molecular weight component easily undergoes layer separation to be in a sea-island state, and contribution to improvements of viscoelasticity and cohesive force to the entire toner may not be expected.

The ratio [$\Delta H(H)/\Delta H(T)$] of within the preferable range is advantageous in terms of uniform charging property since the low-molecular weight component and the high-molecular weight component of the resin in the toner are more uniformly present, resulting in less variation among toner particles.

[Maximum Peak Temperature of Heat of Fusion and Heat of Fusion Quantity]

The maximum peak temperature and the endothermic quantity [$\Delta H(T)$, (J/g)] of the heat of fusion in the second temperature increase measured by a differential scanning calorimeter (DSC) are not particularly restricted and may be appropriately selected according to purpose. The maximum peak temperature and the heat of fusion quantity [$\Delta H(T)$, (J/g)] in the second temperature increase are preferably 50° C. to 70° C. and 30 J/g to 75 J/g, respectively.

The maximum peak temperature is not particularly restricted and may be appropriately selected according to purpose. It is more preferably 55° C. to 68° C., and particularly preferably 58° C. to 65° C. When the maximum peak temperature of the heat of fusion of the toner is less than 50° C., blocking of the toner is likely to occur in a high temperature environment. When it exceeds 70° C., it becomes difficult to develop low temperature fixing property.

The endothermic quantity [$\Delta H(T)$, (J/g)] of the toner is not particularly restricted and may be appropriately selected according to purpose. It is more preferably 45 J/g to 70 J/g, and particularly preferably 50 J/g to 60 J/g. When the endothermic quantity [$\Delta H(T)$, (J/g)] of the toner is less than 30 J/g, the toner has decreased portions with a crystalline structure and decreased sharp melt property, making it difficult to balance heat-resistant storage stability and low-temperature fixing property. When it exceeds 75 J/g, energy required for melting and fixing the toner increases, and fixing property may degrade depending on a fixing apparatus.

Similarly to the resin, the maximum peak temperature of the heat of fusion of the toner may be measured using a differential scanning calorimeter (TA-60WS and DSC-60 (manufactured by Shimadzu Corporation), for example). First, a sample for measuring the maximum peak temperature of the heat of fusion is heated from 20° C. to 150° C. at a heating rate of 10° C./min, then cooled to 0° C. at a cooling rate of 10° C./min and then heated at a heating rate of 10° C., and an endothermic-exothermic change is measured. The "endothermic-exothermic change" is plotted against the "temperature", and a temperature corresponding to the maximum peak of the heat of fusion is determined as the maximum peak temperature of the heat of fusion in the second temperature increase. Also, an endothermic quantity of the endothermic peak having the maximum peak temperature is defined as an endothermic quantity in the second temperature increase.

[Storage Modulus G'(70), Storage Modulus G'(160)]

A storage modulus of the toner at 70° C., G'(70) (Pa), is not particularly restricted and may be appropriately selected according to purpose. It is preferably $1.0 \times 10^4$ Pa to $5.0 \times 10^5$ Pa, more preferably $1.0 \times 10^4$ Pa to $1.0 \times 10^5$ Pa and particularly preferably $5.0 \times 10^4$ Pa to $1.0 \times 10^5$ Pa. When the storage modulus G'(70) is less than $1.0 \times 10^4$ Pa, blocking phenomenon that fixed images are adhered to each other is likely to occur after continuous output of the fixed images. When it exceeds $5.0 \times 10^5$ Pa, melting property of the toner decreases in a low temperature region, and a fixed image tends to have decreased glossiness.

A storage modulus of the toner at 160° C., G'(160) (Pa), is not particularly restricted and may be appropriately selected according to purpose. It is preferably $1.0 \times 10^3$ Pa to $5.0 \times 10^4$ Pa, more preferably $1.0 \times 10^3$ Pa to $1.0 \times 10^4$ Pa and particularly preferably $5.0 \times 10^3$ Pa to $1.0 \times 10^4$ Pa. When the storage modulus G'(160) is less than $1.0 \times 10^3$ Pa, hot-offset resistance tends to degrade. When it exceeds $5.0 \times 10^4$ Pa, a fixed image tends to have decreased glossiness.

Also, it is preferable that the storage modulus, G'(70) (Pa), is $1.0 \times 10^4$ to $5.0 \times 10^5$ and that the storage modulus, G'(160)

(Pa), is $1.0 \times 10^3$ to $5.0 \times 10^4$. The storage modulus G'(70) and the storage modulus G'(160) within the above ranges suppress peeling images when an image is fixed at a low temperature and offset of a toner to a fixing member when an image is fixed at a high temperature may be suppressed more effectively, and as a result, it is possible to improve resistance to stirring stress.

The dynamic viscoelastic properties of the toner (storage modulus G' and loss modulus G") may be measured using a dynamic viscoelasticity measuring apparatus (for example, ARES (manufactured by TA Instruments, Inc.)). It is measured under a frequency of 1 Hz. A sample is formed into pellets having a diameter of 8 mm and a thickness of 1 mm to 2 mm, fixed on a parallel plate having a diameter of 8 mm, which is then stabilized at 40° C., and heated to 200° C. at a heating rate of 2.0° C./min with a frequency of 1 Hz (6.28 rad/s) and a strain amount of 0.1% (strain amount control mode), and a measurement is taken.

[Content of N Element in THF-Soluble Content of Toner]

A content of N element in a CHN analysis of the THF soluble content of the toner is not particularly restricted and may be appropriately selected according to purpose. It is preferably 0.3% by mass to 2.0% by mass, more preferably 0.5% by mass to 1.8% by mass, and particularly preferably 0.7% by mass to 1.6% by mass. When the content of N element exceeds 2.0% by mass, the toner in a molten state has an excessively high viscoelasticity. As a result, it is possible that fixing property, glossiness and charging property may degrade. When the content is less than 0.3% by mass, aggregation and pollution of members in an image forming apparatus due to degreased toughness of the toner or high-temperature offset due to decreased viscoelasticity of the toner in a molten state may occur.

The content of N element is an amount of N element derived from a urethane bond and a urea bond.

The content of N element in the present invention may be obtained as an average value of two measurement values of CHN simultaneous measurement under conditions of a combustion furnace of 950° C., a reduction furnace of 550° C., a helium flow rate of 200 mL/min and an oxygen flow rate of 25 mL/min to 30 mL/min using VARIO MICRO CUBE (manufactured by Elementar Analytical). Here, when the content of N element obtained by this measurement method is less than 0.5% by mass, a further measurement is conducted using a trace nitrogen analyzer ND-100 (manufactured by Mitsubishi Chemical Corporation). An electric furnace (horizontal reactor) has temperatures in a thermal decomposition part of 800° C. and in a catalytic part of 900° C., and with measurement conditions of the main $O_2$ flow rate of 300 mL/min, Ar flow rate of 400 mL/min, and the sensitivity of Low, quantity is determined using a calibration curve created with pyridine standard solutions.

Here, the THF soluble content of the toner may be obtained beforehand by placing 5 g of toner in a Soxhlet extractor, carrying out extraction using this for 20 hours with 70 mL of THF and removing THF by heating under a reduced pressure.

[Urea Bond]

It is important that a urea bond exist in the THF soluble content of the toner since effects of improved toughness of the toner and offset resistance during fixing may be expected even with a small amount of the urea bond.

The presence of the urea bond in the THF soluble content of the toner may be analyzed using $^{13}$C-NMR.

Specifically, the analysis is conducted as follows. After 2 g of a sample to be analyzed is soaked in 200 mL of a methanol solution of potassium hydroxide having a concentration of 0.1 mol/L and left at 50° C. for 24 hours, the solution is removed, the residue is further washed with ion-exchange water until a pH thereof becomes neutral, and the remaining solid is dried. The sample after drying is added with a mixed solvent of dimethylacetamide (DMAc) and deuterated dimethyl sulfoxide (DMSO-d6) (having a volume ratio of 9:1) with a concentration of 100 mg/0.5 mL. This is dissolved first at 70° C. for 12 hours to 24 hours and then to 50° C., and $^{13}$C-NMR measurement is conducted. Here, a measurement frequency is 125.77 MHz, 1H_60° pulse is 5.5 µs, and a reference substance is 0.0 ppm of tetramethylsilane (TMS).

Figure 2:
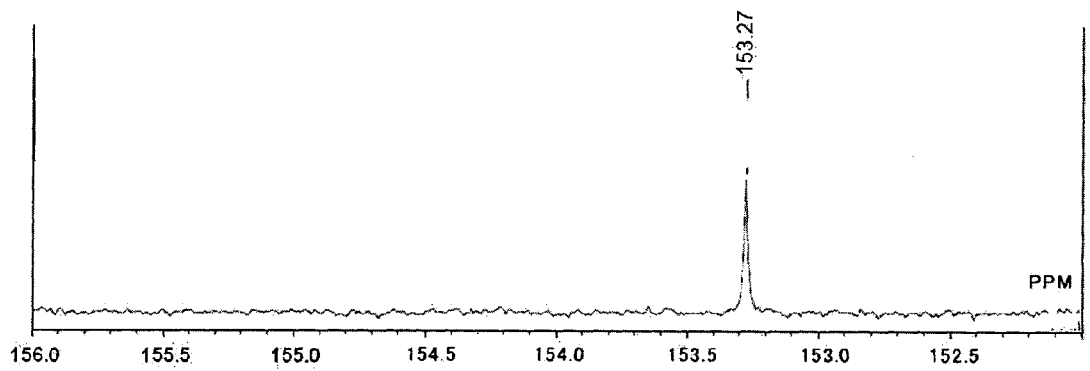
FIG. 2 is a diagram illustrating a $^{13}$C-NMR spectrum around a carbonyl carbon in polyurea.

The presence of a urea bond in the sample is confirmed by whether or not a signal is observed in a chemical shift of a signal derived from the carbonyl carbon of the urea bond site of a polyurea as a preparation. The chemical shift of the carbonyl carbon is generally observed at 150 ppm to 160 ppm. As one example of polyurea, a $^{13}$C-NMR spectrum near a carbonyl carbon of a polyurea as a reaction product of 4,4'-diphenylmethane diisocyanate (MDI) and water is illustrated in FIG. 2. A signal derived from the carbonyl carbon is observed at 153.27 ppm.

[Urethane Bond]

The THF soluble content of the toner preferably includes a urethane bond. The urethane bond may be confirmed by, other than resin component monomer analysis using infrared absorption spectrum or pyrolysis gas chromatogram-mass spectrometry, using $^{13}$C-NMR similarly to the confirmation method for the urea bond.

[Volume Resistivity of Toner]

A common logarithmic value of a volume resistivity R [Ω·cm] of the toner is not particularly restricted and may be appropriately selected according to purpose. It is preferably 10.0 to 10.6 since charge imparted to the toner by frictional electrification is favorably retained on a surface of the toner in developing and transfer processes. When the crystalline resin includes a urethane/urea bond, it is considered that these functional groups are likely to leak the charge. However, in order to enhance mechanical strength of the crystalline resin, it is desirable to bind crystalline portions with these functional groups. Thus, when the common logarithmic value is within the preferable range, satisfactory developing and transferring properties may be obtained without toner degradation. The common logarithmic value of less than 10.0 causes the charge to leak on a contact member such as carrier, charge roller and photoconductor. As a result, a latent image may not be closely developed, or non-transferred toner, which cannot move in a transfer electric field, is likely to remain on the photoconductor. On the other hand, it is necessary to have a high resistance to some extent in order to maintain the charge. However, when the common logarithmic value is higher than 10.6, the crystalline resin of the present invention has a decreased mechanical strength despite favorable developing and transfer properties. Thus, the toner degradation such as aggregation and deformation occurs due to contact or friction with internal members of the apparatus, and a satisfactory image may not be obtained.

Here, electrical resistance depends on abundance of the urethane bond and urea bond. It also depends largely on the crystalline state in the resin, and the resistance may be increased with higher crystallinity. Accordingly, in order to adjust the electrical resistance within the above range while maintaining the mechanical strength, it is effective to increase a size of crystalline portion in the polymer. For example, there are methods such as subjecting the obtained toner to crystal growth by heat treatment under appropriate conditions and adjusting production conditions such as heating temperature and heating time. It is also effective that materials which suitable for growing crystals (e.g. fine low-molecular crystalline organic compound, fine inorganic particles, metal oxides and inorganic salts) are included in the toner in advance.

[Method for Measuring Volume Resistivity of Toner]

To measure the common logarithmic value Log R of the volume resistivity R [Ω·cm] of the toner, a sample for measurement is produced by molding 3 g of the toner into pellets having a diameter of 40 mm and a thickness of 2 mm (a pressure device BRE-32 manufactured by Maekawa Testing Machine MFG. Co., Ltd.; load of 6 MPa and pressing time of 1 minute). This is set in SE-70 solid-state electrodes (manufactured by Ando Electric Co., Ltd.), and Log R when an alternating current of 1 kHz is applied between the electrodes is measured using an AC bridge instrument composed of TR-10C dielectric loss measuring instrument, WBG-9 oscillator and BDA-9 equilibrium point detector (all manufactured by Ando Electric Co., Ltd.), and thereby Log R of the toner is obtained.

(Method for Manufacturing Toner)

A method for preparing a toner of the present invention is not particularly restricted and may be appropriately selected according to purpose. Examples thereof include: heretofore known wet granulation methods such as dissolution suspension method and emulsion aggregation method; and a pulverization method. Among these, the dissolution suspension method and the emulsion aggregation method, which are manufacturing methods not involving kneading of a binder resin, are preferable in view of cutting of molecules due to kneading and difficulty of uniform kneading of a high-molecular weight resin and a low-molecular weight resin. Moreover, the dissolution suspension method is particularly preferable in view of uniformity of resins in toner particles.

Alternatively, the above toner may be manufactured the particle manufacturing method described in, for example, JP-B No. 4531076. Specifically, in this particle manufacturing method, materials for forming toner particles are dissolved in carbon dioxide of a liquid or supercritical state and then the carbon dioxide is removed to obtain toner particles.

[Dissolution Suspension Method]

A toner is manufactured by the dissolution suspension method as follows.

First, a toner material solution is prepared by dispersing or dissolving the above toner materials such as colorant, binder resin and releasing agent in an organic medium. Next, the toner material solution is emulsified in an aqueous medium in the presence of a surfactant and resin particles, and thereby particles are obtained.

—Organic Medium—

The organic solvent preferably volatile having a boiling point less than 100° C. since it may be easily removed after formation of toner base particles. Examples of the organic solvent includes toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These may be used alone or in combination of two or more. Among these, aromatic solvents such as toluene and xylene, halogenated hydrocarbons such as methylene chloride, 1,2-dichloroethane, chloroform and carbon tetrachloride, and ethyl acetate are preferable. An amount of the organic solvent used with respect to 100 parts by mass of the toner materials is usually 0 parts by mass to 300 parts by mass, preferably 0 parts by mass to 100 parts by mass, and more preferably 25 parts by mass to 70 parts by mass.

—Aqueous Medium—

The aqueous medium may be water alone, or it may further include an organic solvent such as alcohols (e.g. methanol, isopropyl alcohol and ethylene glycol), dimethylformamide, tetrahydrofuran, cellosolves (e.g. methyl cellosolve) and lower ketones (e.g. acetone and methyl ethyl ketone).

An amount of the aqueous solvent used with respect to 100 parts by mass of the toner material solution is usually 50 parts by mass to 2,000 parts by mass, and preferably 100 parts by mass to 1,000 parts by mass. When the amount is less than 50 parts by mass, toner particles having a predetermined particle diameter cannot be obtained due to poor dispersion state of the toner material liquid. The amount exceeding 20,000 parts by mass is not economical.

—Surfactant, Resin Particles—

Further, appropriate addition of the surfactant or the resin particles as a dispersant is for favorable dispersion of the colorant, the hybrid resin and the releasing agent.

The surfactant is not particularly restricted and may be appropriately selected according to purpose. Examples thereof include: anionic surfactants such as alkylbenzene sulfonate, α-olefin sulfonate, and phosphate ester; cationic surfactants of amine salt type including alkylamine salt, amino alcohol fatty acid derivatives, polyamine fatty acid derivatives and imidazoline, and cationic surfactants of quaternary ammonium salt type including alkyl trimethyl ammonium salts, dialkyl dimethyl ammonium salt, alkyl dimethyl benzyl ammonium salts, pyridinium salts, alkyl isoquinolinium salts and benzethonium chloride; non-ionic surfactants such as fatty acid amide derivatives and polyhydric alcohol derivatives; and amphoteric surfactants such as alanine, dodecyldi(aminoethyl)glycine, di(octylaminoethyl)glycine, N-alkyl-N,N-dimethyl ammonium betaine.

Also, use of a surfactant having a fluoroalkyl group such as anionic surfactant having a fluoroalkyl group and cationic surfactant having a fluoroalkyl group is effective even with a very small amount thereof.

Examples of the anionic surfactants having a fluoroalkyl group which may be favorably used include: fluoroalkyl carboxylic acid having 2 to 10 carbon atoms and metal salts thereof, disodium perfluorooctanesulfonylglutamate, sodium 3-[Ω-fluoroalkyl(C6 to C11)oxy]-1-alkyl(C3 to C4) sulfonate and sodium 3[Ω-fluoroalkanoyl(C6 to C8)-N-ethylamino]-1-propanesulfonate, fluoroalkyl(C11 to C20) carboxylic acid and metal salts thereof, perfluoroalkyl(C7 to C13) carboxylic acid and metal salts thereof, perfluoroalkyl (C4 to C12) sulfonic acid and metal salts thereof, perfluorooctane sulfonic acid diethanolamide, N-propyl-N-(2-hydroxyethyl)perfluorooctane sulfonamide, perfluoroalkyl(C6 to C10) sulfonamide propyl trimethyl ammonium salt, perfluoroalkyl(C6 to C10)-N-ethylsulfonyl glycine salt and monoperfluoroalkyl(C6 to C16)ethyl phosphate.

As product names, examples thereof include: SURFLON S-111, S-112, S-113 (manufactured by Asahi Glass Co., Ltd.); FLUORAD FC-93, FC-95, FC-98, FC-129 (manufactured by Sumitomo 3M Co., Ltd.); UNIDYNE DS-101, DS-102 (manufactured by Daikin Industries, Ltd.); MEGAFACE F-110, F-120, F-113, F-191, F-812, F-833 (manufactured by DIC Corporation); EFTOP EF-102, 103, 104, 105, 112, 123A, 123B, 306A, 501, 201, 204 (manufactured by Tohkem Products Co., Ltd.); and FTERGENT F-100, F150 (manufactured by Neos Corporation).

Also, examples of the cationic surfactant having a fluoroalkyl group include: primary, secondary or tertiary aliphatic amine acid having a fluoroalkyl group, aliphatic quaternary ammonium salts such as perfluoroalkyl(C6 to C10)sulfonamide propyltrimethylammonium, benzalkonium salts, benzethonium chloride, pyridinium salts and imidazolinium salts; and as product names, SURFLON S-121 (manufactured by Asahi Glass Co., Ltd.), FLUORAD FC-135 (manufactured by Sumitomo 3M Co., Ltd.), UNIDYNE DS-202 (manufactured by Daikin Industries, Ltd.), MEGAFACE F-150, F-824 (manufactured by DIC Corporation), EFTOP EF-132 (manufactured by Tohkem Products Co., Ltd.), and FTERGENT F-300 (manufactured by Neos Corporation).

—Resin Particles—

As the resin particles, any resin may be used as long as it forms an aqueous dispersion, and it may be a thermoplastic resin and a thermosetting resin.

Examples of the resin include vinyl resins, polyurethane resins, epoxy resins, polyester resins, polyamide resins, polyimide resins, silicon-based resins, phenolic resins, melamine resins, urea resins, aniline resins, ionomer resins and polycarbonate resins. These may be used alone or in combination of two or more.

Among these, vinyl resins, polyurethane resins, epoxy resins, polyester resins and combinations thereof are preferable since an aqueous dispersion of fine spherical resin particles may be easily obtained.

The vinyl resins are a polymer that a vinyl monomer is homopolymerized or copolymerized, and examples thereof include a styrene-(meth)acrylic ester copolymer, a styrene-butadiene copolymer, a (meth)acrylic acid-acrylic ester polymer, a styrene-acrylonitrile copolymer, a styrene-maleic anhydride copolymer and a styrene-(meth)acrylic acid copolymer.

The resin particles have an average particle diameter of preferably 5 nm to 200 nm and more preferably 20 nm to 300 nm. An inorganic compound dispersant such as tricalcium phosphate, calcium carbonate, titanium oxide, colloidal silica and hydroxyapatite may also be used.

—Dispersant—

As the dispersant that may be used in combination with the resin particles and the inorganic compound dispersant, a polymeric protective colloid may be used for stabilizing dispersed droplets.

Examples of the dispersant include: an acid such as acrylic acid, methacrylic acid, α-cyanomethacrylic acid, itaconic acid, crotonic acid, fumaric acid, maleic acid and maleic anhydrite; a (meth)acrylic monomer including a hydroxyl group such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerin monoacrylate, glycerin monomethacrylate, N-methylol acrylamide and N-methylol methacrylamide; a vinyl alcohol or an ether of a vinyl alcohol such as vinyl methyl ether, vinyl ethyl ether and vinyl propyl ether; an ester of a vinyl alcohol and a compound including a carboxyl group such as vinyl acetate, vinyl propionate and vinyl butyrate; acrylamide, methacrylamide, diacetone acrylamide and a methylol compound thereof; an acid chloride such as acrylic acid chloride and methacrylic acid chloride; a nitrogen-containing compound such as vinyl pyridine, vinyl pyrrolidone, vinyl imidazole and ethylene imine, and a homopolymer or a copolymer of those including a heterocyclic ring thereof; polyoxyethylene, polyoxypropylene, polyoxyethylene alkyl amine, polyoxypropylene alkyl amine, polyoxyethylene alkyl amide, polyoxypropylene alkyl amide, polyoxyethylene nonylphenyl ether, polyoxyethylene laurylphenyl ether, polyoxyethylene stearylphynyl ester and polyoxyethylene nonylphenyl ester; and celluloses such as methyl cellulose, hydroxyethyl cellulose and hydroxypropyl cellulose.

[[Method for Dispersion]]

A method for dispersion is not particularly restricted, and a heretofore known equipment such as low-speed shearing equipment, high-speed shearing equipment, friction equipment, high-pressure jet equipment and ultrasonic waves may be applied. Among these, the high-speed shearing equipment is preferable in order to have a particle size of the dispersion of 2 μm to 20 μm. When the high-speed sharing dispersion equipment is used, the rotational speed is not particularly restricted, but it is usually 1,000 rpm to 30,000 rpm, and preferably 5,000 rpm to 20,000 rpm. A dispersion time is not particularly restricted, but it is usually 0.1 min to 5 min in the case of a batch system. A temperature during dispersion is usually 0° C. to 150° C. (under pressurization), and preferably 40° C. to 98° C.

[[Removal of Organic Solvent, Washing, Drying]]

The organic solvent is removed, and then the emulsified dispersion (reaction product) is washed and dried to obtain toner base particles.

In order to remove the organic solvent, the entire system is gradually heated with laminar stirring, giving a strong stirring in a predetermined temperature region, and is then subject to desolvation. Thereby, toner base particles having a spindle shape may be prepared. When a substance soluble in acid or alkali such as calcium phosphate is used as a dispersion stabilizer, calcium phosphate is removed from the toner base particles by dissolving calcium phosphate with an acid such as hydrochloric acid followed by rinsing with water. It may also be removed by operations such as enzymatic degradation. A charge controlling agent is implanted to the obtained toner base particles, then inorganic particles such as silica particles and titanium oxide particles are adhered as an external additive, and thereby a toner is obtained. Here, implantation of the charge controlling agent and adhesion of the inorganic particles are conducted by a heretofore known method such as using a mixer.

In view of uniform particle diameter, [volume-average particle diameter/number-average particle diameter] of the toner of the present invention is preferably 1.0 to 1.4, and more preferably 1.0 to 1.3. The volume-average particle diameter of the toner varies depending on an application, but in general, it is preferably 0.1 μm to 16 μm. The upper limit is more preferably 11 μm, and further more preferably 9 μm, and the lower limit is more preferably 0.5 μm, and more preferably 1 μm. Here, the volume-average particle diameter and the number-average particle diameter may be measured simultaneously using MULTISIZER III (manufactured by Beckman Coulter, Inc.).

—Particle Diameter Measurement—

A volume-average particle diameter of colored resin particles is measured by a Coulter counter method. Examples of a measurement apparatus include Coulter Counter TA-II, Coulter Multisizer II and Coulter Multisizer III (all manufactured by Beckman Coulter, Inc.). The measurement method is descried below.

First, 0.1 mL to 5 mL of a surfactant (preferably alkylbenzene sulfonate) is added as a dispersant to 100 mL to 150 mL of an electrolyte solution. In this case, the electrolyte solution is an about 1-% by mass NaCl aqueous solution prepared using primary sodium chloride, and ISOTON-II (manufactured by Beckman Coulter, Inc.) may be used, for example. Here, 2 mg to 20 mg of a measurement sample is further added. The electrolyte solution in which the sample is suspended is subject to dispersion treatment for about 1 min to 3 min with an ultrasonic disperser. With the measurement apparatus, using a 100-μm aperture as an aperture, the volume and the number of the toner particles or toner are measured, and a volume distribution and a number distribution are calculated. From the obtained distributions, the volume-average particle diameter and the number-average particle diameter of the toner may be obtained.

As channels, following 13 channels are used: 2.00 μm to less than 2.52 μm; 2.52 μm to less than 3.17 μm; 3.17 μm to less than 4.00 μm; 4.00 μm to less than 5.04 μm; 5.04 μm to less than 6.35 μm; 6.35 μm to less than 8.00 μm; 8.00 μm to less than 10.08 μm; 10.08 μm to less than 12.70 μm; 12.70 μm to less than 16.00 μm; 16.00 μm to less than 20.20 μm; 20.20 μm to less than 25.40 μm; 25.40 μm to less than 32.00 μm; and 32.00 μm to less than 40.30 μm Intended particles have a particle diameter of 2.00 μm to less than 40.30 μm.

[Emulsion Aggregation Method]

As a method for manufacturing a toner using an emulsion aggregation method, for example, a toner slurry is obtained by aggregating and fuses a binder resin dispersion with a colorant dispersion and a wax dispersion, which is subject to washing and filtration in accordance with a heretofore known method. A collected matter is dried, and thereby the toner is isolated.

[Pulverization Method]

A method for manufacturing a toner using the pulverization method includes at least, for example, in accordance with a heretofore known technique, a step of mechanically mixing a toner composition consisting of a binder resin, a charge controlling agent of the present invention and a colorant, a step of melt-kneading, a step of pulverizing, and a step of classifying. In this case, in the step of mechanically mixing and the step of melt-kneading, a toner other than the product to be obtained in the steps of pulverizing or classifying may be reused.

The step of mechanically mixing may be carried out under ordinary conditions using a mixer having a stirring blade and is not particularly restricted. After this step is completed, the mixture is charged in a kneader for melt-kneading. As a melt-kneader, a uniaxial or biaxial continuous kneader and a batch kneader with a roll mill may be used. Specific examples thereof include: a KTK-model twin-screw extruder (Kobe Steel, Ltd.); a TEM-model extruder (manufactured by Toshiba Machine Co., Ltd.); a twin-screw extruder (manufactured by KCK Co., Ltd.); a PCM-model twin-screw extruder (manufactured by Ikegai Corporation); and a co-kneader (manufactured by Buss). It is necessary to carry out melt-kneading under a condition that a molecular chain of the binder resin is not cut off. When a melt-kneading temperature is too low compared to a softening point of the binder resin, the molecular chain is cut off. When the melt-kneading temperature is too high, dispersion of the charge controlling agent and the colorant of the present invention do not proceed. Thus, it is preferable that the melt-kneading temperature is determined appropriately in accordance with the softening temperature of the resin.

When the step of melt-kneading is completed, the melt-kneaded matter is pulverized. In the step of pulverizing, it is preferable that coarse pulverization is followed by fine pulverization. Examples of such a pulverization method include: a method to pulverize by collision with a collision plate in a jet stream; a method to pulverize by collision among particles in a jet stream; and a method to pulverize in a narrow gap between a mechanically rotating rotor and a stator. After this step is completed, the pulverized matter is classified in a jet stream using a centrifugal force, and a toner having a predetermined particle size may be obtained.

(Developer)

A developer of the present invention includes at least a toner of the present invention, and it further includes other components appropriately selected such as carrier. The developer may be a one-component developer or a two-component developer, but it is preferably the two-component developer in view of improved lifetime when it is used for a high-speed printer corresponding to recent improvement in information processing speed.

In the case of the one-component developer using the toner, there is little variation in the particle size of the toner even when the toner is consumed and supplied repeatedly. Also, there is neither filming of the toner to a developing roller as a developer bearing member nor fusion of the toner to a layer thickness regulating member such as blade for thinning the toner. Moreover, favorable and stable developing property and images may be obtained after a long-term usage (stirring) of a developing unit. Also, in the case of the two-component developer, there is little variation in the particle size of the toner even when the toner is consumed and supplied repeatedly, and favorable and stable developing property may be obtained after a long-term stirring of a developing unit.

<Carrier>

The carrier is not particularly restricted and may be appropriately selected according to purpose. It preferably includes a core material and a resin layer (coating layer) which coats the core material.

<<Carrier Core Material>>

The core material is not particularly restricted as long as it includes magnetic particles. Favorable examples thereof include ferrite, magnetite, iron and nickel. Also, in the case where environmental adaptability which is promoted significantly in recent years is taken into consideration, as for the ferrite, it is preferable to use manganese ferrite, manganese-magnesium ferrite, manganese-strontium ferrite, manganese-magnesium-strontium ferrite and lithium ferrite instead of conventional copper-zinc ferrite.

<<Coating Layer>>

The coating layer includes at least a binder resin, and it may include other components such as inorganic particles according to necessity.

—Binder Resin—

The binder resin for forming the coating layer of the carrier is not particularly restricted and may be appropriately selected according to purpose. Examples thereof include: crosslinking copolymers including polyolefins (e.g. polyethylene and polypropylene) and modified products thereof, styrene, an acrylic resin, acrylonitrile, vinyl acetate, vinyl alcohol, vinyl chloride, vinyl carbazole and vinyl ether; silicone resins including an organosiloxane bond and modified products thereof (e.g. products modified by an alkyd resin, a polyester resin, an epoxy resin, polyurethane and polyimide); polyamide; polyester; polyurethane; polycarbonate; a urea resin; a melamine resin; a benzoguanamine resin; an epoxy resin; an ionomer resin; a polyimide resin; and derivatives thereof. These may be used alone or in combination of two or more. Among these, silicone resins are particularly preferable.

The silicone resins are not particularly restricted and may be appropriately selected from generally known silicone resins according to purpose. Examples thereof include straight silicone resins consisting of organosiloxane bonds and silicone resins modified by alkyd, polyester, epoxy, acrylic or urethane.

Examples of commercially available products of the straight silicone resins include: KR271, KR272, KR282, KR252, KR255, KR152 (manufactured by Shin-Etsu Chemical Co., Ltd.); and SR2400, SR2405, SR2406 (manufactured by Dow Corning Toray Co., Ltd.). Also, specific examples of the modified silicone resins include: an epoxy-modified product: ES-1001N; an acrylic-modified silicone: KR-5208; a polyester-modified product: KR-5203; an alkyd-modified product: KR-206; a urethane-modified product: KR-305 (manufactured by Shin-Etsu Chemical Co., Ltd.); and an epoxy-modified product: SR2115; and an alkyd-modified product: SR2110 (manufactured by Dow Corning Toray Co., Ltd.).

Here, the silicone resins may be used alone, but it may be used in combination with a crosslinking component or a charge controlling component. Examples of the crosslinking component include a silane coupling agent. Examples of the silane coupling agent include methyltrimethoxysilane, methyltriethoxysilane, octyltrimethoxysilane and aminosilane coupling agent.

—Fine Particles—

Fine particles may be included in the coating layer according to necessity. The fine particles are not particularly restricted and may be appropriately selected from heretofore known materials according to purpose. Examples thereof include: inorganic fine particles such as metal powder, tin oxide, zinc oxide, silica, titanium oxide, alumina, potassium titanate, barium titanate and aluminum borate; an electrically conductive polymer such as polyaniline, polyacetylene, poly-paraphenylene, poly(para-phenylene sulfide), polypyrrole and parylene; and organic fine particles such as carbon black. These may be used in combination of two or more.

In addition, a surface of the fine particles may be subject to an electrically conductive treatment. As the electrically conductive treatment, for example, the surface of the fine particles are coated with aluminum, zinc, copper, nickel, silver, alloys thereof, zinc oxide, titanium oxide, tin oxide, antimony oxide, indium oxide, bismuth oxide, indium oxide doped with tin, and tin oxide and zirconium oxide doped with antimony in the form of solid solution or fusion. Among these, a method of electrically conductive treatment with tin oxide, indium oxide or indium oxide doped with tin is preferable.

A content of the coating layer in the carrier is preferably 5% by mass or greater, and more preferably 5% by mass to 10% by mass.

A thickness of the coating layer is preferably 0.1 μm to 5 μm, and more preferably 0.3 μm to 2 μm.

Here, the thickness of the coating layer may be calculated, for example, from an average value of film thickness values obtained from observations using a transmission electron microscope (TEM) or a scanning transmission electron microscope (STEM) of 50 or more carrier cross sections prepared by FIB (focused ion beam).

[Method for Forming Carrier Coating Layer]

A method for forming a coating layer on a carrier is not particularly restricted, and heretofore known methods for forming a coating layer may be used. Examples thereof include a method that a coating layer solution in which the materials described above including the binder resin and a binder resin precursor are dissolved is applied on a surface of a core material by a spraying method or a dipping method. It is preferable to promote a polymerization reaction of the binder resin or the binder resin precursor by heating the carrier on which the coating layer solution has been applied and a coating layer is formed on the surface thereof. The heating treatment may be carried out continuously in a coating apparatus after forming the coating layer, or alternatively, it may be carried out by another heating means such as ordinary electric furnace and firing kiln after forming the coating layer.

A temperature of the heating treatment cannot be determined unconditionally because it varies depending on the constitutional materials used in the coating layer. Nonetheless, it is preferably 120° C. to 350° C., and it is particularly preferably below the decomposition temperature of the materials constituting the coating layer. Here, the decomposition temperature of the materials constituting the coating layer preferably has an upper limit of around 220° C. A duration of the heating treatment is preferably 5 min to 120 min.

[Physical Properties of Carrier]

The carrier preferably has a volume-average particle diameter of 10 μm to 100 μm and more preferably 20 μm to 65 μm.

The volume-average particle diameter of the carrier of less than 10 μm is not preferable because carrier adhesion may occur due to reduced uniformity of the core material particles. The volume-average particle diameter exceeding 100 μm is not preferable since a fine image is not obtained due to poor reproducibility of image details.

A method for measuring the volume-average particle diameter is not particularly restricted as long as it is a device that can measure a particle size distribution. For example, it may be measured using a MICROTRAC particle size distribution analyzer Model HRA9320-X100 (manufactured by Nikkiso Co., Ltd.).

The carrier has a volume resistivity of preferably 9 [log (Ω·cm)] to 16 [log(Ω·cm)], and more preferably 10 [log (Ω·cm)] to 14 [log(Ω·cm)].

The volume resistivity of less than 9 [log(Ω·cm)] is not preferable since it causes carrier adhesion in a non-image region. The volume resistivity exceeding 16 [log(Ω·cm)] is not preferable since a so-called edge effect that image density at an edge is enhanced becomes significant. The volume resistivity may be adjusted freely within the above range by adjusting a thickness of the coating layer and the content of the electrically conductive particles of the carrier according to necessity.

The volume resistivity may be measured as follows. First, the carrier is filled in a cell consisting of a fluorine resin container which houses an electrode 1a and an electrode 1b having an inter-electrode distance of 0.2 cm and a surface area of 2.5 cm×4 cm, which is tapped with the following tapping conditions: drop height of 1 cm, tapping speed of 30 times/min, and the number of tapping of 10. Next, a DC voltage of 1,000 V is applied between the electrodes, and a resistance value r [Ω] after 30 sec is measured using a high resistance meter 4329A (HIGHRESISTANCE METER, manufactured by Yokogawa Hewlett-Packard Ltd.). The volume resistivity R [log(Ω·cm)] may be calculated according to Formula (3) below:

$$R = \text{Log}\,[r \times (2.5\,\text{cm} \times 4\,\text{cm})/0.2\,\text{cm}] \quad (3)$$

When the developer is a two-component developer, as a mixing ratio of a toner and a carrier in the two-component developer, a mass ratio of the toner with respect to the carrier is preferably 2.0% by mass to 12.0% by mass, and more preferably 2.5% by mass to 10.0% by mass.

(Image Forming Method and Image Forming Apparatus)

An image forming method of the present invention includes at least an electrostatic latent image forming step and a developing step, and it further includes other steps appropriately selected according to necessity such as transferring step, fixing step, neutralizing step, cleaning step, recycling step and controlling step.

An image forming apparatus used in the present invention includes at least an electrostatic latent image bearing member, an electrostatic latent image forming unit and a developing unit, and it further includes other units appropriately selected according to necessity such as transfer unit, fixing unit, neutralizing unit, cleaning unit, recycling unit and control unit.

<Electrostatic Latent Image Forming Step and Electrostatic Latent Image Forming Unit>

The electrostatic latent image forming step is a step of forming a latent image on the electrostatic latent image bearing member.

As the electrostatic latent image bearing member (also referred to as "electrophotographic photoconductor" or "photoconductor"), a material, shape, structure and size thereof are not particularly restricted and may be appropriately selected from those heretofore known. As the shape, a drum shape is preferable. Examples of the material include an inorganic photoconductor of amorphous silicon or selenium and an organic photoconductor (OPC) of polysilane or phthalopolymethine. Among these, amorphous silicon is preferable.

The electrostatic latent image may be formed by uniformly charging a surface of the electrostatic latent image bearing member followed by imagewise exposure, which may be carried out by the electrostatic latent image forming unit.

For example, the electrostatic latent image forming unit includes at least a charger which uniformly charges the surface of the electrostatic latent image bearing member and an exposure device which exposes imagewise the surface of the electrostatic latent image bearing member.

The charging may be carried out by applying a voltage to the surface of the electrostatic latent image bearing member using the charger.

The charger is not particularly restricted and may be appropriately selected according to purpose. Examples thereof include: contact charger heretofore known per se equipped with electrically conductive or semi-conductive roller, brush, film or rubber blade; and a non-contact charger which makes use of corona discharge of corotron or scorotron.

It is preferable that the charger is disposed in contact or non-contact with the electrostatic latent image bearing member and applies superimposed DC and AC voltages, thereby charging the surface of the electrostatic latent image bearing member.

It is also preferable that the charger is a charging roller disposed closely to the electrostatic latent image bearing member via a gap tape in a non-contact manner and applies superimposed DC and AC voltages, thereby charging the surface of the electrostatic latent image bearing member.

The exposure may be carried out by exposing imagewise the surface of the electrostatic latent image bearing member using the exposure device.

The exposure device is not particularly restricted as long as it can expose imagewise an image to be formed on the surface of the electrostatic latent image bearing member charged by the charger, and it may be selected appropriately according to purpose. Examples thereof include various exposure devices such as copying optical system, rod lens array system, laser optical system and liquid-crystal shutter optical system.

Here, in the present invention, a back light system which exposes imagewise from a back side of the electrostatic latent image bearing member.

<Developing Step and Developing Unit>

The developing step is a step of developing the electrostatic latent image using the toner of the present invention to form a visible image.

The developing unit is a unit equipped with a toner, which develops the electrostatic latent image to form the visible image, and the toner is the toner of the present invention.

The visible image may be formed by developing the electrostatic latent image using the developer of the present invention, which may be conducted with the developing unit.

The developing unit is not particularly restricted as long as it may develop using the developer of the present invention, and it may be appropriately selected from heretofore known units according to purpose. The developing unit preferably contains the developer of the present invention and includes at least a developing device which may provide the developer to the electrostatic latent image in a contact or non-contact manner. The developer equipped with a container containing the developer is more preferable.

The developing device may be a single-color developing device or a multi-color developing device. For example, the developing device favorably includes a stirrer which charges the developer by friction stir and a rotatable magnet roller.

In the developing unit, the toner and the carrier are mixed and stirred. The toner is charged due to friction and maintained in a state of standing spikes on a surface of the rotating magnet roller, and a magnetic brush is formed. Since the magnetic brush is disposed near the electrostatic latent image bearing member (photoconductor), a part of the toner which constitutes the magnetic brush formed on the surface of the magnet roller moves to the surface of the electrostatic latent image bearing member (photoconductor) by an electrical attraction force. As a result, the electrostatic latent image is developed by the toner, and a visible image of the toner is formed on the surface of the electrostatic latent image bearing member (photoconductor).

The developer contained in the developing device is the developer of the present invention.

<Transfer Step and Transfer Unit>

The transfer step is a step of transferring the visible image on a recording medium. A preferable aspect uses an intermediate transfer member and includes a primary transfer that the visible image is transferred on the intermediate transfer member followed by a secondary transfer that the visible image is transferred on the recording medium. A more preferable aspect uses a toner of two or more colors or a full-color toner as the toner and includes a primary transfer that the visible image is transferred on the intermediate transfer member to form a composite transfer image and a secondary transfer that the composite transfer image is transferred on the recording medium.

The transfer may be carried out by transferring the visible image using the transfer unit. As the transfer unit, an aspect including a primary transfer unit which transfers the visible image on the intermediate transfer member to form the composite transfer image and a secondary transfer unit which transfers the composite transfer image on the recording medium is preferable.

Here, the intermediate transfer member is not particularly restricted and may be appropriately selected according to purpose. A favorable example includes a transfer belt.

The transfer unit (the primary transfer unit and the secondary transfer unit) preferably includes at least a transfer device which peels off and charges the visible image formed on the electrostatic latent image bearing member (photoconductor) to the side of the recording medium. There may be one transfer unit, or there may be two or more transfer units.

Examples of the transfer device include a corona transfer device by corona discharge, a transfer belt, a transfer roller, a pressure transfer roller and an adhesive transfer device.

Here, the recording medium is not particularly restricted and may be appropriately selected from heretofore known recording media (recording paper).

<Fixing Step and Fixing Unit>

The fixing step is a step of fixing the visible image transferred to the recording medium using a fixing apparatus. It may be carried each time the developer of a respective color is transferred on the recording medium, or it may be carried out once at the same time when the developers of respective colors are laminated.

The fixing apparatus is not particularly restricted and may be appropriately selected according to purpose, but a heretofore known heating and pressurizing unit is preferable. Examples of the heating and pressurizing unit include a combination of a heat roller and a pressure roller and a combination of a heat roller, a pressure roller and an endless belt.

The fixing apparatus preferably includes a heating body equipped with a heating element, a film which is in contact with the heating member and a pressure member which is pressed against the heating body via the film and passes the recording medium on which a non-fixed image is formed between the film and the pressure member to fix by heating. Usually, the heating in the heating and pressurizing unit is preferably at 80° C. to 200° C.

Here, in the present invention, a heretofore known optical fixing device may be used according to purpose with or in place of the fixing step and the fixing unit, for example.

The neutralizing step is a step to neutralize the electrostatic image bearing member by applying a neutralizing bias, and it may be preferably carried out by a neutralizing unit.

The neutralizing unit is not particularly restricted as long as it can apply the neutralizing bias on the electrostatic image bearing member, and it may be appropriately selected from heretofore known neutralizing devices. Favorable examples include a neutralizing lamp.

The cleaning step is a step of removing the toner remaining on the electrostatic image bearing member, and it may be preferably carried out by a cleaning unit.

The cleaning unit is not particularly restricted as long as it can remove the toner on the electrostatic image bearing member, and it may be appropriately selected from heretofore known cleaners. Favorable examples thereof include a magnetic brush cleaner, an electrostatic brush cleaner, a magnetic roller cleaner, a blade cleaner, a brush cleaner and a web cleaner.

The recycling step is a step of recycling the toner removed in the cleaning step to the developing unit, and it may be preferably carried out by a recycling unit. The recycling unit is not particularly restricted, and heretofore known conveying units may be used.

The controlling step is a step of controlling the above steps, and each step may be favorably carried out by the controlling unit.

The controlling unit is not particularly restricted as long as it can control the movement of each unit, and it may be appropriately selected according to purpose. Examples thereof include devices such as sequencer and computer.

Figure 4:
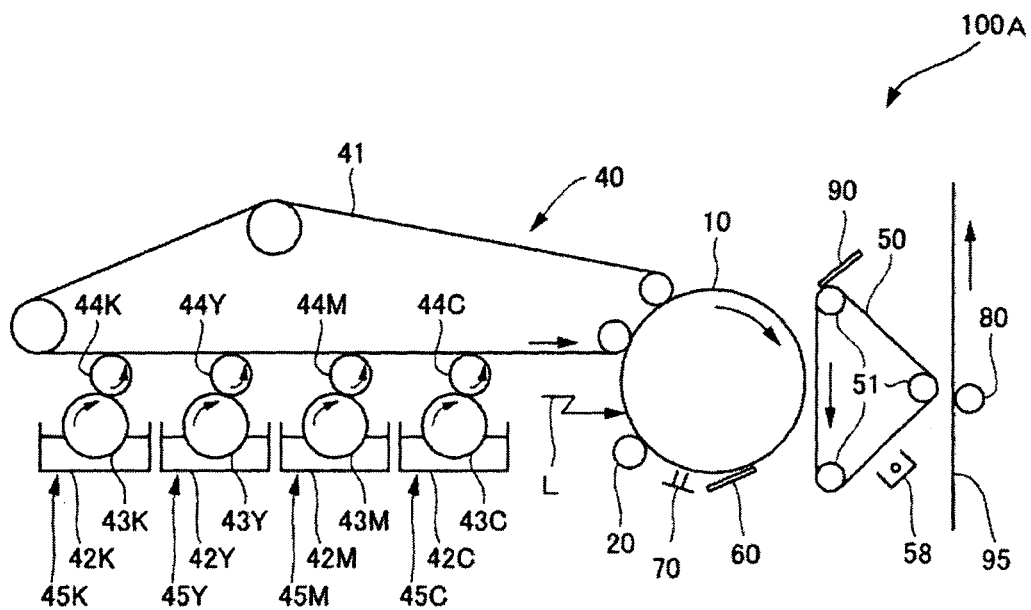
FIG. 4 is a schematic explanatory diagram illustrating an example of an image forming apparatus of the present invention.

FIG. 4 illustrates one example of an image forming apparatus used in the present invention. An image forming apparatus 100A includes a photoconductor drum 10, a charge roller 20, an exposure apparatus (not shown), a developing apparatus 40, an intermediate transfer belt 50, a cleaning apparatus 60 including a cleaning blade and a neutralizing lamp 70.

The intermediate transfer belt 50 is an endless belt stretched by three rollers 51 disposed inside thereof, and it moves in a direction of an arrow in the figure. A part of the three rollers 51 also functions as a transfer bias roller which may apply a transfer bias (primary transfer bias) on the intermediate transfer belt 50. Also, a cleaning apparatus 90 including a cleaning blade is disposed near the intermediate transfer belt 50. Further, a transfer roller 80 which can apply a transfer bias (secondary transfer bias) for transferring a toner image on transfer paper 95 is disposed facing the intermediate transfer belt 50. In addition, in a periphery of the intermediate transfer belt 50, a corona charging apparatus 58 for applying a charge to the toner image transferred on the intermediate transfer belt 50 is disposed between a contact portion of the photoconductor drum 10 with the intermediate transfer belt 50 and a contact portion of the intermediate transfer belt 50 with the transfer paper 95 with respect to a rotational direction of the intermediate transfer belt 50.

The developing apparatus 40 is configured with: a developing belt 41; and a black developing unit 45K, a yellow developing unit 45Y, a magenta developing unit 45M and a cyan developing unit 45C attached around the developing belt 41. Here, the developing unit 45 of a respective color is equipped with a developer container 42, a developer supply roller 43 and a developing roller 44. Also, the developing belt 41 is an endless belt stretched by a plurality of belt rollers and moved in a direction of an arrow in the figure. Moreover, a part of the developing belt 41 is in contact with the photoconductor drum 10.

Next, a method for forming an image using the image forming apparatus 100A is explained. First, using the charge roller 20, a surface of the photoconductor drum 10 is uniformly charged, and then using the exposure apparatus (not shown), an exposure light L is exposed on the photoconductor drum 10 to form an electrostatic latent image. Next, the electrostatic latent image formed on the photoconductor drum 10 is developed with a toner supplied from the developing apparatus 40 to form a toner image. Further, the toner image formed on the photoconductor drum 10 is transferred (primary transfer) on the intermediate transfer belt 50 by a transfer bias applied from the roller 51 and then transferred (secondary transfer) to transfer paper 95 by a transfer bias applied from the transfer roller 80. Meanwhile, after the toner image is transferred to the intermediate transfer belt 50, the toner remaining on a surface of the photoconductor drum 10 is removed by the cleaning apparatus 60, and the photoconductor drum 10 is neutralized by the neutralizing lamp 70.

Figure 5:
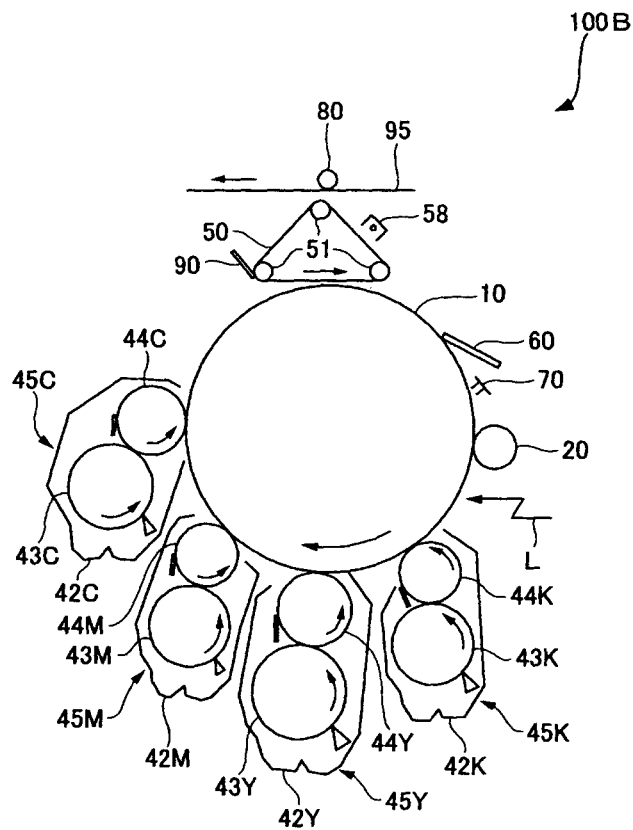
FIG. 5 is another schematic explanatory diagram illustrating an example of an image forming apparatus of the present invention.

FIG. 5 is a second example of an image forming apparatus used in the present invention. An image forming apparatus 100B has the same configuration as the image forming apparatus 100A except that the developing belt 41 is not provided and that, around the photoconductor drum 10, the black developing unit 45K, the yellow developing unit 45Y, the magenta developing unit 45M and the cyan developing unit 45C are disposed to face directly to the photoconductor drum 10.

Figure 6:
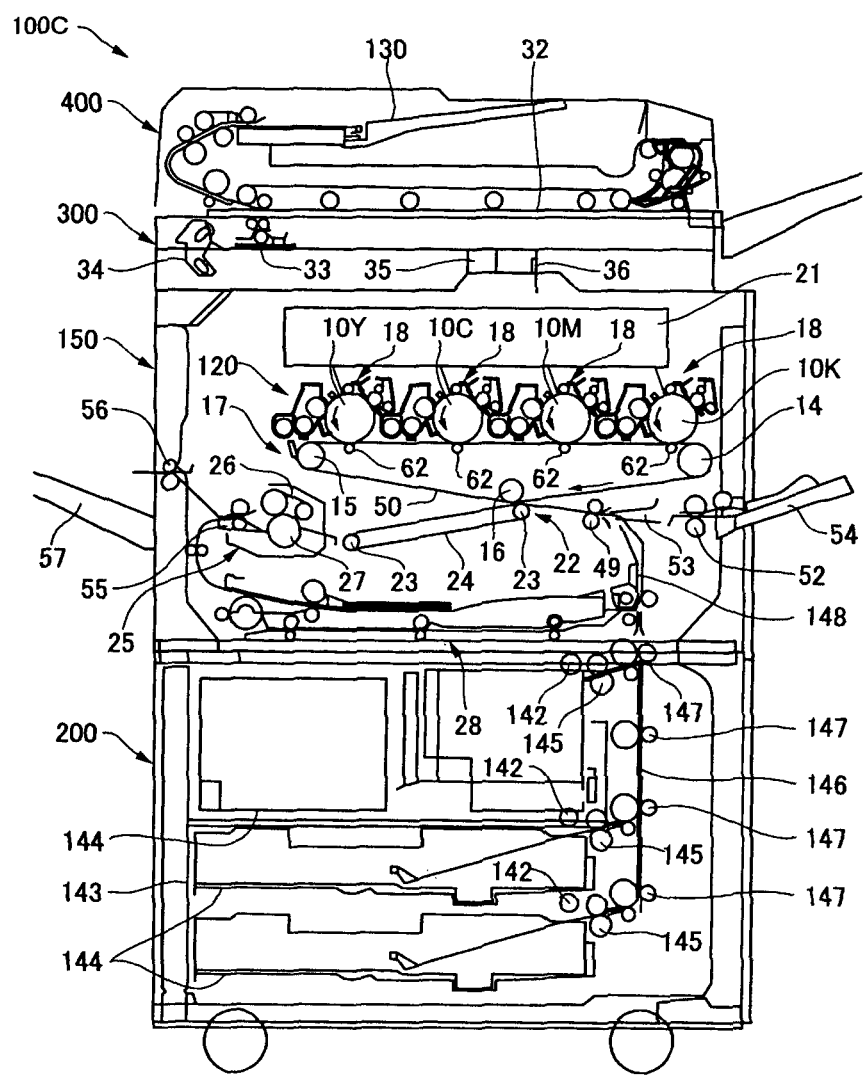
FIG. 6 is a schematic explanatory diagram illustrating an example of a tandem-type color image forming apparatus as an image forming apparatus of the present invention.

FIG. 6 illustrates a third example of an image forming apparatus used in the present invention. An image forming apparatus 100C is a tandem-type color image forming apparatus, including a copying apparatus main body 150, a sheet feeding table 200, a scanner 300 and an automatic document feeder (ADF) 400.

An intermediate transfer belt 50 disposed at a central part of the copying apparatus main body 150 is an endless belt stretched by three rollers 14, 15 and 16 and moves in a direction of an arrow in the figure. Near the roller 15, a cleaning apparatus 17 including a cleaning blade is disposed to remove a toner remaining on the intermediate transfer belt 50 after a toner image is transferred to recording paper. Yellow, cyan, magenta and black image forming units 120Y, 120C, 120M and 120K are arranged in parallel facing the intermediate transfer belt 50 stretched by the rollers 14 and 15 and along a conveying direction. Also, an exposure apparatus 21 is disposed near the image forming units 120. Further, a secondary transfer belt 24 is disposed on a side of the intermediate transfer belt 50 opposite to the side of the image forming units 120. Here, the secondary transfer belt 24 is an endless belt stretched by a pair of rollers 23, and the recording paper conveyed on the secondary transfer belt and the intermediate transfer belt 50 may contact between the rollers 16 and 23. In addition, near the secondary transfer belt 24, a fixing apparatus 25 equipped with a fixing belt 26 as an endless belt stretched by a pair of rollers and a pressure roller 27 pressed by the fixing belt 26 is disposed. Here, a sheet inverting device 28 is located near the secondary transfer belt 24 and the fixing apparatus 25 for inverting the recording paper in the case of forming images on both sides of the recording paper.

Next, a method for forming a full-color image using the image forming apparatus 100C is explained. First, a color document is set on a document table 130 of the automatic document feeder (ADF) 400. Alternatively, the automatic document feeder 400 is opened, the color document is set on a contact glass 32 of the scanner 300, and the automatic document feeder 400 is closed. A start button (not shown) is pressed. The scanner 300 activates after the document is conveyed and transferred to the contact glass 32 in the case the document has been set on the automatic document feeder 400, or right away in the case the document has been set on the contact glass 32, and a first travelling body 33 equipped with a light source and a second travelling body 34 equipped with a mirror travel. At this time, a light irradiated from the first travelling body 33 is reflected from a surface of the document, and the reflected light is reflected by the second travelling body 34, which is received by a reading sensor 36 through an imaging lens 35. The document is read thereby, and black, yellow, magenta and cyan image information may be obtained.

Figure 7:
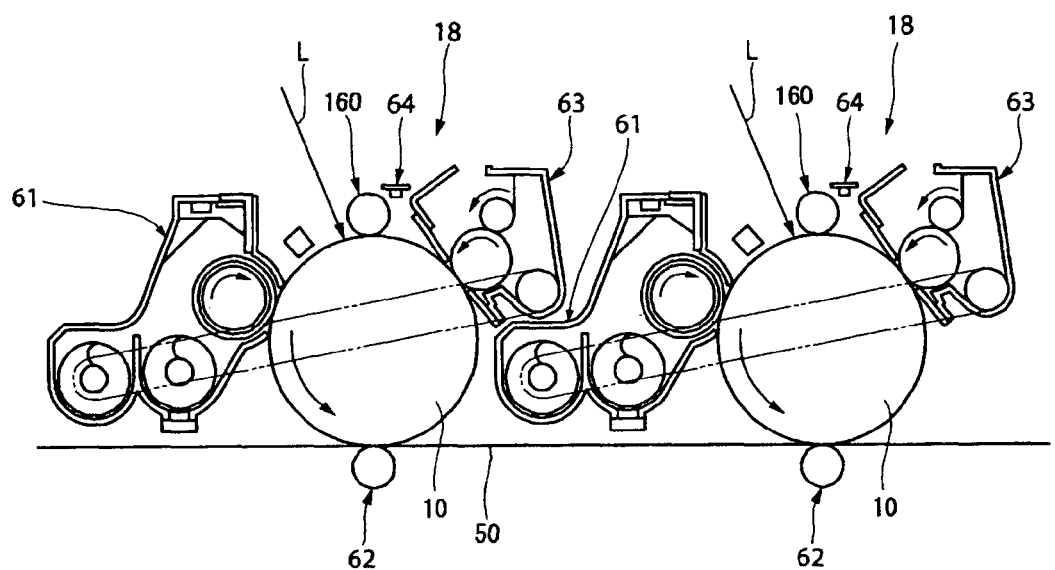
FIG. 7 is a partially enlarged schematic explanatory diagram of the image forming apparatus of FIG. 6.

The image information of the respective colors is transmitted to the image forming unit 120 of the respective colors, and a toner image of the respective colors is formed. As illustrated in FIG. 7, each of the image forming units 120 of the respective colors includes: a photoconductor drum 10; a charge roller 160 which uniformly charges the photoconductor drum 10; an exposure apparatus which exposes an exposure light L on the photoconductor drum 10 to form an electrostatic latent image of the respective colors; a developing apparatus 61 which develops the electrostatic latent image with a developer of the respective colors to form a toner image of the respective colors; a transfer roller 62 for transferring the toner image to an intermediate belt 50; a cleaning apparatus 63 including a cleaning blade; and a neutralizing lamp 64.

The toner image of the respective colors formed in the image forming unit 120 of the respective colors is sequentially transferred (primary transfer) and superimposed on the intermediate transfer member 50 which is stretched and moved by the rollers 14, 15 and 16, and a composite toner image is formed.

Meanwhile, in the sheet feeding table 200, one of sheet feeding rollers 142 is selectively rotated to feed recording paper from one of the paper feed cassettes 144 equipped in multiple stages in a paper bank 143. The recording paper is separated one by one by a separation roller 145 and sent to a sheet feeding path 146. Each recording paper is conveyed by a conveying roller 147 and guided to a sheet feeding path 148, and it stops by striking a resist roller 49. Alternatively, a sheet feeding roller is rotated to feed recording paper on a manual feed tray 54. The recording paper is separated one by one by a separation roller 52 and guided to a manual sheet feeding path 53, and it stops by striking the resist roller 49. Here, the resist roller 49 is generally used while grounded, but it may also be used in a state that a bias is applied for removing paper dust on the recording paper. Next, by rotating the resist roller 49 in accordance with the timing of the composite toner image formed on the intermediate transfer belt 50, the recording paper is fed between the intermediate transfer belt 50 and a secondary transfer belt 24. Thereby, the composite toner image is transferred (secondary transfer) on the recording paper. Here, the toner remaining on the intermediate transfer belt 50 after transferring the composite toner image is removed by the cleaning apparatus 17.

The recording paper on which the composite toner image is transferred is conveyed by the secondary transfer belt 24, and then the composite image is fixed by the fixing apparatus 25. Next, the conveying path is switched by a switching claw 55, and the recording paper is discharged onto a paper discharge tray 57 by a discharge roller 56. Alternatively, the conveying path is switched by the switching claw 55, and the recording paper is inverted by an inverting device 28. After an image is formed similarly on the rear surface as well, the recording paper is discharged onto the paper discharge tray 57 by the discharge roller 56.

In an image forming apparatus of the present invention, a high-gloss and high-quality image may be provided for a long period of time by using a toner of the present invention.

EXAMPLES

The present invention will next be described in more detail by way of Examples. Here, it is easy for persons skilled in the art to appropriately modify/adapt Examples of the present invention so as to create other embodiments; it should be noted that the present invention encompasses such modification/adaption, and the following describes preferred embodiments of the present invention and is not intended to limit the present invention thereto.

In Examples, the unit "part(s)" is "part(s) by mass."
(Production of Resins)
First, Production Examples of resins used in Examples and Comparative Examples will next be described.
[Synthesis of Crystalline Polyester Unit 1]
A reaction container equipped with a condenser, a stirrer and a nitrogen-introducing tube was charged with 249 parts of 1,6-hexanediol, 394 parts of sebacic acid and 0.8 parts of dibutyltin oxide, and the mixture was allowed to react under normal pressure at 180° C. for 6 hours.

Next, the reaction mixture was allowed to react at a reduced pressure of 10 mmHg to 15 mmHg for 4 hours, to thereby synthesize [crystalline polyester unit 1].

The obtained [crystalline polyester unit 1] was found to have a number average molecular weight of 4,000, a weight average molecular weight of 9,100 and a melting point of 66° C.
[Synthesis of Crystalline Polyester Unit 2]
A reaction container equipped with a condenser, a stirrer and a nitrogen-introducing tube was charged with 369 parts of 1,10-decanediol, 289 parts of adipic acid and 0.8 parts of dibutyltin oxide, and the mixture was allowed to react under normal pressure at 180° C. for 6 hours.

Next, the reaction mixture was allowed to react at a reduced pressure of 10 mmHg to 15 mmHg for 4 hours, to thereby synthesize [crystalline polyester unit 2].

The obtained [crystalline polyester unit 2] was found to have a number average molecular weight of 4,900, a weight average molecular weight of 10,200 and a melting point of 65° C.
[Synthesis of Crystalline Polyester Unit 3]
A reaction container equipped with a condenser, a stirrer and a nitrogen-introducing tube was charged with 230 parts of 1,6-hexanediol, 23 parts of 1,4-butanediol, 390 parts of sebacic acid and 0.8 parts of dibutyltin oxide, and the mixture was allowed to react under normal pressure at 180° C. for 6 hours.

Next, the reaction mixture was allowed to react at a reduced pressure of 10 mmHg to 15 mmHg for 4 hours, to thereby synthesize [crystalline polyester unit 3].

The obtained [crystalline polyester unit 3] was found to have a number average molecular weight of 2,500, a weight average molecular weight of 7,600 and a melting point of 57° C.

[Synthesis of Crystalline Polyester Unit 4]

A reaction container equipped with a condenser; a stirrer and a nitrogen-introducing tube was charged with 316 parts of 1,10-decanediol, 19 parts of 1-docosanol, 271 parts of adipic acid and 0.8 parts of dibutyltin oxide, and the mixture was allowed to react under normal pressure at 180° C. for 6 hours.

Next, the reaction mixture was allowed to react at a reduced pressure of 10 mmHg to 15 mmHg for 4 hours, to thereby synthesize [crystalline polyester unit 4].

The obtained [crystalline polyester unit 4] was found to have a number average molecular weight of 4,900, a weight average molecular weight of 24,200 and a melting point of 63° C.

[Synthesis of Polyurethane Prepolymer 1]

A reaction container equipped with a condenser, a stirrer and a nitrogen-introducing tube was charged with 235 parts of bisphenol A propylene oxide 2 mole adduct, 10 parts of propylene glycol, 254 parts of 4,4'-diphenylmethane diisocyanate and 600 parts of ethyl acetate, and the mixture was allowed to react under normal pressure at 80° C. for 3 hours to thereby synthesize [polyurethane prepolymer 1].

The obtained [polyurethane prepolymer 1] was found to have a number average molecular weight of 2,600 and a weight average molecular weight of 5,600.

[Synthesis of Polyurethane Prepolymer 2]

A reaction container equipped with a condenser, a stirrer and a nitrogen-introducing tube was charged with 234 parts of bisphenol A propylene oxide 2 mole adduct, 7 parts of propylene glycol, 2 parts of ion exchange water, 265 parts of 4,4'-diphenylmethane diisocyanate and 600 parts of ethyl acetate, and the mixture was allowed to react under normal pressure at 80° C. for 3 hours to thereby synthesize [polyurethane prepolymer 2].

The obtained [polyurethane prepolymer 2] was found to have a number average molecular weight of 2,900 and a weight average molecular weight of 6,500.

The [polyurethane prepolymer 2] has a urea bond.

[Synthesis of Polyurethane Prepolymer 3]

A reaction container equipped with a condenser, a stirrer and a nitrogen-introducing tube was charged with 80 parts of bisphenol A ethylene oxide 2 mole adduct, 175 parts of bisphenol A propylene oxide 2 mole adduct, 11 parts of propylene glycol, 248 parts of isophorone diisocyanate and 600 parts of methyl ethyl ketone, and the mixture was allowed to react under normal pressure at 80° C. for 3 hours to thereby synthesize [polyurethane prepolymer 3].

The obtained [polyurethane prepolymer 3] was found to have a number average molecular weight of 2,700 and a weight average molecular weight of 5,900.

[Synthesis of Resin a-1]

A reaction container equipped with a condenser, a stirrer and a nitrogen-introducing tube was charged with 430 parts of the [crystalline polyester unit 1], 176 parts of the [polyurethane prepolymer 1] and 400 parts of ethyl acetate, and the mixture was allowed to react under normal pressure at 80° C. for 5 hours. Thereafter, the solvent was removed to obtain [resin a-1] composed of the crystalline polyester unit and the polyurethane prepolymer unit.

The obtained [resin a-1] was found to have a number average molecular weight of 10,100, a weight average molecular weight of 31,000, a nitrogen atom concentration of 1.7% by mass and a melting point of 65° C.

[Synthesis of Resin a-2]

A reaction container equipped with a condenser, a stirrer and a nitrogen-introducing tube was charged with 427 parts of the [crystalline polyester unit 2], 15 parts of 4,4'-diphenylmethane diisocyanate and 420 parts of methyl ethyl ketone, and the mixture was allowed to react under normal pressure at 80° C. for 5 hours. Thereafter, the solvent was removed to obtain [resin a-2] where the crystalline polyester units are linked together by 4,4'-diphenylmethane diisocyanate with the linking moiety containing a urethane bond.

The obtained [resin a-2] was found to have a number average molecular weight of 11,300, a weight average molecular weight of 33,000, a nitrogen atom concentration of 0.4% by mass and a melting point of 66° C.

[Synthesis of Resin a-3]

A reaction container equipped with a condenser, a stirrer and a nitrogen-introducing tube was charged with 352 parts of the [crystalline polyester unit 3], 180 parts of the [polyurethane prepolymer 1] and 420 parts of ethyl acetate, and the mixture was allowed to react under normal pressure at 80° C. for 5 hours. Thereafter, the solvent was removed to obtain [resin a-3] composed of the crystalline polyester unit and the polyurethane prepolymer unit.

The obtained [resin a-3] was found to have a number average molecular weight of 7,400, a weight average molecular weight of 16,000, a nitrogen atom concentration of 2.0% by mass and a melting point of 56° C.

[Synthesis of Resin a-4]

A reaction container equipped with a condenser, a stirrer and a nitrogen-introducing tube was charged with 242 parts of 1,6-hexanediol, 14 parts of 1-docosanol, 33 parts of adipic acid, 374 parts of sebacic acid and 0.8 parts of dibutyltin oxide, and the mixture was allowed to react under normal pressure at 180° C. for 7 hours.

Next, the reaction mixture was allowed to react at a reduced pressure of 10 mmHg to 15 mmHg for 5 hours, to thereby synthesize [resin a-4] composed only of the crystalline polyester unit.

The obtained [resin a-4] was found to have a number average molecular weight of 5,700, a weight average molecular weight of 42,100, a nitrogen atom concentration of less than 0.1% by mass and a melting point of 62° C.

[Synthesis of Resin a-5]

A reaction container equipped with a condenser, a stirrer and a nitrogen-introducing tube was charged with 480 parts of the [crystalline polyester unit 4], 59 parts of the [polyurethane prepolymer 3] and 531 parts of ethyl acetate, and the mixture was allowed to react under normal pressure at 80° C. for 5 hours. Thereafter, the solvent was removed to obtain [resin a-5] composed of the crystalline polyester unit and the polyurethane prepolymer unit.

The obtained [resin a-5] was found to have a number average molecular weight of 5,600, a weight average molecular weight of 40,600, a nitrogen atom concentration of 0.6% by mass and a melting point of 63° C.

[Synthesis of Resin a-6]

A reaction container equipped with a condenser, a stirrer and a nitrogen-introducing tube was charged with 480 parts of the [crystalline polyester unit 4], 61 parts of the [polyurethane prepolymer 2] and 540 parts of ethyl acetate, and the mixture was allowed to react under normal pressure at 80° C. for 5 hours. Thereafter, the solvent was removed to obtain [resin a-6] composed of the crystalline polyester unit and the polyurethane prepolymer unit.

The obtained [resin a-6] was found to have a number average molecular weight of 5,900, a weight average molecular weight of 41,100, a nitrogen atom concentration of 0.6% by mass and a melting point of 63° C.

[Synthesis of Resin b-1]

A reaction container equipped with a condenser, a stirrer and a nitrogen-introducing tube was charged with 389 parts of the [crystalline polyester unit 1], 45 parts of 4,4'-diphenylmethane diisocyanate and 434 parts of ethyl acetate, and the mixture was allowed to react under normal pressure at 80° C. for 5 hours to thereby obtain [resin b-1] which is a polyester prepolymer.

The [resin b-1] contained a solvent and the solid content of the resin was 50% by mass.

[Synthesis of Resin b-2]

A reaction container equipped with a condenser, a stirrer and a nitrogen-introducing tube was charged with 682 parts of bisphenol A ethylene oxide 2 mole adduct, 81 parts of bisphenol A propylene oxide 2 mole adduct, 283 parts of terephthalic acid, 22 parts of trimellitic anhydride and 2 parts of dibutyltin oxide, and the mixture was allowed to react under normal pressure at 230° C. for 8 hours. The reaction mixture was further allowed to react at a reduced pressure of 10 mmHg to 15 mmHg for 5 hours to thereby obtain [intermediate polyester 1]. The [intermediate polyester 1] was found to have a number average molecular weight of 2,100, a weight average molecular weight of 9,500, a Tg of 55° C., an acid value of 0.5 and a hydroxyl value of 49.

Next, a reaction container equipped with a condenser, a stirrer and a nitrogen-introducing tube was charged with 411 parts of the [intermediate polyester 1], 89 parts of isophorone diisocyanate and 500 parts of ethyl acetate, and the mixture was allowed to react at 100° C. for 5 hours to thereby obtain [resin b-2] which is a polyester prepolymer.

The [resin b-2] contained the solvent and the solid content of the resin was 50% by mass.

[Preparation of Colorant Dispersion Liquid]

A beaker was charged with 20 parts of copper phthalocyanine, 4 parts of a colorant disperser (SOLSPERSE 28000, product of Lubrizol Co.) and 76 parts of ethyl acetate, and the mixture was stirred so that the components were homogeneously dispersed. Thereafter, the copper phthalocyanine was finely dispersed with a beads mill to thereby obtain [colorant dispersion liquid 1]. The [colorant dispersion liquid 1] was measured for volume average particle diameter using particle diameter measuring device LA-920 (product of HORIBA CO. LTD.) and was found to have a volume average particle diameter of 0.3 µm.

[Preparation of Releasing Agent Dispersion Liquid 1]

A reaction container equipped with a condenser, a stirrer and a nitrogen-introducing tube was charged with 15 parts of [sunflower wax] (ECOSOLE, product of NIPPON SEIRO CO. LTD.) and 85 parts of ethyl acetate, and the mixture was heated to 78° C. so that the wax was thoroughly dissolved. The resultant mixture was cooled to 30° C. for 1 hour while being stirred and then was wet-milled using ULTRAVISCOMILL (product of Aimex CO. LTD.) under the following conditions: liquid-feeding rate: 1.0 kg/hr; disc-circumference speed: 10 m/sec; volume of 0.5-mm zirconia beads packed: 80% by volume; and pass time: 6. Finally, ethyl acetate was added to the resultant mixture so that the solid content concentration thereof became 15% by mass, whereby [releasing agent dispersion liquid 1] was obtained.

Example 1

A beaker was charged with 84 parts of the [resin a-1], 32 parts of the [resin b-1], 14 parts of the [releasing agent dispersion liquid 1], 10 parts of the [colorant dispersion liquid 1] and 84 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 1] was obtained.

To the beaker were added 99 parts of ion exchange water, 6 parts of 25% by mass aqueous dispersion liquid of fine organic particles for stabilizing dispersion (copolymer of styrene-methacrylic acid-butyl acrylate-sodium salt of sulfuric acid ester of methacrylic acid ethylene oxide adduct), 1 part of sodium carboxymethyl cellulose and 10 parts of 48.5% by mass aqueous solution of sodium dodecyl diphenyl ether disulfonate ("ELEMINOL MON-7," product of Sanyo Chemical Industries Ltd.) and the components were homogeneously dissolved.

Next, 75 parts of the [toner material liquid 1] was added to the mixture while the mixture was being stirred 50° C. with a TK homomixer at 10,000 rpm, and the resultant mixture was stirred for 2 min.

Subsequently, the obtained mixture was transferred to a flask equipped with a stirring rod and a thermometer, and was evaporated at 55° C. until the concentration of the ethyl acetate became 0.5% by mass or lower, whereby [aqueous resin dispersion of resin particles 1] was obtained.

Thereafter, the following pre-washing step was performed. Specifically, the [aqueous resin dispersion of resin particles 1] was cooled to room temperature, followed by filtration, and 300 parts of ion exchange water was added to the obtained filtration cake. Then, the resultant mixture was mixed using a TK homomixer at 12,000 rpm for 10 min and filtrated. This treatment of addition/mixing/filtration was performed twice.

Next, 300 parts of ion exchange water was added to the obtained filtration cake. Then, the resultant mixture was mixed using a TK homomixer at 12,000 rpm for 10 min and filtrated. This treatment of addition/mixing/filtration was performed three times. Subsequently, 300 parts of 1% by mass hydrochloric acid was added to the obtained filtration cake and the resultant mixture was mixed using a TK homomixer at 12,000 rpm for 10 min and filtrated. Finally, 300 parts of ion exchange water was added to the obtained filtration cake and the resultant mixture was mixed using a TK homomixer at 12,000 rpm for 10 min and filtrated, where this treatment of addition/mixing/filtration was performed twice to thereby obtain a filtration cake.

The obtained cake was beaten and dried at 40° C. for 22 hours, to thereby obtain [resin particles 1] having a volume average particle diameter of 5.6 µm.

Next, 100 parts of the obtained [resin particles 1] and 1.0 part of hydrophobic silica (H2000, product of Clariant Japan, CO. LTD.) serving as an external additive were mixed together using HENSCHEL MIXER (product of NIPPON COKE & ENGINEERING CO. LTD.) at a circumferential speed of 30 m/sec with five cycles each consisting of mixing for 30 sec and suspending for 1 min. The resultant mixture was sieved with a mesh having an opening size of 35 µm to produce toner (1-1).

Figure 3:
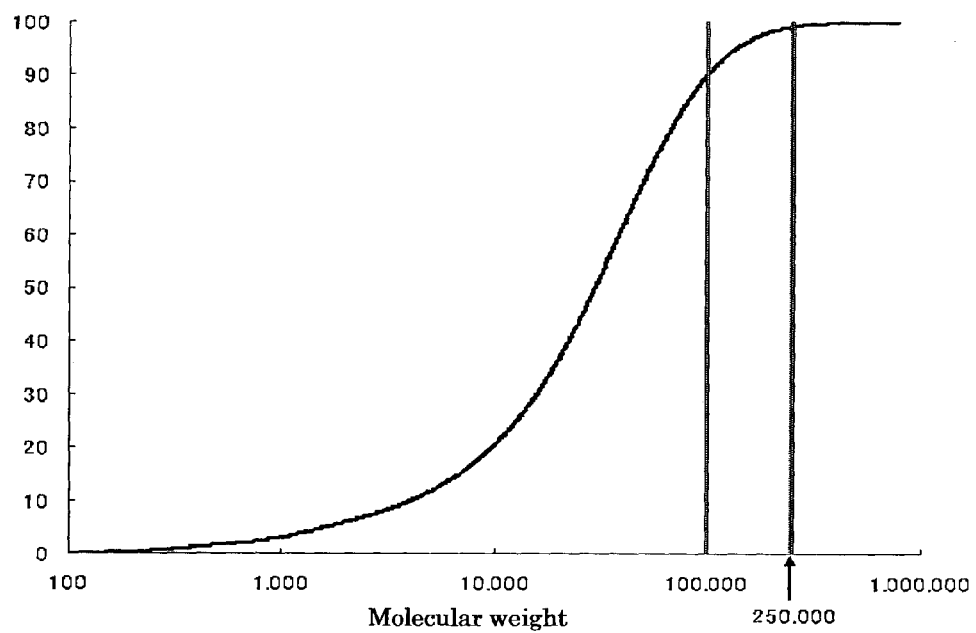
FIG. 3 is a diagram illustrating an integrated molecular weight distribution curve of a toner in Example 1.

The integrated molecular weight distribution curve of the obtained toner (1-1) is shown in FIG. 3.

Example 2

A beaker was charged with 89 parts of the [resin a-1], 22 parts of the [resin b-1], 14 parts of the [releasing agent dispersion liquid 1], 10 parts of the [colorant dispersion liquid 1] and 89 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 2] was obtained. The rest of the procedure was performed in the same manner as in Example 1, except that the [toner material liquid 1] was changed to the [toner material liquid 2], to thereby produce toner (1-2).

Example 3

A beaker was charged with 94 parts of the [resin a-1], 12 parts of the [resin b-1], 14 parts of the [releasing agent dispersion liquid 1], 10 parts of the [colorant dispersion liquid 1] and 94 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 3] was obtained. The rest of the procedure was performed in the same manner as in Example 1, except that the [toner material liquid 1] was changed to the [toner material liquid 3], to thereby produce toner (1-3).

Example 4

A beaker was charged with 75 parts of the [resin a-1], 50 parts of the [resin b-1], 14 parts of the [releasing agent dispersion liquid 1], 10 parts of the [colorant dispersion liquid 1] and 75 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 4] was obtained. The rest of the procedure was performed in the same manner as in Example 1, except that the [toner material liquid 1] was changed to the [toner material liquid 4], to thereby produce toner (1-4).

Example 5

A beaker was charged with 80 parts of the [resin a-2], 40 parts of the [resin b-1], 14 parts of the [releasing agent dispersion liquid 1], 10 parts of the [colorant dispersion liquid 1] and 80 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 5] was obtained. The rest of the procedure was performed in the same manner as in Example 1, except that the [toner material liquid 1] was changed to the [toner material liquid 5], to thereby produce toner (1-5).

Example 6

A beaker was charged with 68 parts of the [resin a-3], 64 parts of the [resin b-1], 14 parts of the [releasing agent dispersion liquid 1], 10 parts of the [colorant dispersion liquid 1] and 68 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 6] was obtained. The rest of the procedure was performed in the same manner as in Example 1, except that the [toner material liquid 1] was changed to the [toner material liquid 6], to thereby produce toner (1-6).

Example 7

A beaker was charged with 100 parts of the [resin a-4], 14 parts of the [releasing agent dispersion liquid 1], 10 parts of the [colorant dispersion liquid 1] and 100 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 7] was obtained. The rest of the procedure was performed in the same manner as in Example 1, except that the [toner material liquid 1] was changed to the [toner material liquid 7], to thereby produce toner (1-7).

Example 8

The procedure of Example 7 was repeated, except that the [resin a-4] was changed to the [resin a-5], to thereby produce toner (1-8).

Example 9

The procedure of Example 7 was repeated, except that the [resin a-4] was changed to the [resin a-6], to thereby produce toner (1-9).

Example 10

A beaker was charged with 84 parts of the [resin a-1], 4 parts of the [resin b-1], 28 parts of the [resin b-2], 14 parts of the [releasing agent dispersion liquid 1], 10 parts of the [colorant dispersion liquid 1] and 84 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 10] was obtained. The rest of the procedure was performed in the same manner as in Example 1, except that the [toner material liquid 1] was changed to the [toner material liquid 10], to thereby produce toner (1-10).

Example 11

The procedure of Example 1 was repeated, except that the [resin b-1] was changed to the [resin b-2], to thereby produce toner (1-11).

Comparative Example 1

A beaker was charged with 72 parts of the [resin a-1], 56 parts of the [resin b-1], 14 parts of the [releasing agent dispersion liquid 1], 10 parts of the [colorant dispersion liquid 1] and 72 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 101] was obtained. The rest of the procedure was performed in the same manner as in Example 1, except that the [toner material liquid 1] was changed to the [toner material liquid 101], to thereby produce toner (101).

Comparative Example 2

A beaker was charged with 97 parts of the [resin a-1], 6 parts of the [resin b-1], 14 parts of the [releasing agent dispersion liquid 1], 10 parts of the [colorant dispersion liquid 1] and 97 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 102] was obtained. The rest of the procedure was performed in the same manner as in Example 1, except that the [toner material liquid 1] was changed to the [toner material liquid 102], to thereby produce toner (102).

Comparative Example 3

A beaker was charged with 86 parts of the [resin a-3], 28 parts of the [resin b-1], 14 parts of the [releasing agent dispersion liquid 1], 10 parts of the [colorant dispersion liquid 1] and 86 parts of ethyl acetate, and the resin was dissolved while the mixture was being stirred at 50° C. The resultant mixture was stirred with a TK homomixer at 8,000 rpm and the resin was homogeneous dispersed, whereby [toner material liquid 103] was obtained. The rest of the procedure was performed in the same manner as in Example 1, except that the [toner material liquid 1] was changed to the [toner material liquid 103], to thereby produce toner (103).

[Evaluation Methods]

In the below-described methods, each of the toners obtained in Examples and Comparative Examples was evaluated for fixability, and an image formed therewith was evaluated for glossiness.

<Fixability>

As a thin paper sheet was used a paper sheet of long grain: i.e., copy paper sheet <55> (product of Ricoh Company, Ltd.) (described as "55T" in Table 1-3) and as a thick paper sheet was used a paper sheet of long grain: i.e., copy paper sheet <135> (product of Ricoh Company, Ltd.) (described as "135T" in Table 1-3). A solid image having a width of 50 mm was formed on the thin or thick paper sheet so that the toner deposition amount became 0.85±0.1 mg/cm². There was used an apparatus formed by modifying the fixing portion of an electrophotographic copier (MF-200, product of Ricoh Company, Ltd.) containing a TEFLON (registered trademark) roller as a fixing roller. The paper sheet having the solid image was fed to this apparatus under conditions that the temperature of the fixing belt was set to 120° C. with external control and the linear velocity of the belt was set to 300 mm/min, to thereby confirm whether or not offset occurred. Needless to say, the occurrence of offset is not preferred since it degrades printing quality considerably.

Next, using draw tester AD-401 (product of Ueshima Seisakusho Co., Ltd.), a sapphire needle (radium: 125 µm) was moved at a state of being in contact with the colored portion of the fixed image under conditions that the rotation diameter of the needle was 8 mm and the load was 1 g. The portion where the needle had been moved was rubbed with a waste five times and then the state of the image was evaluated according to the following evaluation criteria.

A: There was no loss of the image.
B: After rubbing, slight image loss occurred as scratched traces.
C: After rubbing, clear image loss occurred as scratched traces.
D: After rubbing, not only the scratched portions but also the other image portions were peeled off.

[Glossiness]

The 60-degree glossiness of the image was measured using a glossimeter (VG-700, product of NIPPON DENSHOKU INDUSTRIES CO., LTD.). The glossiness is preferably 5 or more, more preferably 10 or more. The difference in glossiness between the thin paper and the thick paper (described as "Difference" in Table 1-3) is preferably smaller; i.e., less than 4, more preferably less than 2. When the difference in glossiness therebetween is great, the difference in image between on the thin paper and on the thick paper becomes considerable to give different impressions, which is not preferred. This requires controlling the image glossiness by separately changing the fixing temperature and the fixing speed.

<<Fixability (Minimum Fixing Temperature)>>

Using a tandem full-color image forming apparatus 100C depicted in FIG. 6, a solid image having an image size of 3 cm×8 cm was formed on a paper sheet (product of Ricoh Business Expert, Ltd., a copy paper sheet <70>), the solid image having a toner deposition amount of 0.85±0.10 mg/cm². Then, the formed solid image was fixed with the temperature of the fixing belt changed. The fixed image surface was drawn with a ruby needle (tip radius: 260 µmR to 320 µmR, tip angle: 60 degrees) at a load of 50 g using draw tester AD-401 (product of Ueshima Seisakusho Co., Ltd.). The drawn image surface was strongly rubbed five times with a fabric (HONECOTTO #440, Hanylon Co. Ltd.). Here, the temperature of the fixing belt at which almost no peeling-off of the image occurred was determined as the minimum fixing temperature. The solid image was formed on the paper sheet at a position 3.0 cm away from an edge of the paper sheet that entered the image forming apparatus. Notably, the speed at which the paper sheet passed through the nip portion of the fixing device was 280 mm/s. The lower minimum fixing temperature means the more excellent low-temperature fixability.

[Evaluation Criteria]
A: Minimum fixing temperature≤105° C.
B: 105° C.<Minimum fixing temperature≤115° C.
C: 115° C.<Minimum fixing temperature≤130° C.
D: 130° C.<Minimum fixing temperature <<Fixability (Hot Offset Resistance, Fixable Range)>>

Using a tandem full-color image forming apparatus 100C depicted in FIG. 6, a solid image having an image size of 3 cm×8 cm was formed on a paper sheet (product of Ricoh Company, Ltd., Type 6200), the solid image having a toner deposition amount of 0.85±0.10 mg/cm². Then, the formed solid image was fixed with the temperature of the fixing belt changed, to thereby visually evaluate whether or not hot offset occurred. Here, the fixable range is a difference between the minimum fixing temperature and the maximum temperature at which no hot offset occurred. The solid image was formed on the paper sheet at a position 3.0 cm away from an edge of the paper sheet that entered the image forming apparatus. Notably, the speed at which the paper sheet passed through the nip portion of the fixing device was 280 mm/s. The wider fixable range means the more excellent hot offset resistance. Conventional full-color toners have a fixable range of about 50° C. on average.

[Evaluation Criteria]
A: 100° C.<Fixable range
B: 55° C.<Fixable range 100° C.
C: 30° C.<Fixable range 55° C.
D: Fixable range 30° C.

<<Heat Resistance Storage Stability (Penetration Degree)>>

Each toner was charged into a 50-mL glass container and left to stand in a thermostat bath of 50° C. for 24 hours. The thus-treated toner was cooled to 24° C. and then measured for penetration degree (mm) by the penetration degree test (JISK2235-1991) and evaluated according to the following evaluation criteria. Notably, the greater penetration degree means the more excellent heat resistance storage stability. Toner having a penetration degree of less than 5 mm is highly likely to involve problems in use.

Notably, the penetration degree in the present invention is expressed by the penetration depth (mm).

[Evaluation Criteria]
A: 25 mm≤Penetration degree
B: 15 mm≤Penetration degree<25 mm
C: 5 mm≤Penetration degree<15 mm
D: Penetration degree<5 mm <<Stress Resistance>>

Using a tandem full-color image forming apparatus 100C depicted in FIG. 6, a chart having an image occupation rate of 0.5% was formed on 50,000 sheets. Thereafter, a solid image was formed on a sheet and the obtained sheet was visually observed for whether the image portion had white spots free of the toner and evaluated according to the following evaluation criteria.

[Evaluation Criteria]
A: White spots free of the toner were not observed in the image portion; excellent state
B: Few white spots free of the toner were observed in the image portion; good state
C: Some white spots free of the toner were observed in the image portion; but non-problematic in practical use
D: Numerous white spots free of the toner were observed in the image portion; and problematic in practical use <<Transferability>>

Using a tandem full-color image forming apparatus 100C depicted in FIG. 6, a chart having an image occupation rate of 0.5% was formed on 50,000 sheets. Thereafter, in the course of formation of a solid image on a sheet, the image forming apparatus was stopped in operation immediately after the image had been transferred from a photoconductor (10) to an intermediate transfer belt (50). The photoconductor was taken out and then visually observed for untransferred toner remaining the transfer portion thereof and evaluated according to the following evaluation criteria. The evaluation results are shown in Table 9-2.

[Evaluation Criteria]
A: No untransferred toner was observed on the photoconductor; excellent state
B: Untransferred toner was slightly observed on the photoconductor to such an extent that the color of the background of the photoconductor could be perceived; good state
C: Untransferred toner was observed on the photoconductor and the background of the photoconductor was somewhat covered therewith; but non-problematic in practical use
D: Much untransferred toner was observed on the photoconductor and the background of the photoconductor was almost covered therewith; and problematic in practical use The evaluation results are shown in Table 1-3.

TABLE 1-1

| | Formulation | | | | | | Properties | | | | | |
|---|---|---|---|---|---|---|---|---|---|---|---|---|
| | Resin-1 | | Resin-2 | | Resin-3 | | | | | | | |
| | Type | Compositinal ratio on solid content basis | Type | Compositinal ratio on solid content basis | Type | Compositinal ratio on solid content basis | Mn | Mw | Mpt | 100,000 or more | 250,000 or more | Mw/Mn |
| Ex. 1 | Resin a-1 | 84 | Resin b-1 | 16 | — | — | 12,077 | 52,900 | 43,197 | 9.9 | 0.7 | 4.38 |
| Ex. 2 | Resin a-1 | 89 | Resin b-1 | 11 | — | — | 11,800 | 48,400 | 41,500 | 7.9 | 0.5 | 4.10 |
| Ex. 3 | Resin a-1 | 94 | Resin b-1 | 6 | — | — | 11,100 | 43,480 | 38,900 | 5.6 | 0.4 | 3.92 |
| Ex. 4 | Resin a-1 | 75 | Resin b-1 | 25 | — | — | 15,330 | 59,800 | 48,800 | 15.0 | 1.3 | 3.90 |
| Ex. 5 | Resin a-2 | 80 | Resin b-1 | 20 | — | — | 13,600 | 50,100 | 45,200 | 10.8 | 0.9 | 3.68 |
| Ex. 6 | Resin a-3 | 68 | Resin b-1 | 32 | — | — | 10,500 | 40,200 | 35,600 | 17.3 | 1.7 | 3.83 |
| Ex. 7 | Resin a-4 | 100 | — | — | — | — | 6,500 | 42,100 | 32,600 | 5.1 | 0.4 | 6.48 |
| Ex. 8 | Resin a-5 | 100 | — | — | — | — | 5,600 | 40,600 | 30,700 | 5.0 | 0.4 | 7.25 |
| Ex. 9 | Resin a-6 | 100 | — | — | — | — | 5,900 | 41,100 | 31,400 | 5.1 | 0.6 | 6.97 |
| Ex. 10 | Resin a-1 | 84 | Resin b-1 | 2 | Resin b-2 | 14 | 11,400 | 48,800 | 36,500 | 7.1 | 0.6 | 4.28 |
| Ex. 11 | Resin a-1 | 84 | Resin b-2 | 16 | — | — | 11,500 | 47,800 | 37,700 | 7.3 | 0.6 | 4.16 |
| Comp. Ex. 1 | Resin a-1 | 72 | Resin b-1 | 28 | — | — | 16,000 | 61,800 | 50,500 | 16.1 | 1.4 | 3.86 |
| Comp. Ex. 2 | Resin a-1 | 97 | Resin b-1 | 3 | — | — | 10,700 | 40,700 | 37,700 | 4.6 | 0.2 | 3.80 |
| Comp. Ex. 3 | Resin a-3 | 86 | Resin b-1 | 14 | — | — | 7,800 | 19,700 | 18,200 | 8.6 | 0.6 | 2.53 |

TABLE 1-2

| | N (% by mass) | Urethane | Urea | (C)/((C) + (A)) | THF/AcOE insoluble matter (% by mass) | ΔH(T) | ΔH(H) | ΔH(H)/ΔH(T) |
|---|---|---|---|---|---|---|---|---|
| Ex. 1 | 1.54 | Presence | Presence | 0.27 | 14.0 | 60.8 | 46.2 | 0.76 |
| Ex. 2 | 1.59 | Presence | Presence | 0.25 | 10.8 | 57.8 | 41.3 | 0.71 |
| Ex. 3 | 1.64 | Presence | Presence | 0.22 | 9.2 | 52.5 | 33.7 | 0.64 |
| Ex. 4 | 1.45 | Presence | Presence | 0.29 | 14.9 | 63.3 | 55.5 | 0.88 |

TABLE 1-2-continued

| | N (% by mass) | Urethane | Urea | (C)/((C) + (A)) | THF/AcOE insoluble matter (% by mass) | ΔH(T) | ΔH(H) | ΔH(H)/ΔH(T) |
|---|---|---|---|---|---|---|---|---|
| Ex. 5 | 0.46 | Presence | Presence | 0.31 | 14.7 | 79.2 | 75.1 | 0.95 |
| Ex. 6 | 1.65 | Presence | Presence | 0.27 | 17.0 | 51.1 | 62.9 | 1.23 |
| Ex. 7 | <0.01 | Absence | Absence | 0.42 | 8.8 | 88.5 | 85.4 | 0.96 |
| Ex. 8 | 0.67 | Presence | Absence | 0.29 | 10.2 | 74.3 | 72.2 | 0.97 |
| Ex. 9 | 0.66 | Presence | Presence | 0.28 | 10.6 | 72.9 | 71.4 | 0.98 |
| Ex. 10 | 1.51 | Presence | Presence | 0.19 | 7.9 | 48.1 | 18.3 | 0.38 |
| Ex. 11 | 1.51 | Presence | Presence | 0.18 | 12.3 | 45.2 | 8.1 | 0.18 |
| Comp. Ex. 1 | 1.42 | Presence | Presence | 0.30 | 15.8 | 65.6 | 57.3 | 0.87 |
| Comp. Ex. 2 | 1.67 | Presence | Presence | 0.20 | 8.2 | 50.8 | 31.2 | 0.61 |
| Comp. Ex. 3 | 1.82 | Presence | Presence | 0.24 | 12.8 | 49.9 | 50.3 | 1.01 |

TABLE 1-3

| | Evaluation for fixation | | | | | | | | Heat resistance storage stability | Stress resistance | Transferability |
|---|---|---|---|---|---|---|---|---|---|---|---|
| | Fixability | | Post-fixation state | | Glossiness | | | Min. Fixable temp. | range | | |
| | 55T | 135T | 55T | 135T | 55T | 135T | Difference | | | | |
| Ex. 1 | A | B | A | A | 9.4 | 8.3 | 1.1 | C | B | A | A | A |
| Ex. 2 | A | A | A | A | 13.5 | 12.1 | 1.4 | B | A | A | A | A |
| Ex. 3 | A | A | A | A | 21.1 | 16.8 | 4.3 | B | C | B | A | A |
| Ex. 4 | A | B | B | C | 4.5 | 4.2 | 0.3 | C | B | A | A | A |
| Ex. 5 | A | B | A | A | 12.7 | 11.9 | 0.8 | C | B | A | C | C |
| Ex. 6 | B | A | B | C | 2.8 | 2.4 | 0.4 | B | A | B | A | A |
| Ex. 7 | C | B | B | B | 24.9 | 19.2 | 5.7 | C | C | A | C | C |
| Ex. 8 | B | A | A | B | 19.0 | 17.3 | 1.7 | A | C | A | B | B |
| Ex. 9 | B | A | A | A | 15.7 | 15.2 | 0.5 | A | C | A | B | B |
| Ex. 10 | C | A | A | A | 18.5 | 12.3 | 6.2 | C | B | C | A | A |
| Ex. 11 | C | C | A | A | 21.6 | 11.9 | 9.7 | C | B | C | C | C |
| Comp. Ex. 1 | B | B | D | D | 2.0 | 1.7 | 0.3 | C | B | A | A | A |
| Comp. Ex. 2 | D | A | A | A | — | 19.8 | — | D | C | B | A | A |
| Comp. Ex. 3 | D | B | A | A | — | 11.9 | — | D | C | C | A | A |

Production Example 1

Production of Crystalline Polyurethane Resin A-1

A reaction container to which a stirrer and a thermometer had been set was charged with 45 parts of 1,4-butanediol (0.50 mol), 59 parts of 1,6-hexanediol (0.50 mol) and 200 parts of methyl ethyl ketone (hereinafter abbreviated as "MEK"). Then, 250 parts of 4,4'-diphenylmethane diisocyanate (MDI) (1.00 mol) was added to the resultant solution, followed by being allowed to react at 80° C. for 5 hours. Subsequently, the solvent was removed to obtain [crystalline polyurethane resin A-1]. The obtained [crystalline polyurethane resin A-1] was found to have a Mw of 20,000 and a melting point of 60° C.

Production Example 2

Production of Urethane-Modified Crystalline Polyester Resin A-2

A reaction vessel equipped with a condenser, a stirrer and a nitrogen-introducing tube was charged with 202 parts of sebacic acid (1.00 mol), 15 parts of adipic acid (0.10 mol), 177 parts of 1,6-hexanediol (1.50 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 12,000, whereby [crystalline polyester resin A'-2] was obtained. The obtained [crystalline polyester resin A'-2] was found to have a Mw of 12,000.

Next, the obtained [crystalline polyester resin A'-2] was transferred to a reaction vessel equipped with a condenser, a stirrer and a nitrogen-introducing tube, and 350 parts of ethyl acetate and 30 parts of 4,4'-diphenylmethane diisocyanate (MDI) (0.12 mol) were added thereto, followed by being allowed to react under nitrogen flow at 80° C. for 5 hours. Next, the ethyl acetate was evaporated under reduced pressure to obtain [urethane-modified crystalline polyester resin A-2]. The obtained (urethane-modified crystalline polyester resin A-21 was found to have a Mw of 22,000 and a melting point of 62° C.

Production Example 3

Production of Urethane-Modified Crystalline Polyester Resin A-3

A reaction vessel equipped with a condenser, a stirrer and a nitrogen-introducing tube was charged with 202 parts of sebacic acid (1.00 mol), 189 parts of 1,6-hexanediol (1.60 mol) and 0.5 parts of dibutyltin oxide serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 6,000, whereby [crystalline polyester resin A'-3] was obtained. The obtained [crystalline polyester resin A'-3] was found to have a Mw of 6,000.

Next, the obtained [crystalline polyester resin A'-3] was transferred to a reaction vessel equipped with a condenser, a stirrer and a nitrogen-introducing tube, and 300 parts of ethyl acetate and 38 parts of 4,4'-diphenylmethane diisocyanate (MDI) (0.15 mol) were added thereto, followed by being allowed to react under nitrogen flow at 80° C. for 5 hours. Next, the ethyl acetate was evaporated under reduced pressure to obtain [urethane-modified crystalline polyester resin A-3]. The obtained [urethane-modified crystalline polyester resin A-3] was found to have a Mw of 10,000 and a melting point of 64° C.

Production Example 4

Production of Urethane-Modified Crystalline Polyester Resin A-4

A reaction vessel equipped with a condenser, a stirrer and a nitrogen-introducing tube was charged with 185 parts of sebacic acid (0.91 mol), 13 parts of adipic acid (0.09 mol), 106 parts of 1,4-butanediol (1.18 mol) and 0.5 parts of titanium dihydroxybis(triethanolaminate) serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,4-butanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 14,000, whereby [crystalline polyester resin A'-4] was obtained. The obtained [crystalline polyester resin A'-4] was found to have a Mw of 14,000.

Next, the obtained [crystalline polyester resin A'-4] was transferred to a reaction vessel equipped with a condenser, a stirrer and a nitrogen-introducing tube, and 250 parts of ethyl acetate and 12 parts of hexamethylene diisocyanate (HDI) (0.07 mol) were added thereto, followed by being allowed to react under nitrogen flow at 80° C. for 5 hours. Next, the ethyl acetate was evaporated under reduced pressure to obtain [urethane-modified crystalline polyester resin A-4]. The obtained [urethane-modified crystalline polyester resin A-4] was found to have a Mw of 39,000 and a melting point of 63° C.

Production Example 5

Production of Urethane-Modified Crystalline Polyester Resin A-5

A reaction vessel equipped with a condenser, a stirrer and a nitrogen-introducing tube was charged with 166 parts of sebacic acid (0.82 mol), 26 parts of adipic acid (0.18 mol), 131 parts of 1,4-butanediol (1.45 mol) and 0.5 parts of titanium dihydroxybis(triethanolaminate) serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,4-butanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 8,000, whereby [crystalline polyester resin A'-5] was obtained. The obtained [crystalline polyester resin A'-5] was found to have a Mw of 8,000.

Next, the obtained [crystalline polyester resin A'-5] was transferred to a reaction vessel equipped with a condenser, a stirrer and a nitrogen-introducing tube, and 250 parts of ethyl acetate and 33 parts of 4,4'-diphenylmethane diisocyanate (MDI) (0.13 mol) were added thereto, followed by being allowed to react under nitrogen flow at 80° C. for 5 hours. Next, the ethyl acetate was evaporated under reduced pressure to obtain [urethane-modified crystalline polyester resin A-5]. The obtained [urethane-modified crystalline polyester resin A-5] was found to have a Mw of 17,000 and a melting point of 54° C.

Production Example 6

Production of Urethane-Modified Crystalline Polyester Resin A-6

A reaction vessel equipped with a condenser, a stirrer and a nitrogen-introducing tube was charged with 202 parts of sebacic acid (1.00 mol), 18 parts of adipic acid (0.12 mol), 139 parts of 1,6-hexanediol (1.18 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 18,000, whereby [crystalline polyester resin A'-6] was obtained. The obtained [crystalline polyester resin A'-6] was found to have a Mw of 18,000.

Next, the obtained [crystalline polyester resin A'-6] was transferred to a reaction vessel equipped with a condenser, a stirrer and a nitrogen-introducing tube, and 250 parts of ethyl acetate and 15 parts of 4,4'-diphenylmethane diisocyanate (MDI) (0.06 mol) were added thereto, followed by being allowed to react under nitrogen flow at 80° C. for 5 hours. Next, the ethyl acetate was evaporated under reduced pressure to obtain [urethane-modified crystalline polyester resin A-6]. The obtained [urethane-modified crystalline polyester resin A-6] was found to have a Mw of 42,000 and a melting point of 62° C.

Production Example 7

Production of Urethane-Modified Crystalline Polyester Resin A-7

A reaction vessel equipped with a condenser, a stirrer and a nitrogen-introducing tube was charged with 202 parts of sebacic acid (1.00 mol), 149 parts of 1,6-hexanediol (1.26 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 9,000, whereby [crystalline polyester resin A'-7] was obtained. The obtained [crystalline polyester resin A'-7] was found to have a Mw of 9,000.

Next, the obtained [crystalline polyester resin A'-7] was transferred to a reaction vessel equipped with a condenser, a stirrer and a nitrogen-introducing tube, and 250 parts of ethyl acetate and 28 parts of 4,4'-diphenylmethane diisocyanate (MDI) (0.11 mol) were added thereto, followed by being allowed to react under nitrogen flow at 80° C. for 5 hours. Next, the ethyl acetate was evaporated under reduced pressure to obtain [urethane-modified crystalline polyester resin A-7]. The obtained [urethane-modified crystalline polyester resin A-7] was found to have a Mw of 30,000 and a melting point of 67° C.

Production Example 8

Production of Urethane-Modified Crystalline Polyester Resin A-8

A reaction vessel equipped with a condenser, a stirrer and a nitrogen-introducing tube was charged with 202 parts of sebacic acid (1.00 mol), 191 parts of 1,6-hexanediol (1.62 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 4,000, whereby [crystalline polyester resin A'-8] was obtained. The obtained [crystalline polyester resin A'-8] was found to have a Mw of 4,000.

Next, the obtained [crystalline polyester resin A'-8] was transferred to a reaction vessel equipped with a condenser, a stirrer and a nitrogen-introducing tube, and 300 parts of ethyl acetate and 35 parts of 4,4'-diphenylmethane diisocyanate (MDI) (0.14 mol) were added thereto, followed by being allowed to react under nitrogen flow at 80° C. for 5 hours. Next, the ethyl acetate was evaporated under reduced pressure to obtain [urethane-modified crystalline polyester resin A-8]. The obtained [urethane-modified crystalline polyester resin A-8] was found to have a Mw of 8,500 and a melting point of 64° C.

Production Example 9

Production of Crystalline Polyurea Resin A-9

A reaction vessel equipped with a condenser, a stirrer and a nitrogen-introducing tube was charged with 123 parts of 1,4-butanediamine (1.40 mol), 212 parts of 1,6-hexanediamine (1.82 mol) and 100 parts of methyl ethyl ketone (MEK), followed by stirring. Then, 336 parts of hexamethylene diisocyanate (HDI) (2.00 mol) was added to the resultant mixture, which was allowed to react under nitrogen flow at 60° C. for 5 hours. Next, the MEK was evaporated under reduced pressure to obtain [crystalline polyurea resin A-9]. The obtained [crystalline polyurea resin A-9] was found to have a Mw of 23,000 and a melting point of 64° C.

Production Example 10

Production of Crystalline Polyester Resin A-10

A reaction vessel equipped with a condenser, a stirrer and a nitrogen-introducing tube was charged with 185 parts of sebacic acid (0.91 mol), 13 parts of adipic acid (0.09 mol), 125 parts of 1,4-butanediol (1.39 mol) and 0.5 parts of titanium dihydroxybis(triethanolaminate) serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,4-butanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 10,000, whereby [crystalline polyester resin A-10] was obtained. The obtained [crystalline polyester resin A-10] was found to have a Mw of 9,500 and a melting point of 57° C.

Production Example 11

Production of Crystalline Polyester Resin A-11

A reaction vessel equipped with a condenser, a stirrer and a nitrogen-introducing tube was charged with 202 parts of sebacic acid (1.00 mol), 130 parts of 1,6-hexanediol (1.10 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 30,000, whereby [crystalline polyester resin A-11] was obtained. The obtained [crystalline polyester resin A-11] was found to have a Mw of 27,000 and a melting point of 62° C.

Production Example 12

Production of Block Resin A-12 Composed of Crystalline Portions and Non-Crystalline Portions A reaction vessel equipped with a condenser, a stirrer and a nitrogen-introducing tube was charged with 25 parts of 1,2-propylene glycol (0.33 mol) and 170 parts of methyl ethyl ketone (MEK), followed by stirring. Then, 147 parts of 4,4'-diphenylmethane diisocyanate (MDI) (0.59 mol) was added to the resultant mixture, which was allowed to react at 80° C. for 5 hours, to thereby obtain a MEK solution of [non-crystalline portion c-1] having an isocyanate group at the ends thereof.

Separately, a reaction vessel equipped with a condenser, a stirrer and a nitrogen-introducing tube was charged with 202 parts of sebacic acid (1.00 mol), 160 parts of 1,6-hexanediol (1.35 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 9,000, whereby [crystalline polyester resin A'-12] was obtained. The obtained [crystalline polyester resin A'-12] was found to have a Mw of 8,500 and a melting point of 63° C.

Next, 320 parts of the [crystalline polyester resin A'-12] was dissolved in 320 parts of MEK, and the solution was added as crystalline portions to 340 parts of the MEK solution of [non-crystalline portion c-1]. The resultant mixture was allowed to react under nitrogen at 80° C. for 5 hours. Subsequently, the MEK was evaporated under reduced pressure to obtain [block resin A-12]. The obtained [block resin A-12] was found to have a Mw of 26,000 and a melting point of 62° C.

Production Example 13

Production of Block Resin A-13 Composed of Crystalline Portions and Non-Crystalline Portions A reaction vessel equipped with a condenser, a stirrer and a nitrogen-introducing tube was charged with 39 parts of 1,2-propylene glycol (0.51 mol) and 270 parts of methyl ethyl ketone (MEK), followed by stirring. Then, 228 parts of 4,4'-diphenylmethane diisocyanate (MDI) (0.91 mol) was added to the resultant mixture, which was allowed to react at 80° C. for 5 hours, to thereby obtain a MEK solution of [non-crystalline portion c-2] having an isocyanate group at the ends thereof.

Separately, a reaction vessel equipped with a condenser, a stirrer and a nitrogen-introducing tube was charged with 202 parts of sebacic acid (1.00 mol), 160 parts of 1,6-hexanediol (1.35 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 8,000, whereby [crystalline polyester resin A'-13] was obtained. The obtained [crystalline polyester resin A'-13] was found to have a Mw of 7,500 and a melting point of 62° C.

Next, 320 parts of the [crystalline polyester resin A'-13] was dissolved in 320 parts of MEK, and the solution was added as crystalline portions to 540 parts of the MEK solution of [non-crystalline portion c-2]. The resultant mixture was allowed to react under nitrogen at 80° C. for 5 hours. Subsequently, the MEK was evaporated under reduced pressure to obtain [block resin A-13]. The obtained [block resin A-13] was found to have a Mw of 23,000 and a melting point of 61° C.

Production Example 14

Production of Urethane-Modified Crystalline Polyester Resin B-1

A reaction vessel equipped with a condenser, a stirrer and a nitrogen-introducing tube was charged with 113 parts of sebacic acid (0.56 mol), 109 parts of dimethyl terephthalate (0.56 mol), 132 parts of 1,6-hexanediol (1.12 mol) and 0.5 parts of titanium dihydroxybis(triethanolaminate) serving as a condensing catalyst, and the resultant mixture was allowed to react under nitrogen flow at 180° C. for 8 hours while the water and methanol formed were being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 35,000, whereby [crystalline polyester resin B'-1] was obtained. The obtained [crystalline polyester resin B'-1] was found to have a Mw of 34,000.

Next, the obtained [crystalline polyester resin B'-1] was transferred to a reaction vessel equipped with a condenser, a stirrer and a nitrogen-introducing tube, and 200 parts of ethyl acetate and 10 parts of hexamethylene diisocyanate (HDI) (0.06 mol) were added thereto, followed by being allowed to react under nitrogen flow at 80° C. for 5 hours. Next, the ethyl acetate was evaporated under reduced pressure to obtain [urethane-modified crystalline polyester resin B-1]. The obtained [urethane-modified crystalline polyester resin B-1] was found to have a Mw of 63,000 and a melting point of 65° C.

Production Example 15

Production of Urethane-Modified Crystalline Polyester Resin B-2

A reaction vessel equipped with a condenser, a stirrer and a nitrogen-introducing tube was charged with 204 parts of sebacic acid (1.01 mol), 13 parts of adipic acid (0.09 mol), 136 parts of 1,6-hexanediol (1.15 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 20,000, whereby [crystalline polyester resin B'-2] was obtained. The obtained [crystalline polyester resin B'-2] was found to have a Mw of 20,000.

Next, the obtained [crystalline polyester resin B'-2] was transferred to a reaction vessel equipped with a condenser, a stirrer and a nitrogen-introducing tube, and 200 parts of ethyl acetate and 15 parts of 4,4'-diphenylmethane diisocyanate (MDI) (0.06 mol) were added thereto, followed by being allowed to react under nitrogen flow at 80° C. for 5 hours. Next, the ethyl acetate was evaporated under reduced pressure to obtain [urethane-modified crystalline polyester resin B-2]. The obtained [urethane-modified crystalline polyester resin B-2] was found to have a Mw of 39,000 and a melting point of 63° C.

Production Example 16

Production of Crystalline Polyurea Resin B-3

A reaction vessel equipped with a condenser, a stirrer and a nitrogen-introducing tube was charged with 79 parts of 1,4-butanediamine (0.90 mol), 116 parts of 1,6-hexanediamine (1.00 mol) and 600 parts of methyl ethyl ketone (MEK), followed by stirring. Then, 475 parts of 4,4'-diphenylmethane diisocyanate (MDI) (1.90 mol) was added to the resultant mixture, which was allowed to react under nitrogen flow at 60° C. for 5 hours. Next, the MEK was evaporated under reduced pressure to obtain [crystalline polyurea resin B-3]. The obtained [crystalline polyurea resin B-3] was found to have a Mw of 57,000 and a melting point of 66° C.

Production Example 17

Production of Crystalline Polyester Resin B-4

A reaction vessel equipped with a condenser, a stirrer and a nitrogen-introducing tube was charged with 230 parts of dodecanedioic acid (1.00 mol), 118 parts of 1,6-hexanediol (1.00 mol) and 0.5 parts of tetrabutoxy titanate serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 50,000, whereby [crystalline polyester resin B-4] was obtained. The obtained [crystalline polyester resin B-4] was found to have a Mw of 52,000 and a melting point of 66° C.

Production Example 18

Production of Crystalline Resin Precursor B'-5

A reaction vessel equipped with a condenser, a stirrer and a nitrogen-introducing tube was charged with 202 parts of sebacic acid (1.00 mol), 122 parts of 1,6-hexanediol (1.03 mol) and 0.5 parts of titanium dihydroxybis(triethanolaminate) serving as a condensing catalyst, and the resultant mixture was allowed to react under nitrogen flow at 180° C. for 8 hours while the water formed was being removed. Next, the reaction mixture was allowed to react for 4 hours under nitrogen flow while the water formed and the 1,6-hexanediol were being removed with the temperature of the reaction mixture gradually increased to 220° C. Furthermore, the reaction mixture was allowed to further react at a reduced pressure of 5 mmHg to 20 mmHg until the Mw of the reaction product reached about 25,000.

The obtained [crystalline resin] was transferred to a reaction vessel equipped with a condenser, a stirrer and a nitrogen-introducing tube, and 300 parts of ethyl acetate and 27 parts of hexamethylene diisocyanate (HDI) (0.16 mol) were added thereto, followed by being allowed to react under nitrogen flow at 80° C. for 5 hours, to thereby obtain a 50% by mass ethyl acetate solution of [crystalline resin precursor B'-5] having an isocyanate group on the ends thereof. Next, 10 parts of the 50% by mass ethyl acetate solution of [crystalline resin precursor B'-5] was mixed with 10 parts of tetrahydrofuran (THF), and 1 part of dibutylamine was added to the resultant mixture, followed by stirring for 2 hours. The obtained solution was measured through GPC and as a result the [crystalline resin precursor B'-S] was found to have a Mw of 54,000. After the solvent had been removed from the above solution, the obtained sample was measured through DSC and as a result the [crystalline resin precursor B'-5] was found to have a melting point of 57° C.

Tables 2-1, 2-2, 3 and 4 collectively show the materials used for the production of each crystalline resin and properties of the crystalline resin. In Tables 2-1, 2-2, 3 and 4, regarding the amounts of the materials used in Production Examples, the numerical value in the left column indicates an amount in "part(s)" and the numerical value in the right column indicates an amount in "mol." Also, the numerical value in the column for the catalyst indicates an amount in "part(s)."

TABLE 2-1

| | | Crystalline resin (A) | | | | | | | | | | | |
|---|---|---|---|---|---|---|---|---|---|---|---|---|---|
| | | Polyurethane resin | | Urethane-modified polyester resin | | | | | | | | | |
| | | A-1 | | A-2 | | A-3 | | A-4 | | A-5 | | A-6 | |
| Alcohol component | 1,4-Butanediol | 45 | 0.50 | | | | | 106 | 1.18 | 131 | 1.45 | | |
| | 1,6-Hexanediol | 59 | 0.50 | 177 | 1.50 | 189 | 1.60 | | | | | 139 | 1.18 |
| Carboxylic acid component | Adipic acid | | | 15 | 0.10 | | | 13 | 0.09 | 26 | 0.18 | 18 | 0.12 |
| | Sebacic acid | | | 202 | 1.00 | 202 | 1.00 | 185 | 0.91 | 166 | 0.82 | 202 | 1.00 |
| Isocyanate component | Hexamethylene diisocyanate (HDI) | | | | | | | 12 | 0.07 | | | | |
| | 4,4'-Diphenylmethane diisocyanate (MDI) | 250 | 1.00 | 30 | 0.12 | 38 | 0.15 | | | 33 | 0.13 | 15 | 0.06 |
| Amine component | 1,4-Butanediamine | | | | | | | | | | | | |
| | 1,6-Hexanediamine | | | | | | | | | | | | |
| Catalyst | Titanium dihydroxybis (triethanolaminate) | | | | | | | 0.5 | | 0.5 | | | |
| | Tetrabutoxy titanate | | | 0.5 | | | | | | | | 0.5 | |
| | Dibutyltin oxide | | | | | 0.5 | | | | | | | |
| | Tm | 60 | | 62 | | 64 | | 63 | | 54 | | 62 | |
| | Mw | 20,000 | | 22,000 | | 10,000 | | 39,000 | | 17,000 | | 42,000 | |

TABLE 2-2

| | | Crystalline resin (A) | | | | | | | | |
|---|---|---|---|---|---|---|---|---|---|---|
| | | Urethane-modified polyester resin | | | | Polyurea resin | | Polyester resin | | |
| | | A-7 | | A-8 | | A-9 | | A-10 | | A-11 |
| Alcohol component | 1,4-Butanediol | | | | | | | 125 | 1.39 | |
| | 1,6-Hexanediol | 149 | 1.26 | 191 | 1.62 | | | | | 130 1.10 |
| Carboxylic acid component | Adipic acid | | | | | | | 13 | 0.09 | |
| | Sebacic acid | 202 | 1.00 | 202 | 1.00 | | | 185 | 0.91 | 202 1.00 |
| Isocyanate component | Hexamethylene diisocyanate (HDI) | | | | | 336 | 2.00 | | | |
| | 4,4'-Diphenylmethane diisocyanate (MDI) | 28 | 0.11 | 35 | 0.14 | | | | | |
| Amine component | 1,4-Butanediamine | | | | | 123 | 1.40 | | | |
| | 1,6-Hexanediamine | | | | | 212 | 1.82 | | | |
| Catalyst | Titanium dihydroxybis(triethanolaminate) | | | | | | | 0.5 | | |
| | Tetrabutoxy titanate | | 0.5 | | 0.5 | | | | | 0.5 |
| | Dibutyltin oxide | | | | | | | | | |
| | Tm | | 67 | | 64 | | 64 | | 57 | 62 |
| | Mw | | 30,000 | | 8,500 | | 23,000 | | 9,500 | 27,000 |

TABLE 3

| | | Crystalline portion/ Non-crystalline portion Block resin | | | |
|---|---|---|---|---|---|
| | | A-12 | | A-13 | |
| Crystalline portion | 1,2-Propylene glycol | 25 | 0.33 | 39 | 0.51 |
| | 4,4'-Diphenylmethane diisocyanate (MDI) | 147 | 0.59 | 228 | 0.91 |
| Non-crystalline portion | 1,6-Hexanediol | 160 | 1.35 | 160 | 1.35 |
| | Sebacic acid | 202 | 1.00 | 202 | 1.00 |
| Catalyst | Tetrabutoxy titanate | | 0.5 | | 0.5 |
| | Tm | | 62 | | 61 |
| | Mw | | 26,000 | | 23,000 |

Production Example 19

Production of Non-Crystalline Resin C-1

A reaction vessel equipped with a condenser, a stirrer and a nitrogen-introducing tube was charged with 222 parts of bisphenol A EO 2 mole adduct, 129 parts of bisphenol A PO 2 mole adduct, 166 parts of isophthalic acid and 0.5 parts of tetrabutoxy titanate, and the resultant mixture was allowed to react under nitrogen flow and normal pressure at 230° C. for 8 hours while the water formed was being removed. Next, the reaction mixture was allowed to react under a reduced pressure of 5 mmHg to 20 mmHg. The reaction mixture was cooled to 180° C. at the time when the acid value thereof became 2. Then, 35 parts of trimellitic anhydride was added

TABLE 4

| | | Crystalline resin (B) | | | | | | | | |
|---|---|---|---|---|---|---|---|---|---|---|
| | | Urethane-modified polyester resin | | | | Polyurea resin | | Polyester resin | | Crystalline resin precursor |
| | | B-1 | | B-2 | | B-3 | | B-4 | | B'-5 |
| Alcohol component | 1,4-Butanediol | | | | | | | | | |
| | 1,6-Hexanediol | 132 | 1.12 | 136 | 1.15 | | | 118 | 1.00 | 122 1.03 |
| Carboxylic acid component | Adipic acid | | | 13 | 0.09 | | | | | |
| | Sebacic acid | 113 | 0.56 | 204 | 1.01 | | | | | 202 1.00 |
| | Dodecanedioic acid | | | | | | | 230 | 1.00 | |
| | Dimethyl terephthalate | 109 | 0.56 | | | | | | | |
| Isocyanate component | Hexamethylene diisocyanate (HDI) | 10 | 0.06 | | | | | | | 27 0.16 |
| | 4,4'-Diphenylmethane diisocyanate (MDI) | | | 15 | 0.06 | 475 | 1.90 | | | |
| Amine component | 1,4-Butanediamine | | | | | 79 | 0.90 | | | |
| | 1,6-Hexanediamine | | | | | 116 | 1.00 | | | |
| Catalyst | Titanium dihydroxybis(triethanolaminate) | | 0.5 | | | | | | | 0.5 |
| | Tetrabutoxy titanate | | | | 0.5 | | | | 0.5 | |
| | Tm | | 65 | | 63 | | 66 | | 66 | 57 |
| | Mw | | 63,000 | | 39,000 | | 57,000 | | 52,000 | 54,000 | to the reaction mixture, followed by being allowed to react under normal pressure for 3 hours, to thereby obtain [non-crystalline resin C-1]. The [non-crystalline resin C-1] was found to have a Mw of 8,000 and a Tg of 62° C.

Production Example 20

Production of Non-Crystalline Resin C'-2

A reaction vessel equipped with a condenser, a stirrer and a nitrogen-introducing tube was charged with 720 parts of bisphenol A EO 2 mole adduct, 90 parts of bisphenol A PO 2 mole adduct, 290 parts of terephthalic acid and 1 part of tetrabutoxy titanate, and the resultant mixture was allowed to react under nitrogen flow and normal pressure at 230° C. for 8 hours while the water formed was being removed. Next, the reaction mixture was allowed to react under a reduced pressure of 10 mmHg to 15 mmHg for 7 hours, whereby [non-crystalline resin] was obtained.

Next, a reaction vessel equipped with a condenser, a stirrer and a nitrogen-introducing tube was charged with 400 parts of the obtained [non-crystalline resin], 95 parts of isophorone diisocyanate and 500 parts of ethyl acetate, and the resultant mixture was allowed to react under nitrogen flow at 80° C. for 8 hours, to thereby a 50% by mass ethyl acetate solution of [non-crystalline resin precursor C'-2] having an isocyanate group on the ends thereof.

Examples 12 to 24 and Comparative Example 4 to 7

Production of Toner

—Production of Graft Polymer—

A reaction container to which a stirring rod and a thermometer had been set was charged with 480 parts of xylene and 100 parts of a low-molecular-weight polyethylene (product of Sanyo Chemical Industries, Ltd., SANWAX LEL-400; softening point: 128° C.) and the polyethylene was thoroughly dissolved. After the reaction container had been purged with nitrogen, a mixture containing styrene (740 parts), acrylonitrile (100 parts), butyl acrylate (60 parts), di-t-butylperoxyhexahydro terephthalate (36 parts) and xylene (100 parts) was added dropwise thereto at 170° C. for 3 hours to perform polymerization. The reaction mixture was kept at the same temperature for further 30 min. Next, the resultant mixture was desolvated to synthesize [graft polymer]. The obtained [graft polymer] was found to have a Mw of 24,000 and a Tg of 67° C.

—Preparation of Releasing Agent Dispersion Liquid (1)—

A container to which a stirring rod and a thermometer had been set was charged with 50 parts of paraffin wax (product of NIPPON SEIRO CO. LTD., HNP-9, hydrocarbon wax, melting point: 75° C., SP value: 8.8), 30 parts of the [graft polymer] and 420 parts of ethyl acetate, and the resultant mixture was increased in temperature to 80° C. under stirring, kept at 80° C. for 5 hours and cooled to 30° C. for 1 hour. The paraffin wax was dispersed in the resultant mixture using a beads mill (ULTRAVISCOMILL, product of Aimex CO. LTD.) under the following conditions: liquid-feeding rate: 1 kg/hr; disc-circumference speed: 6 m/sec; volume of 0.5-mm zirconia beads packed: 80% by volume; and pass time: 3, whereby [releasing agent dispersion liquid (1)] was obtained.

—Preparation of Masterbatches (1) to (14)—
Crystalline polyurethane resin A-1: 100 parts
Carbon black (PRINTEX35, product of EVONIK DEGUSSA Co.): 100 parts (DBP absorption amount: 42 mL/100 g, pH: 9.5)
Ion exchange water: 50 parts The above-listed materials were mixed together using HENSCHEL MIXER (product of NIPPON COKE & ENGINEERING CO. LTD.). The resultant mixture was kneaded using a two-roll. The kneading was initiated at a temperature of 90° C. and then the kneading temperature was gradually decreased to 50° C. The obtained kneaded product was pulverized with a pulverizer (product of Hosokawa Micron CO. LTD.) to prepare [masterbatch (1)].

The above procedure for preparing the [masterbatch (1)] was repeated, except that the binder resin used was changed from the crystalline polyurethane resin A-1 to each binder resin described in Table 5, to thereby prepare [masterbatch (2)] to [masterbatch (14)].

TABLE 5

|  | Binder resin |
| --- | --- |
| Masterbatch (1) | A-1 |
| Masterbatch (2) | A-2 |
| Masterbatch (3) | A-3 |
| Masterbatch (4) | A-4 |
| Masterbatch (5) | A-5 |
| Masterbatch (6) | A-6 |
| Masterbatch (7) | A-7 |
| Masterbatch (8) | A-8 |
| Masterbatch (9) | A-9 |
| Masterbatch (10) | A-10 |
| Masterbatch (11) | A-11 |
| Masterbatch (12) | A-12 |
| Masterbatch (13) | A-13 |
| Masterbatch (14) | C-1 |

—Preparation of Oil Phases (1) to (3), (5), (7) to (10), (14) to (17) and (21)—

A container equipped with a thermometer and a stirrer was charged with 31.5 parts of the [urethane-modified crystalline polyester resin A-2] and ethyl acetate in such an amount that the solid content concentration would be 50% by mass, and the resultant mixture was heated to a temperature equal to or higher than the melting point of the resin for thorough dissolution. To the resultant solution were added 100 parts of the 50% by mass ethyl acetate solution of the [non-crystalline resin C-1], 60 parts of the [releasing agent dispersion liquid (1)] and 12 parts of the [masterbatch (2)], and the resultant mixture was stirred at 50° C. using a TK homomixer (product of PRIMIX CO. LTD.) at 5,000 rpm, so that the components were homogeneously dissolved or dispersed to thereby obtain [oil phase (1')]. Notably, the temperature of the [oil phase (1')] was kept at 50° C. in the container, and the [oil phase (1')] was used within 5 hours after the preparation thereof so as not to be crystallized.

Next, immediately before the below-described production of toner base particles, 25 parts of the ethyl acetate solution of [crystalline resin precursor B'-5] was added to 235 parts of the [oil phase (1')] kept at 50° C., and the resultant mixture was stirred using a TK homomixer (product of PRIMIX CO. LTD.) at 5,000 rpm, so that the components were homogenuously dissolved or dispersed to thereby prepare [oil phase (1)].

Oil phases (2), (3), (5), (7) to (10), (14) to (17) and (21) each were prepared in the same manner as in the preparation of the oil phase (1) except that the type and amount of the crystalline resin A, the type and amount of the crystalline resin B, the type and amount of the non-crystalline resin C, and the type of the masterbatch were changed as described in Table 6. Notably, the [crystalline resin precursor B'-5] and the [non-crystalline resin precursor C-2] in Table 6 were added immediately before the production of toner base particles to prepare each oil phase, similar to the case of the [crystalline resin precursor B'-5] in the preparation of the [oil phase (1)].

TABLE 6

| | Binder resin | | | | | | | |
|---|---|---|---|---|---|---|---|---|
| | Crystalline resin (A) | | Crystalline resin (B) | | Non-crystalline resin (C) | | | Masterbatch |
| Oil Phase (1) | A-2 | 31.5 | B'-5 | 12.5 | C-1 | 50 | — — | (2) |
| Oil Phase (2) | A-2 | 46.5 | B'-5 | 17.5 | C-1 | 30 | — — | (2) |
| Oil Phase (3) | A-2 | 69 | B'-5 | 25 | — | — | — — | (2) |
| Oil Phase (5) | A-2 | 50 | B'-5 | 24 | C-1 | 20 | — — | (2) |
| Oil Phase (7) | A-4 | 54 | B'-5 | 20 | C-1 | 20 | — — | (4) |
| Oil Phase (8) | A-5 | 54 | B'-5 | 20 | C-1 | 20 | — — | (5) |
| Oil Phase (9) | A-7 | 54 | B'-5 | 20 | C-1 | 20 | — — | (7) |
| Oil Phase (10) | A-8 | 54 | B'-5 | 20 | C-1 | 20 | — — | (8) |
| Oil Phase (14) | A-1 | 54 | B'-5 | 20 | C-1 | 20 | — — | (1) |
| Oil Phase (15) | A-12 | 54 | B'-5 | 20 | C-1 | 20 | — — | (12) |
| Oil Phase (16) | A-13 | 54 | B'-5 | 20 | C-1 | 20 | — — | (13) |
| Oil Phase (17) | A-2 | 54 | B'-5 | 20 | C-1 | 20 | — — | (2) |
| Oil Phase (21) | A-2 | 15 | — | — | C-1 | 62 | C-2 17 | (14) |

—Preparation of Aqueous Dispersion Liquid of Fine Resin Particles—

A reaction container to which a stirring rod and a thermometer had been set was charged with 600 parts of water, 120 parts of styrene, 100 parts of methacrylic acid, 45 parts of butyl acrylate, 10 parts of sodium alkylally sulfosuccinate ("ELEMINOL JS-2," product of Sanyo Chemical Industries Ltd.) and 1 part of ammonium persulfate, and the resultant mixture was stirred at 400 rpm for 20 min to obtain white emulsion. The obtained white emulsion was heated to 75° C. (system temperature) and allowed to react for 6 hours. In addition, 30 parts of a 1% by mass aqueous ammonium persulfate solution was added to the reaction mixture, which was then aged at 75° C. for 6 hours, to thereby obtain [aqueous dispersion liquid of fine resin particles]. The particles contained in the [aqueous dispersion liquid of fine resin particles] were found to have a volume average particle diameter of 80 nm, and the resin thereof was found to have a weight average molecular weight of 160,000 and a Tg of 74° C.

—Preparation of Aqueous Phase (1)—

Water (990 parts), 83 parts of the [aqueous dispersion liquid of fine resin particles], 37 parts of 48.5% by mass aqueous solution of sodium dodecyl diphenyl ether disulfonate ("ELEMINOL MON-7," product of Sanyo Chemical Industries Ltd.) and 90 parts of ethyl acetate were mixed together to obtain [aqueous phase (1)].

—Production of Toner Base Particles (1) to (3), (5), (7) to (10), (14) to (17) and (21)—

The [aqueous phase (1)] (520 parts) was added to another container to which a stirrer and a thermometer had been set, and then heated to 40° C. While the [aqueous phase (1)] kept at 40° C. to 50° C. was being stirred at 13,000 rpm using a TK homomixer (product of product of PRIMIX CO. LTD.), the [oil phase (1)] was added to the [aqueous phase (1)], followed by emulsification for 1 min, to thereby obtain [emulsified slurry 1].

Next, the obtained [emulsified slurry 1] was added to a container to which a stirrer and a thermometer had been set, and then was desolvated at 60° C. for 6 hours to thereby obtain [slurry 1]. The obtained [slurry 1] was filtrated under reduced pressure and subjected to the following washing treatments.
(1) Ion exchange water (100 parts) was added to the filtration cake, followed by mixing with a TK homomixer (at 6,000 rpm for 5 min) and filtrating.
(2) A 10% by mass aqueous sodium hydroxide solution (100 parts) was added to the filtration cake obtained in (1), followed by mixing with a TK homomixer (at 6,000 rpm for 10 min) and filtrating under reduced pressure.
(3) 10% by mass hydrochloric acid (100 parts) was added to the filtration cake obtained in (2), followed by mixing with a TK homomixer (at 6,000 rpm for 5 min) and filtrating.
(4) Ion-exchange water (300 parts) was added to the filtration cake obtained in (3), followed by mixing with a TK homomixer (at 6,000 rpm for 5 min) and filtrating. This treatment was performed twice to thereby obtain filtration cake (1).

The obtained filtration cake (1) was dried with an air-circulation dryer at 45° C. for 48 hours, and then sieved with a mesh having an opening size of 75 μm to obtain toner base particles (1).

In the same manner, toner base particles (2), (3), (5), (7) to (10), (14) to (17) and (21) were produced using the oil phases (2), (3), (5), (7) to (10), (14) to (17) and (21), respectively.

—Preparation of Oil Phases (4), (13) and (18) to (20)—

A container equipped with a thermometer and a stirrer was charged with 62 parts of the [urethane-modified crystalline polyester resin A-2], 12 parts of the [urethane-modified crystalline polyester resin B-2] and ethyl acetate in such an amount that the solid content concentration would be 50% by mass, and the resultant mixture was heated to a temperature equal to or higher than the melting point of the resin for thorough dissolution. To the resultant solution were added 40 parts of the 50% by mass ethyl acetate solution of the [non-crystalline resin C-1], 60 parts of the [releasing agent dispersion liquid] and 12 parts of the [masterbatch (2)], and the resultant mixture was stirred at 50° C. using a TK homomixer (product of PRIMIX CO. LTD.) at 5,000 rpm, so that the components were homogeneously dissolved or dispersed to thereby obtain [oil phase (4)]. Notably, the temperature of the [oil phase (4)] was kept at 50° C. in the container, and the [oil phase (4)] was used within 5 hours after the preparation thereof so as not to be crystallized.

Oil phases (13) and (18) to (20) each were prepared in the same manner as in the preparation of the oil phase (4) except that the type and amount of the crystalline resin A, the type and amount of the crystalline resin B, the type and amount of the non-crystalline resin C, and the type of the masterbatch were changed as described in Table 7. Notably, when the crystalline resin [B-1], [B-2], [B-3] or [B-4] was used as Crystalline resin B in Table 7, the crystalline resin [B-1], [B-2], [B-3] or [B-4] was dissolved or dispersed together with other toner materials at the oil phase preparation step.

TABLE 7

| | Binder resin | | | | | |
|---|---|---|---|---|---|---|
| | Crystalline resin (A) | | Crystalline resin (B) | | Non-crystalline resin (C) | Masterbatch |
| Oil Phase (4)  | A-2  | 62 | B-2 | 12 | C-1 20 | (2) |
| Oil Phase (13) | A-9  | 54 | B-3 | 20 | C-1 20 | (9) |
| Oil Phase (18) | A-10 | 54 | B-4 | 20 | C-1 20 | (10) |
| Oil Phase (19) | A-11 | 54 | B-1 | 20 | C-1 20 | (11) |
| Oil Phase (20) | A-2  | 74 | —   | —  | C-1 20 | (2) |

—Preparation of Aqueous Phase (2)—

Water (990 parts), 37 parts of 48.5% by mass aqueous solution of sodium dodecyl diphenyl ether disulfonate ("ELEMINOL MON-7," product of Sanyo Chemical Industries Ltd.) and 90 parts of ethyl acetate were mixed together to obtain [aqueous phase (2)].

—Production of Toner Base Particles (4), (13) and (18) to (20)—

The [aqueous phase (2)] (520 parts) was added to another container to which a stirrer and a thermometer had been set, and then heated to 40° C. While the [aqueous phase (2)] kept at 40° C. to 50° C. was being stirred at 13,000 rpm using a TK homomixer (product of product of PRIMIX CO. LTD.), the [oil phase (4)] was added to the [aqueous phase (2)], followed by emulsification for 1 min, to thereby obtain [emulsified slurry 4].

Next, the obtained [emulsified slurry 4] was added to a container to which a stirrer and a thermometer had been set, and then was desolvated at 60° C. for 6 hours to thereby obtain [slurry 4]. The obtained [slurry 4] was filtrated under reduced pressure and subjected to the following washing treatments.
(1) Ion exchange water (100 parts) was added to the filtration cake, followed by mixing with a TK homomixer (at 6,000 rpm for 5 min) and filtrating.
(2) A 10% by mass aqueous sodium hydroxide solution (100 parts) was added to the filtration cake obtained in (1), followed by mixing with a TK homomixer (at 6,000 rpm for 10 min) and filtrating under reduced pressure.
(3) 10% by mass hydrochloric acid (100 parts) was added to the filtration cake obtained in (2), followed by mixing with a TK homomixer (at 6,000 rpm for 5 min) and filtrating.
(4) Ion-exchange water (300 parts) was added to the filtration cake obtained in (3), followed by mixing with a TK homomixer (at 6,000 rpm for 5 min) and filtrating. This treatment was performed twice to thereby obtain filtration cake (4).

The obtained filtration cake (4) was dried with an air-circulation dryer at 45° C. for 48 hours, and then sieved with a mesh having an opening size of 75 μm to obtain toner base particles (4).

In the same manner, toner base particles (13) and (18) to (20) were produced using the oil phases (13) and (18) to (20), respectively.

—Preparation of Crystalline Resin Particle Dispersion Liquid (A-3)—

Ethyl acetate (60 parts) was added to 60 parts of the [urethane-modified crystalline polyester resin A-3] and the resultant mixture was mixed and stirred at 50° C., so that the resin was dissolved to obtain a resin solution. Separately, 120 parts of water, 6 parts of 48.3% by mass aqueous solution of sodium dodecyl diphenyl ether disulfonate ("ELEMINOL MON-7," product of Sanyo Chemical Industries Ltd.) and 2.4 parts of a 2% by mass aqueous sodium hydroxide solution were mixed together to prepare [aqueous phase]. Then, 120 parts of the above-obtained resin solution was added to the [aqueous phase] and the resultant mixture was emulsified using a homogenizer (product of IKA Co., ULTRA-TURRAX T50). Thereafter, the emulsified mixture was subjected to emulsifying treatment using a MANTON-GAULIN high-pressure homogenizer (product of GAULIN Co.) to thereby obtain [emulsified slurry A-3].

Next, a container to which a stirrer and a thermometer had been set was charged with the [emulsified slurry A-3] and then desolvated at 60° C. for 4 hours, to thereby obtain [crystalline resin particle dispersion liquid (A-3)]. The particles contained in the obtained [crystalline resin particle dispersion liquid (A-3)] were measured using a particle size distribution analyzer (LA-920, product of HORIBA CO. LTD.) for volume average particle diameter, which was found to be 0.15 μm.

—Preparation of Crystalline Resin Particle Dispersion Liquid (A-6)—

Ethyl acetate (60 parts) was added to 60 parts of the [urethane-modified crystalline polyester resin A-6] and the resultant mixture was mixed and stirred at 50° C., so that the resin was dissolved to obtain a resin solution. Separately, 120 parts of water, 6 parts of 48.3% by mass aqueous solution of sodium dodecyl diphenyl ether disulfonate ("ELEMINOL MON-7," product of Sanyo Chemical Industries Ltd.) and 2.4 parts of a 2% by mass aqueous sodium hydroxide solution were mixed together to prepare [aqueous phase]. Then, 120 parts of the above-obtained resin solution was added to the [aqueous phase] and the resultant mixture was emulsified using a homogenizer (product of IKA Co., ULTRA-TURRAX T50). Thereafter, the emulsified mixture was subjected to emulsifying treatment using a MANTON-GAULIN high-pressure homogenizer (product of GAULIN Co.) to thereby obtain [emulsified slurry A-6].

Next, a container to which a stirrer and a thermometer had been set was charged with the [emulsified slurry A-6] and then desolvated at 60° C. for 4 hours, to thereby obtain [crystalline resin particle dispersion liquid (A-6)]. The particles contained in the obtained [crystalline resin particle dispersion liquid (A-6)] were measured using a particle size distribution analyzer (LA-920, product of HORIBA CO. LTD.) for volume average particle diameter, which was found to be 0.18 μm.

—Preparation of Crystalline Resin Particle Dispersion Liquid (B-1)—

Ethyl acetate (60 parts) was added to 60 parts of the [urethane-modified crystalline polyester resin B-1] and the resultant mixture was mixed and stirred at 50° C., so that the resin was dissolved to obtain a resin solution. Separately, 120 parts of water, 6 parts of 48.3% by mass aqueous solution of sodium dodecyl diphenyl ether disulfonate ("ELEMINOL MON-7," product of Sanyo Chemical Industries Ltd.) and 2.4 parts of a 2% by mass aqueous sodium hydroxide solution were mixed together to prepare [aqueous phase]. Then, 120 parts of the above-obtained resin solution was added to the [aqueous phase] and the resultant mixture was emulsified using a homogenizer (product of IKA Co., ULTRA-TURRAX T50). Thereafter, the emulsified mixture was subjected to emulsifying treatment using a MANTON-GAULIN high-pressure homogenizer (product of GAULIN Co.) to thereby obtain [emulsified slurry B-1].

Next, a container to which a stirrer and a thermometer had been set was charged with the [emulsified slurry B-1] and then desolvated at 60° C. for 4 hours, to thereby obtain [crystalline resin particle dispersion liquid (B-1)]. The particles contained in the obtained [crystalline resin particle dispersion liquid (B-1)] were measured using a particle size distribution analyzer (LA-920, product of HORIBA CO. LTD.) for volume average particle diameter, which was found to be 0.16 µm.

—Preparation of Non-Crystalline Resin Particle Dispersion Liquid (C-1)—

Ethyl acetate (60 parts) was added to 60 parts of the [non-crystalline resin C-1] and the resultant mixture was mixed and stirred, so that the resin was dissolved to obtain a resin solution. Separately, 120 parts of water, 6 parts of 48.3% by mass aqueous solution of sodium dodecyl diphenyl ether disulfonate ("ELEMINOL MON-7," product of Sanyo Chemical Industries Ltd.) and 2.4 parts of a 2% by mass aqueous sodium hydroxide solution were mixed together to prepare [aqueous phase]. Then, 120 parts of the above-obtained resin solution was added to the [aqueous phase] and the resultant mixture was emulsified using a homogenizer (product of IKA Co., ULTRA-TURRAX T50). Thereafter, the emulsified mixture was subjected to emulsifying treatment using a MANTON-GAULIN high-pressure homogenizer (product of GAULIN Co.) to thereby obtain [emulsified slurry C-1].

Next, a container to which a stirrer and a thermometer had been set was charged with the [emulsified slurry C-1] and then desolvated at 60° C. for 4 hours, to thereby obtain [non-crystalline resin particle dispersion liquid (C-1)]. The particles contained in the obtained [non-crystalline resin particle dispersion liquid (C-1)] were measured using a particle size distribution analyzer (LA-920, product of HORIBA CO. LTD.) for volume average particle diameter, which was found to be 0.15 µm.

—Preparation of Releasing Agent Dispersion Liquid (2)—

Paraffin wax (product of NIPPON SEIRO CO. LTD., HNP-9, melting point: 75° C.) (25 parts), 5 parts of an anionic surfactant ("ELEMINOL MON-7," product of Sanyo Chemical Industries Ltd.) and 200 parts of water were mixed together and the resultant mixture was melted at 95° C. Next, the melt liquid was emulsified using a homogenizer (product of IKA Co., ULTRA-TURRAX T50). Thereafter, the emulsified mixture was subjected to emulsifying treatment using a MANTON-GAULIN high-pressure homogenizer (product of GAULIN Co.) to thereby obtain [releasing agent dispersion liquid (2)].

—Preparation of Colorant Dispersion Liquid—

Carbon black (PRINTEX35, product of EVONIK DEGUSSA Co.) (20 parts), 2 parts of an anionic surfactant ("ELEMINOL MON-7," product of Sanyo Chemical Industries Ltd.) and 80 parts of water were mixed together and the carbon black was dispersed using a TK homomixer (product of PRIMIX CO. LTD.) to thereby obtain [colorant dispersion liquid].

—Production of Toner Base Particles (6)—

The [crystalline resin particle dispersion liquid (A-3)] (190 parts), 63 parts of the [crystalline resin particle dispersion liquid (B-1)], 63 parts of the [non-crystalline resin particle dispersion liquid (C-1)], 46 parts of the [releasing agent dispersion liquid (2)], 17 parts of the [colorant dispersion liquid] and 600 parts of water were mixed together, and the pH of the resultant mixture was adjusted to 10 with a 2% by mass aqueous sodium hydroxide solution. Next, the mixture was heated to 60° C. while 50 parts of a 10% by mass aqueous magnesium chloride solution was being gradually added dropwise to the mixture under stirring. The mixture was kept at 60° C. until the volume average particle diameter of the aggregated particles became 5.3 µm, to thereby obtain [slurry 6]. The obtained [slurry 6] was filtrated under reduced pressure and then subjected to the above washing treatments (1) to (4), whereby filtration cake (6) was obtained. The obtained filtration cake (6) was dried with an air-circulation dryer at 45° C. for 48 hours, and then sieved with a mesh having an opening size of 75 µm to obtain toner base particles (6).

—Production of Toner Base Particles (11)—

The [crystalline resin particle dispersion liquid (A-6)] (190 parts), 63 parts of the [crystalline resin particle dispersion liquid (B-1)], 63 parts of the [non-crystalline resin particle dispersion liquid (C-1)], 46 parts of the [releasing agent dispersion liquid (2)], 17 parts of the [colorant dispersion liquid] and 600 parts of water were mixed together, and the pH of the resultant mixture was adjusted to 10 with a 2% by mass aqueous sodium hydroxide solution. Next, the mixture was heated to 60° C. while 50 parts of a 10% by mass aqueous magnesium chloride solution was being gradually added dropwise to the mixture under stirring. The mixture was kept at 60° C. until the volume average particle diameter of the aggregated particles became 5.9 µm, to thereby obtain [slurry 11]. The obtained [slurry 11] was filtrated under reduced pressure and then subjected to the above washing treatments (1) to (4), whereby filtration cake (11) was obtained. The obtained filtration cake (11) was dried with an air-circulation dryer at 45° C. for 48 hours, and then sieved with a mesh having an opening size of 75 µm to obtain toner base particles (11).

—Production of Toner Base Particles (12)—

The [urethane-modified crystalline polyester resin A-2] (60 parts), 20 parts of the [urethane-modified crystalline polyester resin B-1], 20 parts of the [non-crystalline resin C-1], 5 parts of paraffin wax (product of NIPPON SEIRO CO. LTD., HNP-9, melting point: 75° C.) and 12 parts of the [masterbatch (2)] were preliminarily mixed together using HENSCHEL MIXER (product of NIPPON COKE & ENGINEERING CO. LTD., FM10B) and the resultant mixture was melted and kneaded using a biaxial kneader (product of IKEGAI Co. Ltd., PCM-30) at 80° C. to 120° C. The kneaded product was cooled to room temperature and then coarsely milled using a hammer mill so as to be 200 µm to 300 µm. Next, the milled product was finely milled using ultrasonic jet mill LABOJET (product of Nippon Pneumatic Mfg. Co. Ltd.) while the air pressure for the milling was appropriately adjusted so that the finely milled product had a weight average particle diameter of 6.2 µm±0.3 µm. Thereafter, the obtained particles were classified using an air classifier (product of Nippon Pneumatic Mfg. Co. Ltd., MDS-I) while the space between the louvers was appropriately adjusted so that the amount of fine particles having diameters less than 4 µm became 10% by number or less, whereby [toner base particles (12)] having a weight average particle diameter of 7.0 µm±0.2 µm was obtained.

—Production of Toners (2-1) to (2-21)—

Using HENSCHEL MIXER (product of NIPPON COKE & ENGINEERING CO. LTD.), each (100 parts) of the obtained toner base particles (1) to (21) was mixed with 1.0 part of hydrophobic silica (HDK-2000, product of Wacker Chemie AG) serving as an external additive at a circumferential speed of 30 m/sec with five cycles each consisting of mixing for 30 sec and suspending for 1 min. The resultant mixture was sieved with a mesh having an opening size of 35 µm to produce toners (2-1) to (2-21).

As shown in Table 8-1, these toners are those of Examples 12 to 24, Referential Examples 1 to 4 and Comparative Examples 4 to 7.

A toner of Example 22-2 was produced in the same manner as in Example 22 except that the conditions for the desolvation were changed from 60° C. for 6 hours to 70° C. for 3 hours.

A toner of Example 22-3 was produced in the same manner as in Example 22 except that the conditions for the desolvation were changed to 40° C. for 10 hours.

A toner of Example 24-2 was produced in the same manner as in Example 24 except that the conditions for the heating after production of toner were changed from 45° C. for 48 hours to 55° C. for 24 hours.

A toner of Example 24-3 was produced in the same manner as in Example 24 except that the conditions for the heating after production of toner were changed to 35° C. for 96 hours.

The obtained toners (2-1) to (2-21) were each measured for particle size distribution (Dv, Dn, Dv/Dn), Tsh2nd/Th1st, storage elastic modulus G'(70), storage elastic modulus G'(160) and crystallinity. These characteristics were measured by the above-described methods. The measurement results are shown in Tables 8-1, 9-1 and 9-2.

<Production of Carrier>
Silicone resin (organostraight silicone): 100 parts
γ-(2-Aminoethyl)aminopropyltrimethoxysilane: 5 parts
Carbon black: 10 parts
Toluene: 100 parts The above materials were dispersed using a homomixer for 20 min to prepare a resin layer-coating liquid. Thereafter, the surfaces of spherical ferrite particles (1,000 parts) having a volume average particle diameter of 35 μm were coated with the resin layer-coating liquid using a fluidized-bed coating apparatus, to thereby produce a carrier.

<Production of Developer>
Each (5 parts) of the toners (2-1) to (2-21) was mixed with 95 parts of the carrier to thereby produce developers of Examples 12 to 24 and Comparative Examples 4 to 7.

Next, each of the produced developers was evaluated in the following manner for fixability (minimum fixing temperature and fixable range), heat resistance storage stability and stress resistance. The evaluations for these properties were considered as a whole. The evaluation results are shown in Table 9-2.

<<Fixability (Minimum Fixing Temperature)>>

Using a tandem full-color image forming apparatus 100C depicted in FIG. 6, a solid image having an image size of 3 cm×8 cm was formed on a paper sheet (product of Ricoh Business Expert, Ltd., a copy paper sheet <70>), the solid image having a toner deposition amount of 0.85±0.10 mg/cm². Then, the formed solid image was fixed with the temperature of the fixing belt changed. The fixed image surface was drawn with a ruby needle (tip radius: 260 μmR to 320 μmR, tip angle: 60 degrees) at a load of 50 g using draw tester AD-401 (product of Ueshima Seisakusho Co., Ltd.). The drawn image surface was strongly rubbed five times with a fabric (HONECOTTO #440, Hanylon Co. Ltd.). Here, the temperature of the fixing belt at which almost no peeling-off of the image occurred was determined as the minimum fixing temperature. The solid image was formed on the paper sheet at a position 3.0 cm away from an edge of the paper sheet that entered the image forming apparatus. Notably, the speed at which the paper sheet passed through the nip portion of the fixing device was 280 mm/s. The lower minimum fixing temperature means the more excellent low-temperature fixability.

[Evaluation Criteria]
A: Minimum fixing temperature≤105° C.
B: 105° C.<Minimum fixing temperature≤115° C.
C: 115° C.<Minimum fixing temperature≤130° C.
D: 130° C.<Minimum fixing temperature <<Fixability (Hot Offset Resistance, Fixable Range)>>

Using a tandem full-color image forming apparatus 100C depicted in FIG. 6, a solid image having an image size of 3 cm×8 cm was formed on a paper sheet (product of Ricoh Company, Ltd., Type 6200), the solid image having a toner deposition amount of 0.85±0.10 mg/cm². Then, the formed solid image was fixed with the temperature of the fixing belt changed, to thereby visually evaluate whether or not hot offset occurred. Here, the fixable range is a difference between the minimum fixing temperature and the maximum temperature at which no hot offset occurred. The solid image was formed on the paper sheet at a position 3.0 cm away from an edge of the paper sheet that entered the image forming apparatus. Notably, the speed at which the paper sheet passed through the nip portion of the fixing device was 280 mm/s. The wider fixable range means the more excellent hot offset resistance. Conventional full-color toners have a fixable range of about 50° C. on average.

[Evaluation Criteria]
A: 100° C.<Fixable range
B: 55° C.<Fixable range≤100° C.
C: 30° C.<Fixable range≤55° C.
D: Fixable range≤30° C.

<<Heat Resistance Storage Stability (Penetration Degree)>>

Each toner was charged into a 50-mL glass container and left to stand in a thermostat bath of 50° C. for 24 hours. The thus-treated toner was cooled to 24° C. and then measured for penetration degree (mm) by the penetration degree test (JISK2235-1991) and evaluated according to the following evaluation criteria. Notably, the greater penetration degree means the more excellent heat resistance storage stability. Toner having a penetration degree of less than 5 mm is highly likely to involve problems in use.

Notably, the penetration degree in the present invention is expressed by the penetration depth (mm).

[Evaluation Criteria]
A: 25 mm≤Penetration degree
B: 15 mm≤Penetration degree<25 mm
C: 5 mm≤Penetration degree<15 mm
D: Penetration degree<5 mm <<Stress Resistance>>

Using a tandem full-color image forming apparatus 100C depicted in FIG. 6, a chart having an image occupation rate of 0.5% was formed on 50,000 sheets. Thereafter, a solid image was formed on a sheet and the obtained sheet was visually observed for whether the image portion had white spots free of the toner and evaluated according to the following evaluation criteria.

[Evaluation Criteria]
A: White spots free of the toner were not observed in the image portion; excellent state
B: Few white spots free of the toner were observed in the image portion; good state
C: Some white spots free of the toner were observed in the image portion; but non-problematic in practical use
D: Numerous white spots free of the toner were observed in the image portion; and problematic in practical use <<Transferability>>

Using a tandem full-color image forming apparatus 100C depicted in FIG. 6, a chart having an image occupation rate of 0.5% was formed on 50,000 sheets. Thereafter, in the course of formation of a solid image on a sheet, the image forming apparatus was stopped in operation immediately after the image had been transferred from a photoconductor (10) to an intermediate transfer belt (50). The photoconductor was taken out and then visually observed for untransfered toner remaining the transfer portion thereof and evaluated according to the following evaluation criteria. The evaluation results are shown in Table 9-2.

[Evaluation Criteria]
A: No untransferred toner was observed on the photoconductor; excellent state
B: Untransferred toner was slightly observed on the photoconductor to such an extent that the color of the background of the photoconductor could be perceived; good state
C: Untransferred toner was observed on the photoconductor and the background of the photoconductor was somewhat covered therewith; but non-problematic in practical use
D: Much untransferred toner was observed on the photoconductor and the background of the photoconductor was almost covered therewith; and problematic in practical use

TABLE 8-1

| | Toner No. | Ratio of binder resin | Dv [μm] | Presence or absence of urea bond detected | DSC peak temperature (°C.) | Tsh2nd/Tsh1st | Storage modulus G'[Pa] G'(70) | G'(160) | (C)/((C) + (A)) |
|---|---|---|---|---|---|---|---|---|---|
| Ex. 12 | Toner (2-1) | 50 | 6.0 | Presence | 55.6 | 0.85 | 1.0E+06 | 2.0E+03 | 0.15 |
| Ex. 13 | Toner (2-2) | 70 | 5.7 | Presence | 56.6 | 0.90 | 2.0E+05 | 6.0E+03 | 0.21 |
| Ex. 14 | Toner (2-3) | 100 | 5.9 | Presence | 60.7 | 1.05 | 4.0E+04 | 9.0E+03 | 0.31 |
| Ref. Ex. 1 | Toner (2-4) | 80 | 6.0 | Absence | 59.2 | 0.95 | 9.0E+04 | 9.5E+02 | 0.28 |
| Ex. 15 | Toner (2-5) | 80 | 5.7 | Presence | 57.4 | 0.90 | 1.0E+05 | 1.1E+04 | 0.21 |
| Ref. Ex. 2 | Toner (2.6) | 80 | 5.3 | Absence | 58.0 | 0.95 | 4.0E+04 | 4.0E+03 | 0.25 |
| Ex. 16 | Toner (2-7) | 80 | 5.4 | Presence | 59.4 | 0.95 | 4.0E+05 | 6.0E+03 | 0.25 |
| Ex. 17 | Toner (2-8) | 80 | 5.6 | Presence | 51.8 | 0.95 | 4.5E+04 | 5.0E+03 | 0.25 |
| Ex. 18 | Toner (2-9) | 80 | 5.8 | Presence | 62.3 | 0.95 | 2.0E+05 | 6.0E+03 | 0.25 |
| Ex. 19 | Toner (2-10) | 80 | 6.0 | Presence | 59.1 | 0.95 | 3.0E+04 | 5.0E+03 | 0.26 |
| Ref. Ex. 3 | Toner (2-11) | 80 | 5.9 | Absence | 55.5 | 0.95 | 6.0E+05 | 7.0E+03 | 0.24 |
| Ref. Ex. 4 | Toner (2-12) | 80 | 6.8 | Absence | 60.8 | 0.95 | 3.0E+04 | 1.5E+03 | 0.27 |
| Ex. 20 | Toner (2-13) | 80 | 6.3 | Presence | 62.6 | 0.85 | 6.0E+05 | 9.0E+02 | 0.13 |
| Ex. 21 | Toner (2-14) | 80 | 5.6 | Presence | 57.2 | 0.85 | 5.9E+05 | 1.5E+04 | 0.14 |
| Ex. 22 | Toner (2-15) | 80 | 6.2 | Presence | 57.7 | 0.90 | 6.0E+04 | 5.0E+03 | 0.22 |
| Ex. 23 | Toner (2-16) | 80 | 5.4 | Presence | 57.9 | 0.85 | 5.5E+05 | 7.0E+03 | 0.18 |
| Ex. 24 | Toner (2-17) | 80 | 5.2 | Presence | 57.7 | 0.95 | 6.0E+04 | 4.0E+03 | 0.23 |
| Comp. Ex. 4 | Toner (2-18) | 80 | 5.9 | Absence | 56.5 | 1.05 | 1.0E+04 | 8.0E+02 | 0.39 |
| Comp. Ex. 5 | Toner (2-19) | 80 | 5.3 | Absence | 60.9 | 1.05 | 3.0E+04 | 2.0E+03 | 0.37 |
| Comp. Ex. 6 | Toner (2-20) | 80 | 6.2 | Absence | 59.1 | 0.95 | 9.0E+04 | 1.0E+02 | 0.24 |
| Comp. Ex. 7 | Toner (2.21) | 15 | 6.3 | Absence | 55.8 | 0.30 | 4.0E+06 | 5.0E+03 | 0.01 |

TABLE 8-2

| | Physical properties | | | | | | N (% by mass) | Urethane | Urea | (C)/((C) + (A)) | THF/AcOEt insoluble content (% by mass) | ΔH (T) | ΔH (H) | ΔH (H)/ΔH(T) |
|---|---|---|---|---|---|---|---|---|---|---|---|---|---|---|
| | Mn | Mw | Mpt | 100,000 or more | 250,000 or more | Mw/Mn | | | | | | | | |
| Ex. 12 | 8,400 | 22,700 | 21,300 | 13.3 | 1.2 | 2.70 | 0.43 | Presence | Presence | 0.15 | 13.9 | 30.6 | 38.5 | 1.26 |
| Ex. 13 | 9,300 | 27,800 | 25,000 | 14.8 | 1.5 | 2.99 | 0.62 | Presence | Presence | 0.21 | 15.2 | 42.2 | 48.5 | 1.15 |
| Ex. 14 | 13,800 | 40,000 | 36,400 | 21.1 | 1.9 | 2.90 | 0.90 | Presence | Presence | 0.31 | 18.1 | 70.4 | 69.5 | 0.99 |
| Ref. Ex. 1 | 7,600 | 21,200 | 19,500 | 3.1 | 0.2 | 2.79 | 0.58 | Presence | Absence | 0.28 | 9.8 | 50.9 | 37.0 | 0.73 |
| Ex. 15 | 12,600 | 33,900 | 31,500 | 19.7 | 1.7 | 2.69 | 0.73 | Presence | Presence | 0.21 | 17.7 | 48.2 | 50.2 | 1.04 |
| Ref. Ex. 2 | 7,200 | 21,700 | 20,400 | 2.4 | 0.1 | 3.01 | 2.21 | Presence | Absence | 0.25 | 9.3 | 51.4 | 36.0 | 0.70 |
| Ex. 16 | 14,700 | 42,500 | 38,300 | 16.3 | 1.4 | 2.89 | 0.62 | Presence | Presence | 0.25 | 15.4 | 50.9 | 52.2 | 1.03 |
| Ex. 17 | 10,200 | 28,600 | 26,000 | 17.5 | 1.7 | 2.80 | 0.84 | Presence | Presence | 0.25 | 16.8 | 50.6 | 53.1 | 1.05 |
| Ex. 18 | 14,400 | 38,800 | 35,700 | 18.6 | 1.6 | 2.69 | 0.73 | Presence | Presence | 0.25 | 17.2 | 50.9 | 51.9 | 1.02 |
| Ex. 19 | 8,400 | 25,300 | 23,500 | 16.8 | 1.6 | 3.01 | 0.78 | Presence | Presence | 0.26 | 15.8 | 51.3 | 54.9 | 1.07 |
| Ref. Ex. 3 | 13,300 | 38,700 | 36,400 | 5.2 | 0.4 | 2.91 | 1.25 | Presence | Absence | 0.24 | 11.4 | 50.9 | 41.0 | 0.81 |
| Ref. Ex. 4 | 9,100 | 25,500 | 23,000 | 3.9 | 0.3 | 2.80 | 0.60 | Presence | Absence | 0.27 | 10.5 | 50.7 | 38.0 | 0.75 |
| Ex. 20 | 10,300 | 27,900 | 25,400 | 17.2 | 1.7 | 2.71 | 8.99 | Presence | Presence | 0.13 | 16 | 45.6 | 37.0 | 0.81 |
| Ex. 21 | 10,300 | 30,900 | 28,400 | 18.4 | 1.7 | 3.00 | 4.53 | Presence | Presence | 0.14 | 16.9 | 46.3 | 36.0 | 0.78 |
| Ex. 22 | 11,400 | 33,100 | 30,800 | 16.5 | 1.7 | 2.90 | 1.93 | Presence | Presence | 0.22 | 14.5 | 48.2 | 53.8 | 1.12 |
| Ex. 23 | 12,200 | 34,100 | 32,100 | 17.7 | 1.6 | 2.80 | 2.45 | Presence | Presence | 0.18 | 17.1 | 45.6 | 54.2 | 1.19 |
| Ex. 24 | 12,000 | 32,300 | 29,100 | 15.8 | 1.6 | 2.69 | 0.71 | Presence | Presence | 0.23 | 12.2 | 50.9 | 54.1 | 1.06 |
| Comp. Ex. 4 | 5,600 | 16,900 | 15,400 | 1.1 | 0.1 | 3.02 | 0.00 | Absence | Absence | 0.39 | 8.4 | 55.7 | 39.7 | 0.71 |
| Comp. Ex. 5 | 11,000 | 32,000 | 29,400 | 2.1 | 0.2 | 2.91 | 0.10 | Presence | Absence | 0.37 | 8.9 | 56.3 | 40.1 | 0.71 |
| Comp. Ex. 6 | 6,800 | 19,000 | 17,700 | 1.6 | 0.1 | 2.79 | 0.62 | Presence | Absence | 0.24 | 7.8 | 50.9 | 44.2 | 0.87 |
| Comp. Ex. 7 | 3,600 | 9,600 | 9,000 | 15.4 | 1.5 | 2.67 | 0.13 | Presence | Absence | 0.01 | 9.7 | 9.0 | 4.2 | 0.47 |

TABLE 8-3

| | Evaluation for fixation | | | | | | |
|---|---|---|---|---|---|---|---|
| | Fixability | | Post-fixation state | | Glossiness | | |
| | 55T | 135T | 55T | 135T | 55T | 135T | Difference |
| Ex. 12 | B | B | C | C | 13.0 | 10.5 | 2.5 |
| Ex. 13 | B | B | B | C | 10.2 | 8.3 | 1.9 |
| Ex. 14 | A | A | A | A | 2.2 | 1.8 | 0.4 |
| Ref. Ex. 1 | D | C | C | C | 27.5 | 18.8 | 8.7 |
| Ex. 15 | B | A | B | B | 8.1 | 6.6 | 1.5 |
| Ref. Ex. 2 | D | C | C | C | 26.2 | 15.8 | 10.4 |
| Ex. 16 | A | A | A | A | 9.8 | 7.9 | 1.9 |
| Ex. 17 | B | B | C | C | 7.4 | 6.0 | 1.4 |
| Ex. 18 | B | A | A | B | 5.1 | 4.1 | 1.0 |
| Ex. 19 | B | B | B | C | 12.6 | 10.2 | 2.4 |
| Ref. Ex. 3 | C | C | A | B | 24.3 | 16.6 | 7.7 |
| Ref. Ex. 4 | D | C | B | B | 24.7 | 14.5 | 10.2 |
| Ex. 20 | B | B | B | C | 8.9 | 7.2 | 1.7 |
| Ex. 21 | B | A | B | B | 6.5 | 5.3 | 1.2 |
| Ex. 22 | B | A | B | B | 7.5 | 6.1 | 1.4 |
| Ex. 23 | B | A | B | B | 11.7 | 9.5 | 2.2 |
| Ex. 24 | B | A | B | B | 12.7 | 10.3 | 2.4 |
| Comp. Ex. 4 | D | D | — | — | — | — | — |
| Comp. Ex. 5 | D | C | — | A | — | 19.3 | — |
| Comp. Ex. 6 | D | D | — | — | — | — | — |
| Comp. Ex. 7 | D | D | — | — | — | — | — |

TABLE 9-1

| | | Ratio of crystalline resin | Dv [μm] | Dn [μm] | Dv/Dn | Tsh2nd/Tsh1st | Storage modulus G'[Pa] | |
|---|---|---|---|---|---|---|---|---|
| | | | | | | | G'(70) | G'(160) |
| Ex. 12 | Toner (2-1) | 50 | 6.0 | 5.2 | 1.15 | 0.85 | 1.00E+06 | 2.00E+03 |
| Ex. 13 | Toner (2-2) | 70 | 5.7 | 5.0 | 1.14 | 0.90 | 2.00E+05 | 6.00E+03 |
| Ex. 14 | Toner (2-3) | 100 | 5.9 | 5.1 | 1.16 | 1.05 | 4.00E+04 | 9.00E+03 |
| Ref. Ex. 1 | Toner (2-4) | 80 | 6.0 | 4.6 | 1.30 | 0.95 | 9.00E+04 | 9.50E+02 |
| Ex. 15 | Toner (2.5) | 80 | 5.7 | 5.0 | 1.14 | 0.9 | 1.00E+05 | 1.10E+04 |
| Ref. Ex. 2 | Toner (2-6) | 80 | 5.3 | 4.5 | 1.18 | 0.95 | 4.00E+04 | 4.00E+03 |
| Ex. 16 | Toner (2-7) | 80 | 5.4 | 4.6 | 1.17 | 0.95 | 4.00E+05 | 6.00E+03 |
| Ex. 17 | Toner (2-8) | 80 | 5.6 | 4.8 | 1.17 | 0.95 | 4.50E+04 | 5.00E+03 |
| Ex. 18 | Toner (2-9) | 80 | 5.8 | 5.1 | 1.14 | 0.95 | 2.00E+05 | 6.00E+03 |
| Ex. 19 | Toner (2-10) | 80 | 6.0 | 5.2 | 1.15 | 0.95 | 3.00E+04 | 5.00E+03 |
| Ref. Ex. 3 | Toner (2-11) | 80 | 5.9 | 5.1 | 1.16 | 0.95 | 6.00E+04 | 7.00E+03 |
| Ref. Ex. 4 | Toner (2-12) | 80 | 6.8 | 5.5 | 1.24 | 0.95 | 3.00E+04 | 1.50E+03 |
| Ex. 20 | Toner (2-13) | 80 | 6.3 | 4.8 | 1.31 | 0.85 | 6.00E+05 | 9.00E+02 |
| Ex. 21 | Toner (2.14) | 80 | 5.6 | 4.8 | 1.17 | 0.85 | 5.90E+05 | 1.50E+04 |
| Ex. 22 | Toner (2-15) | 80 | 6.2 | 5.4 | 1.15 | 0.90 | 6.00E+04 | 5.00E+03 |
| Ex. 22-2 | Toner (2-15-2) | 80 | 6.3 | 5.3 | 1.19 | 0.9 | 5.80E+04 | 4.90E+03 |
| Ex. 22-3 | Toner (2-15-3) | 80 | 6.1 | 5.4 | 1.13 | 0.92 | 6.20E+04 | 5.10E+03 |
| Ex. 23 | Toner (2-16) | 80 | 5.4 | 4.7 | 1.15 | 0.85 | 5.50E+05 | 7.00E+03 |
| Ex. 24 | Toner (2-17) | 80 | 5.2 | 4.6 | 1.13 | 0.95 | 6.00E+04 | 4.00E+03 |
| Ex. 24-2 | Toner (17-2) | 80 | 5.3 | 4.6 | 1.15 | 0.93 | 5.70E+04 | 3.50E+03 |
| Ex. 24-3 | Toner (17-3) | 80 | 5.2 | 4.7 | 1.11 | 0.98 | 6.40E+04 | 4.50E+03 |
| Comp. Ex. 4 | Toner (2-18) | 80 | 5.9 | 4.4 | 1.34 | 1.05 | 1.00E+04 | 8.00E+02 |
| Comp. Ex. 5 | Toner (2-19) | 80 | 5.3 | 4.0 | 1.33 | 1.05 | 3.00E+04 | 2.00E+03 |
| Comp. Ex. 6 | Toner (2.20) | 80 | 6.2 | 4.8 | 1.29 | 0.95 | 9.00E+04 | 1.00E+02 |
| Comp. Ex. 7 | Toner (2-21) | 15 | 6.3 | 4.8 | 1.31 | 0.30 | 4.00E+06 | 5.00E+03 |

TABLE 9-2

| | Crystallinity [%] | Resistivity logR | Fixability | | Heat-resistant storage stability | Stress resistance | Transferability |
|---|---|---|---|---|---|---|---|
| | | | Min. fixing temp. | Fixable range | | | |
| Ex. 12 | 15 | 10.1 | 125 | 55 | C | A | C |
| Ex. 13 | 21 | 10.3 | 105 | >100 | A | A | B |
| Ex. 14 | 31 | 10.7 | 105 | >100 | A | C | A |
| Ref. Ex. 1 | 28 | 10.3 | 105 | 40 | A | B | B |
| Ex. 15 | 21 | 10.2 | 115 | >100 | A | B | B |
| Ref. Ex. 2 | 25 | 10.3 | 105 | 70 | C | A | B |
| Ex. 16 | 25 | 9.9 | 110 | >100 | A | A | C |
| Ex. 17 | 25 | 10.3 | 105 | >100 | B | A | B |
| Ex. 18 | 25 | 10.1 | 105 | >100 | A | A | C |
| Ex. 19 | 26 | 10.3 | 100 | >100 | C | C | B |
| Ref. Ex. 3 | 24 | 10.4 | 115 | 70 | A | A | A |
| Ref. Ex. 4 | 27 | 10.5 | 110 | 70 | B | B | A |
| Ex. 20 | 13 | 10.1 | 115 | 70 | C | A | C |
| Ex. 21 | 14 | 10 | 115 | >100 | C | A | C |
| Ex. 22 | 22 | 10.3 | 105 | >100 | A | A | B |
| Ex. 22-2 | 18 | 9.9 | 110 | >100 | B | B | C |
| Ex. 22-3 | 27 | 10.6 | 100 | >100 | A | A | A |
| Ex. 23 | 18 | 10.2 | 115 | >100 | B | A | B |

TABLE 9-2-continued

| | Crystallinity [%] | Resistivity logR | Fixability Min. fixing temp. | Fixable range | Heat-resistant storage stability | Stress resistance | Transferability |
|---|---|---|---|---|---|---|---|
| Ex. 24 | 23 | 10.4 | 105 | >100 | A | A | B |
| Ex. 24-2 | 15 | 9.9 | 105 | >100 | B | B | C |
| Ex. 24-3 | 29 | 10.6 | 100 | >100 | A | A | A |
| Comp. Ex. 4 | 39 | 10.8 | 105 | 40 | C | D | B |
| Comp. Ex. 5 | 37 | 10.7 | 105 | 65 | B | D | B |
| Comp. Ex. 6 | 24 | 9.8 | 110 | 20 | B | C | D |
| Comp. Ex. 7 | — | 10.9 | 140 | 55 | B | A | B |

As shown in Tables 8-3 and 9-2, the developers of Examples 12 to 24 were superior to those of Comparative Examples 4 to 7 in low-temperature fixability, fixable range, heat resistance storage stability and stress resistance.

Embodiments of the present invention are as follows.

<1> A toner, including:
a crystalline resin as a binder resin,
wherein a tetrahydrofuran soluble content of the toner includes 5.0% or more as a peak area of a component having a molecular weight of 100,000 or greater in a molecular weight distribution measured by gel permeation chromatography, and
wherein the tetrahydrofuran soluble content of the toner has a weight-average molecular weight of 20,000 to 60,000.

<2> The toner according to <1>, wherein, in a diffraction spectrum of the toner obtained by an x-ray diffraction apparatus, a ratio of (C) integrated intensity of a spectrum derived from a crystalline structure to a sum of the (C) and (A) integrated intensity of a spectrum derived from a non-crystalline structure [C/(A+C)] is 0.13 or greater.

<3> The toner according to any one of <1> and <2>, wherein the tetrahydrofuran soluble content of the toner includes 0.5% or more as a peak area of a component having a molecular weight of 250,000 or greater in the molecular weight distribution measured by gel permeation chromatography.

<4> The toner according to any one of <1> to <3>, wherein a ratio [ΔH(H)/ΔH(T)] of an endothermic quantity [ΔH(T), (J/g)] in a differential scanning calorimetry of the toner and an endothermic quantity [ΔH(H), (J/g)] in a differential scanning calorimetry of an insoluble content of the toner with respect to a mixed solvent of tetrahydrofuran and ethyl acetate [tetrahydrofuran/ethyl acetate=50/50 (mass ratio)] is 0.20 to 1.25.

<5> The toner according to any one of <1> to <4>, wherein the crystalline resin includes a crystalline resin including a urethane bond or a urea bond or both thereof.

<6> The toner according to <5>, wherein the crystalline resin including a urethane bond or a urea bond or both thereof includes a component where a modified crystalline resin having an isocyanate group at an end thereof is elongated.

<7> The toner according to any one of <5> and <6>, wherein the crystalline resin including a urethane bond or a urea bond or both thereof includes a first crystalline resin and a second crystalline resin having a weight-average molecular weight greater than that of the first crystalline resin.

<8> The toner according to any one of <5> to <7>, wherein the crystalline resin including a urethane bond or a urea bond or both thereof includes a crystalline resin including a polyurethane unit and a crystalline polyester unit.

<9> The toner according to any one of <5> to <8>, wherein a content of N element in a CHN analysis of the tetrahydrofuran soluble content of the toner is 0.3% by mass to 2.0% by mass.

<10> The toner according to any one of <1> to <9>, wherein an insoluble content of the toner with respect to a mixed solution of tetrahydrofuran and ethyl acetate (tetrahydrofuran/ethyl acetate=50/50 (mass ratio)) is 10.0% by mass or greater.

<11> The toner according to any one of <1> to <10>, wherein a common logarithmic value of a volume resistivity R of the toner by an AC bridge method is 10.0 to 10.6.

<12> A developer, including:
the toner according to any one of <1> to <11>.

<13> An image forming apparatus, including:
an electrostatic latent image bearing member;
an electrostatic latent image forming unit which is configured to form an electrostatic latent image on the electrostatic latent image bearing member; and
a developing unit which is configured to develop the electrostatic latent image formed on the electrostatic latent image bearing member to form a visible image and which includes a toner,
wherein the toner is the toner according to any one of <1> to <11>.

REFERENCE SIGNS LIST

10: Photoconductor (photoconductor drum)
61: Developing device
100A: Image forming apparatus
100B: Image forming apparatus
100C: Image forming apparatus

The invention claimed is:

1. A toner, comprising:
a binder resin comprising a crystalline resin comprising a polyurethane urethane bond, a urea bond, or a combination thereof, wherein the crystalline resin comprising a urethane bond, a urea bond, or a combination thereof comprises a crystalline resin comprising a polyurethane unit and a crystalline polyester unit,
wherein a tetrahydrofuran soluble content of the toner comprises 5.0% or more as a peak area of a component having a molecular weight of 100,000 or greater in a molecular weight distribution measured by gel permeation chromatography, and
wherein the tetrahydrofuran soluble content of the toner has a weight-average molecular weight in the range of 20,000 to 60,000.

2. The toner of claim 1, wherein a ratio of (C) integrated intensity of a spectrum derived from a crystalline structure to a sum of the (C) and (A) integrated intensity of a spectrum derived from a non-crystalline structure [C/(A+C)] is 0.13 or greater in a diffraction spectrum of the toner obtained by an x-ray diffraction apparatus.

3. The toner of claim 1, wherein the tetrahydrofuran soluble content of the toner comprises at least 0.5% or more as a peak area of a component having a molecular weight of 250,000 or greater in the molecular weight distribution measured by gel permeation chromatography.

4. The toner of claim 1, wherein a ratio [ΔH(H)/ΔH(T)] of an endothermic quantity [ΔH(T), (J/g)] in a differential scanning calorimetry of the toner and an endothermic quantity [ΔH(H), (J/g)] in a differential scanning calorimetry of an insoluble content of the toner with respect to a mixed solvent of tetrahydrofuran and ethyl acetate [tetrahydrofuran/ethyl acetate=50/50 (mass ratio)] is in the range of 0.20 to 1.25.

5. The toner of claim 1, wherein the crystalline resin comprising a urethane bond, a urea bond, or a combination thereof comprises a component wherein a modified crystalline resin having an isocyanate group at an end thereof is elongated.

6. The toner of claim 1, wherein the crystalline resin comprising a urethane bond, a urea bond, or a combination thereof comprises a first crystalline resin and a second crystalline resin having a weight-average molecular weight greater than that of the first crystalline resin.

7. The toner of claim 1, wherein a content of N element in a CHN analysis of the tetrahydrofuran soluble content of the toner is in the range of 0.3% by mass to 2.0% by mass.

8. The toner of claim 1, wherein an insoluble content of the toner with respect to a mixed solution of tetrahydrofuran and ethyl acetate (tetrahydrofuran/ethyl acetate=50/50 (mass ratio)) is 10.0% by mass or greater.

9. The toner of claim 1, wherein a common logarithmic value of a volume resistivity R of the toner by an AC bridge method is in the range of 10.0 to 10.6.

10. A developer, comprising:
a toner comprising a binder resin comprising a crystalline resin comprising a polyurethane urethane bond, a urea bond, or a combination thereof, wherein the crystalline resin comprising a urethane bond, a urea bond, or a combination thereof comprises a crystalline resin comprising a polyurethane unit and a crystalline polyester unit,
wherein a tetrahydrofuran soluble content of the toner comprises 5.0% or more as a peak area of a component having a molecular weight of 100,000 or greater in a molecular weight distribution measured by gel permeation chromatography, and
wherein the tetrahydrofuran soluble content of the toner has a weight-average molecular weight of 20,000 to 60,000.

* * * * *